(12) United States Patent
Tsai et al.

(10) Patent No.: US 6,451,463 B1
(45) Date of Patent: Sep. 17, 2002

(54) ELECTRO-CHEMICAL POWER GENERATION SYSTEMS EMPLOYING ARRAYS OF ELECTRONICALLY-CONTROLLABLE DISCHARGING AND/OR RECHARGING CELLS WITHIN A UNITY SUPPORT STRUCTURE

(75) Inventors: Tsepin Tsai, Peekskill; Sadeg M. Faris, Pleasantville, both of NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/414,874

(22) Filed: Oct. 8, 1999

Related U.S. Application Data

(63) Continuation-in-part of application No. 09/167,148, filed on Oct. 6, 1998, now Pat. No. 6,348,277, and a continuation-in-part of application No. 09/143,895, filed on Aug. 31, 1998, now Pat. No. 6,309,771, and a continuation-in-part of application No. 09/143,889, filed on Aug. 31, 1998, which is a continuation of application No. 08/944,507, filed on Oct. 6, 1997, now Pat. No. 6,296,960, application No. 09/414,874, which is a continuation of application No. 09/167,148, filed on Oct. 6, 1998, now Pat. No. 6,348,277, which is a continuation of application No. 09/116,643, filed on Oct. 6, 1998, now Pat. No. 6,306,534, which is a continuation of application No. 09/164,063, filed on Sep. 30, 1998, now Pat. No. 6,239,508, which is a continuation of application No. 09/133,166, filed on Aug. 12, 1998, which is a continuation of application No. 09/232,328, filed on Aug. 10, 1998, now Pat. No. 6,190,792, which is a continuation of application No. 09/232,327, filed on Aug. 10, 1998, now Pat. No. 6,218,034, which is a continuation of application No. 09/232,326, filed on Aug. 10, 1998, now Pat. No. 6,365,292, which is a continuation of application No. 09/130,341, filed on Aug. 6, 1998, now Pat. No. 6,287,715, which is a continuation of application No. 09/130,325, filed on Aug. 6, 1998, which is a continuation of application No. 09/126,213, filed on Jul. 30, 1998, now Pat. No. 6,312,844, which is a continuation of application No. 09/120,583, filed on Jul. 22, 1998, which is a continuation of application No. 09/112,596, filed on Jul. 9, 1998, now Pat. No. 6,228,519, which is a continuation of application No. 09/110,762, filed on Jul. 3, 1998, now Pat. No. 6,299,997, which is a continuation of application No. 09/110,761, filed on Jul. 3, 1998, now Pat. No. 6,335,111, which is a continuation of application No. 09/074,337, filed on May 7, 1998.

(51) Int. Cl.[7] .................... H01M 12/06; H01M 16/00
(52) U.S. Cl. .................. 429/9; 429/21; 429/27; 429/40
(58) Field of Search .......................... 429/4, 9, 27, 28, 429/40

(56) References Cited

U.S. PATENT DOCUMENTS 3,252,838 A   5/1966   Huber et al.

(List continued on next page.)

FOREIGN PATENT DOCUMENTS

GB   1176488   1/1970   .......... H01M/29/02

OTHER PUBLICATIONS

Fabrication of Thin–Film LIMN204 Cathodes For Rechargeable Microbateries by F.K. Shokoohi, et. al., Applied Physics Letters, 1991, pp. 1260–1262 (Sep.).

(List continued on next page.)

*Primary Examiner*—Stephen Kalafut
(74) *Attorney, Agent, or Firm*—Thomas J. Perkowski; Ralph J. Crispino

(57) ABSTRACT

A novel segmented air cathode device of unitary construction for use in a metal-air fuel cell battery system. The device includes a plurality of cells formed by a cathode structure having a plurality of cathode elements on a unitary cathode support structure, and an anode structure having one or more anode-contacting elements on an anode-contacting element support plate. Preferably, the cathode elements include cathode elements of different types. In one embodiment, the device includes first-type cathode elements and corresponding cells optimized for discharging operations and second-type cathode elements and corresponding cells optimized for recharging operations. In an alternate embodiment, the device includes first-type cathode elements and corresponding cells optimized for low-power discharging operations and, second-type cathode elements and corresponding cells optimized for high-power discharging operations. Preferably, each cell can be independently, activated (i.e. enabled) using a transistor-based power switching element operated under the control of a switching controller. In some embodiments, the power switching elements are used to control the power delivered to electrical loads during discharging operations of the discharging-optimized cells. In other embodiments, the power switching elements are used to produce high-frequency electrical currents for generating stepped-up voltages, which are subsequently rectified and low-pass filtered. In another illustrative embodiment, the power switching elements are provided for controlling the recharging of the recharging-optimized cells during recharging operations.

55 Claims, 33 Drawing Sheets

U.S. PATENT DOCUMENTS

| | | |
|---|---|---|
| 3,260,620 A | 7/1966 | Gruber |
| 3,357,864 A | 12/1967 | Huber |
| 3,432,354 A | 3/1969 | Jost |
| 3,436,270 A | 4/1969 | Oswih et al. |
| 3,454,429 A | 7/1969 | Gruber .................. 136/86 |
| 3,532,548 A | 10/1970 | Stachurski |
| 3,536,535 A | 10/1970 | Lippincott |
| 3,577,281 A | 5/1971 | Pountney et al. |
| 3,663,298 A | 5/1972 | McCoy et al. |
| 3,717,505 A | 2/1973 | Unkle et al. |
| 3,822,149 A | 7/1974 | Hale |
| 3,845,835 A | 11/1974 | Petit |
| 3,909,685 A | 9/1975 | Baker et al. |
| 3,928,072 A | 12/1975 | Gerbler et al. |
| 3,963,519 A | 6/1976 | Louie |
| 3,977,901 A | 8/1976 | Buzzelli |
| 4,025,698 A * | 5/1977 | Von Krusenstierna ......... 429/4 |
| 4,052,541 A | 10/1977 | von Krusenstierna |
| 4,152,489 A | 5/1979 | Chottiner |
| 4,172,924 A | 10/1979 | Warszawski |
| 4,246,324 A | 1/1981 | de Nora et al. |
| 4,331,742 A | 5/1982 | Lovelace et al. |
| 4,341,847 A | 7/1982 | Sammells |
| 4,447,504 A * | 5/1984 | Gorber .................. 429/9 |
| 4,551,399 A | 11/1985 | Despic |
| 4,560,626 A | 12/1985 | Joy |
| 4,626,482 A | 12/1986 | Hamlen et al. |
| 4,689,531 A | 8/1987 | Bacon |
| 4,693,946 A | 9/1987 | Niksa et al. |
| 4,714,662 A | 12/1987 | Bennett |
| 4,828,939 A | 5/1989 | Turley et al. |
| 4,913,983 A | 4/1990 | Cheiky |
| 4,916,036 A | 4/1990 | Cheiky |
| 4,950,561 A | 8/1990 | Niksa et al. |
| 4,957,826 A | 9/1990 | Cheiky |
| 4,968,396 A | 11/1990 | Harvey |
| 5,121,044 A | 6/1992 | Goldman |
| 5,183,712 A * | 2/1993 | Beldock et al. ............. 429/9 |
| 5,185,218 A | 2/1993 | Brokman et al. |
| 5,190,833 A | 3/1993 | Goldstein et al. |
| 5,196,275 A | 3/1993 | Goldman et al. |
| 5,242,765 A | 9/1993 | Naimer et al. |
| 5,250,370 A | 10/1993 | Faris |
| 5,260,144 A | 11/1993 | O'Callaghan |
| 5,306,579 A | 4/1994 | Shepard et al. |
| 5,312,701 A | 5/1994 | Khasin et al. |
| 5,318,861 A | 6/1994 | Harats et al. |
| 5,328,777 A | 7/1994 | Bentz et al. |
| 5,328,778 A | 7/1994 | Woodruff et al. |
| 5,354,625 A | 10/1994 | Bentz et al. |
| 5,360,680 A | 11/1994 | Goldman et al. |
| 5,362,577 A | 11/1994 | Pedicini |
| 5,366,822 A | 11/1994 | Korall et al. |
| 5,387,477 A | 2/1995 | Cheiky |
| 5,389,456 A | 2/1995 | Singh et al. |
| 5,405,713 A | 4/1995 | Pecherer et al. |
| 5,411,592 A | 5/1995 | Ovshinsky et al. |
| 5,418,080 A | 5/1995 | Korall et al. |
| 5,439,758 A | 8/1995 | Stone et al. |
| 5,447,805 A | 9/1995 | Harats et al. |
| 5,462,816 A | 10/1995 | Okamura et al. |
| 5,486,429 A | 1/1996 | Thibault |
| 5,512,384 A | 4/1996 | Celeste et al. |
| 5,525,441 A | 6/1996 | Reddy et al. |
| 5,532,086 A | 7/1996 | Thibault et al. |
| 5,536,592 A | 7/1996 | Celeste et al. |
| 5,554,452 A | 9/1996 | Delmolino et al. |
| 5,563,004 A * | 10/1996 | Buzzelli et al. ............. 429/27 |
| 5,569,551 A | 10/1996 | Pedicini et al. |
| 5,582,931 A | 12/1996 | Kawahami |
| 5,599,637 A | 2/1997 | Pecherer et al. |
| 5,691,074 A | 11/1997 | Pedicini |
| 5,711,648 A | 1/1998 | Hammerslag |
| 5,721,064 A | 2/1998 | Pedicini et al. |
| 5,726,551 A | 3/1998 | Miyazaki et al. |
| 5,756,228 A | 5/1998 | Roseanou |
| 5,771,476 A | 6/1998 | Mufford et al. |
| 5,904,999 A | 5/1999 | Kimberg et al. |
| 5,978,283 A | 11/1999 | Hsu et al. |
| 6,057,052 A | 5/2000 | Shrim et al. |
| 6,153,949 A * | 11/2000 | Söperhäll .................. 307/125 |

OTHER PUBLICATIONS

Battery Chargers by Mike Allen, Popular Mechanics, 1991, pp. 30–31 (Sep.).

New Age EVs by Herb Schuldner, Popular Mechanics, 1991, pp. 27–29 (Sep.).

Marketing Study for AER Energy Resources, Inc. by Authors not indicated, AER Energy Resources, Inc., 1991, pp. 6–28 (Month Unknown).

Electric Car Showdown in Phoenix by Rick Cook, Popular Science, 1991, pp. 64–65,82 (Jul.).

Batteries For Cordless Appliances by Ralph J. Brodd, Ch. 3 of Batteries for Cordless Appliances, 1987, pp. 49–59 (Month N/A).

PCT/US98/21257, Search Report, Apr. 1999.

PCT/US98/21260, Search Report, Feb. 1999.

PCT/US98/21256, International Search Report, Feb. 1999.

Convert 3V To 5V Without Inductors by , Maxim Integrated Products; http://www.maxim–ic.com, vol. 92, 2000, pp. 1–3 (Month Unknown).

Derive 5V From Four AA Cells by , Maxim Integrated Products; http://www.maxim–ic.com, vol. 128, 2000, pp. 1–2 (Month Unknown).

Boost/Linear Regulator Derives 5B From Four Cells by , Maxim Integrated Products, http://www.maxim–ic.com, 2000 (Month Unknown).

Fuel Cell Technology & Applications, http://www.metallicpower.com/rtfuel.htm by , Metallic Power, Inc., 1999 (Month Unknown).

Fuel Cells and Their Applications by Karl Kordesch and Gunter Simader, VCH Publishers, Inc., New York NY, Chapters 4.8.1–4.8.2, 1996, pp. 158–162 (Month N/A).

LBL Researchers Work on New Generation of Batteries by Jeffery Kahn, www.lbl.gov/Science–Articles/Archive/battery–development–at–lbl.html, 1990, pp. 1–6 (Month Unknown).

* cited by examiner

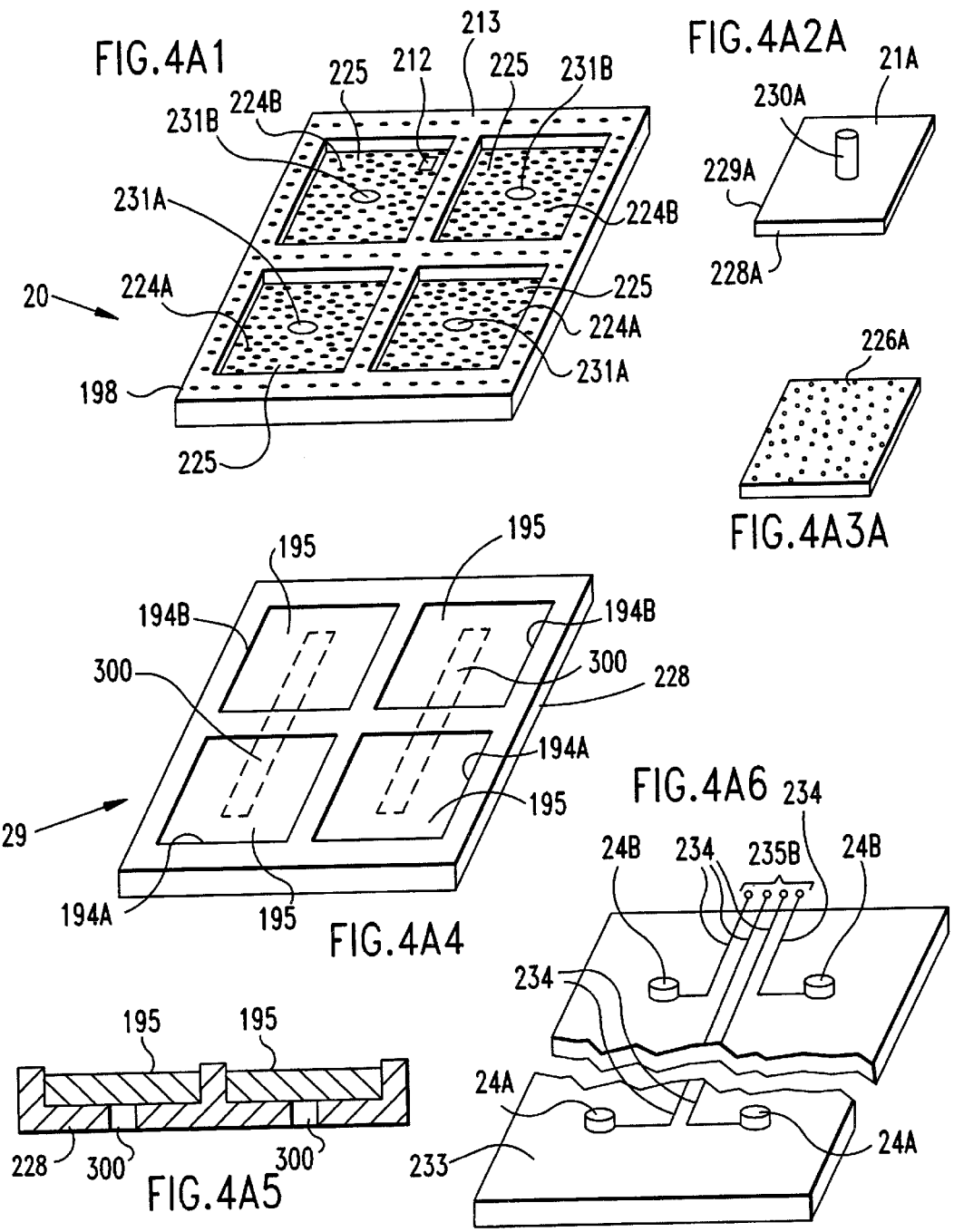

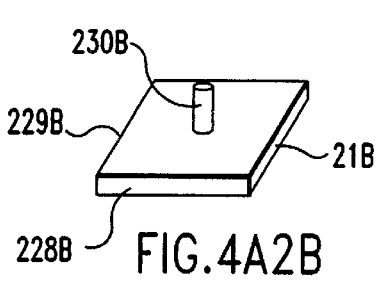
FIG.4A2B
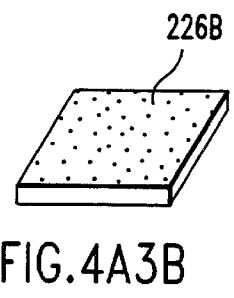
FIG.4A3B
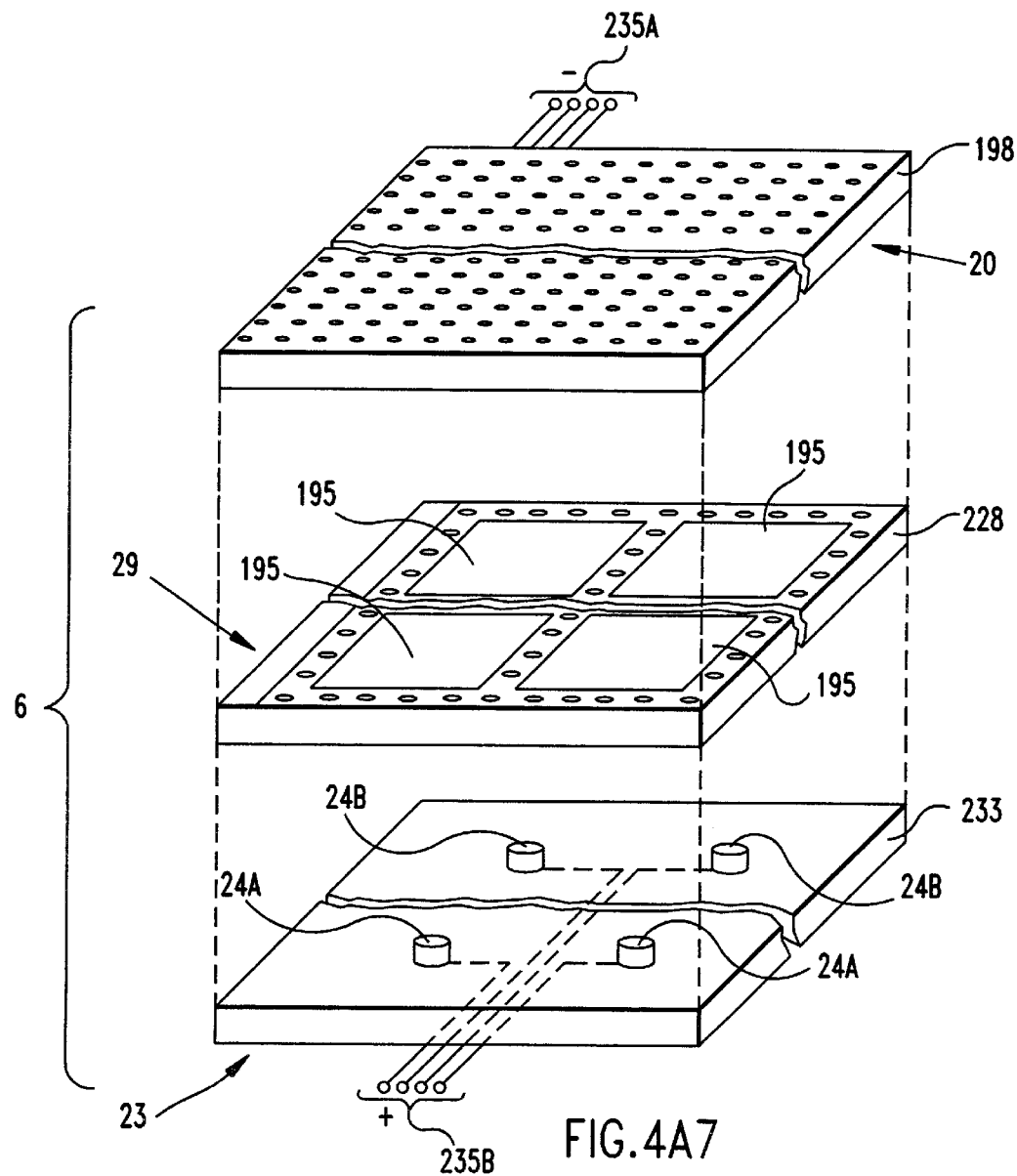
FIG.4A7

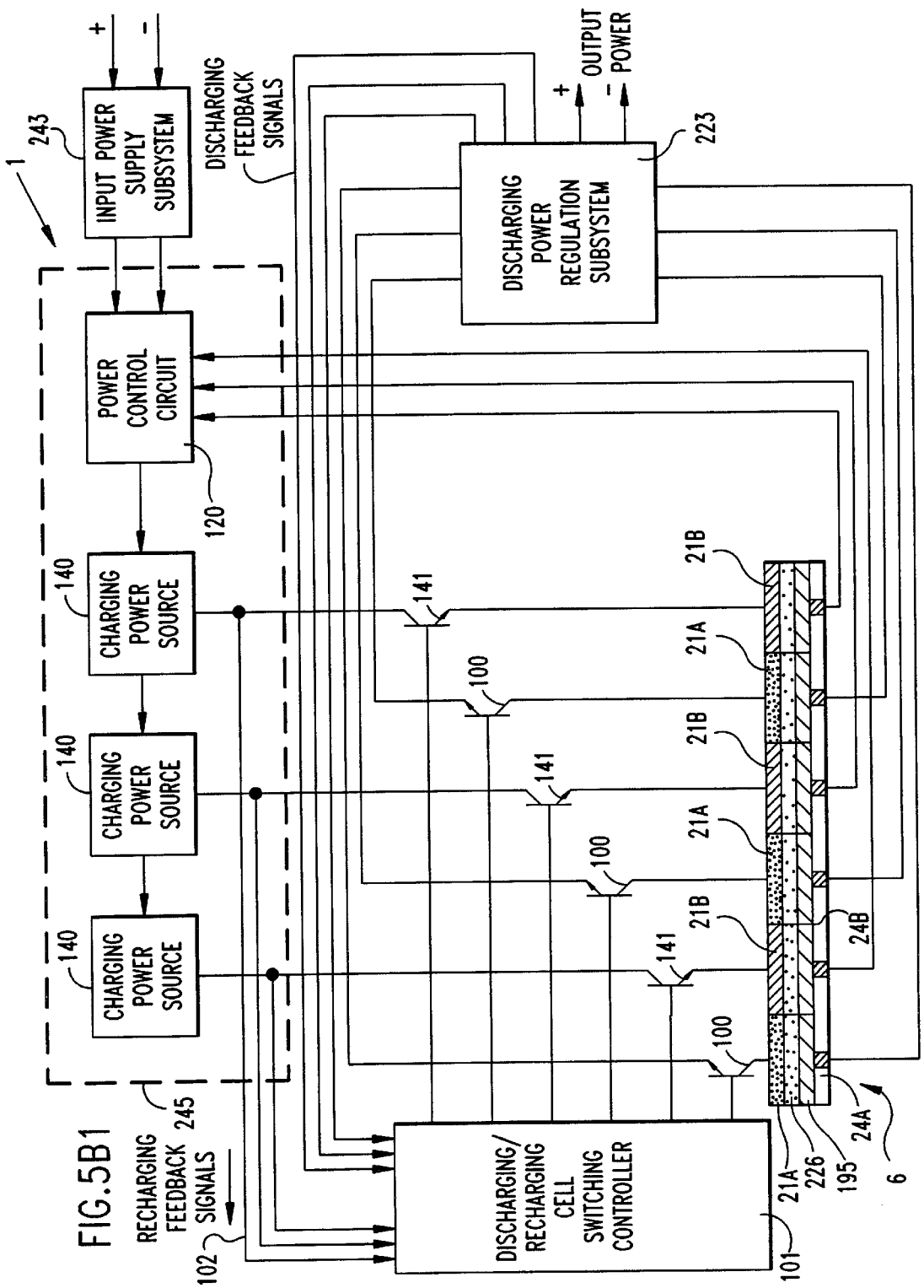

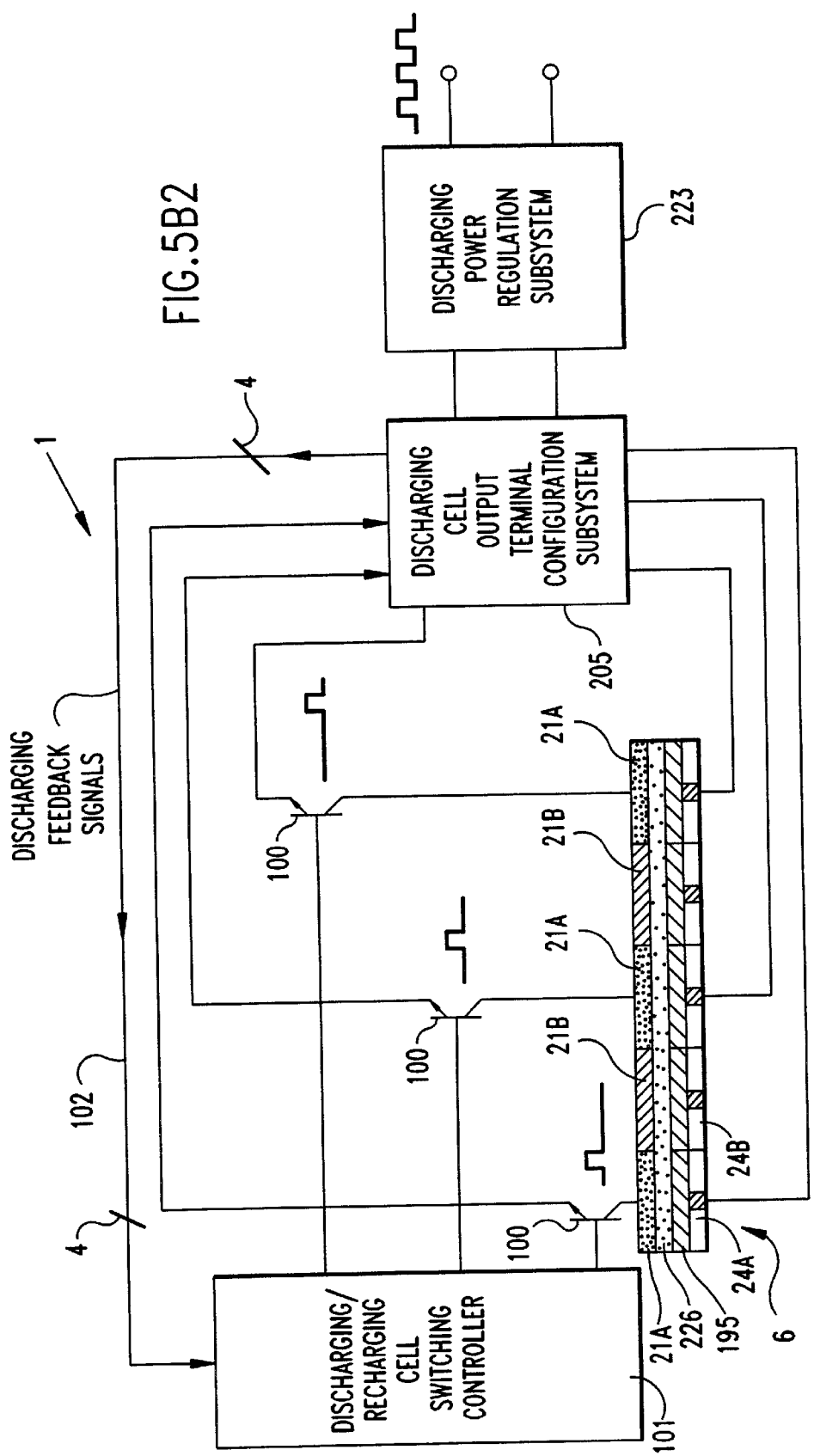

FIG.6B
DISCHARGE DATA STRUCTURE

| FUEL-TAPE CARD NO. | METAL-FUEL ZONE NO. 1 | METAL-FUEL ZONE NO. 2 | METAL-FUEL ZONE NO. 3 | METAL-FUEL ZONE NO. 4 |
|---|---|---|---|---|
| TIME $t_1$ | $V_{oc}$ / $i_{oc}$ / $PO_2$ / $H_2O\%$ / $T_{ac}$ / COMPUTED PARAMETERS — 409 | | | |
| TIME $t_2$ | | | | |
| TIME $t_3$ | | | | |
| TIME $t_4$ | | | | |
| TIME $t_5$ | | | | |
| ⋮ | ⋮ | ⋮ | ⋮ | ⋮ |
| TIME $t_n$ | | | | |

FIG.6C
RECHARGE DATA STRUCTURE

| FUEL-TAPE CARD NO. | METAL-FUEL ZONE NO. 1 | METAL-FUEL ZONE NO. 2 | METAL-FUEL ZONE NO. 3 | METAL-FUEL ZONE NO. 4 |
|---|---|---|---|---|
| TIME $t_1$ | $V_{oc}$<br>$i_{oc}$<br>$PO_2$<br>$H_2O\%$<br>$T_{ac}$<br>COMPUTED PARAMETERS — 410 | | | |
| TIME $t_2$ | | | | |
| TIME $t_3$ | | | | |
| TIME $t_4$ | | | | |
| TIME $t_5$ | | | | |
| ⋮ | ⋮ | ⋮ | ⋮ | ⋮ |
| TIME $t_n$ | | | | |

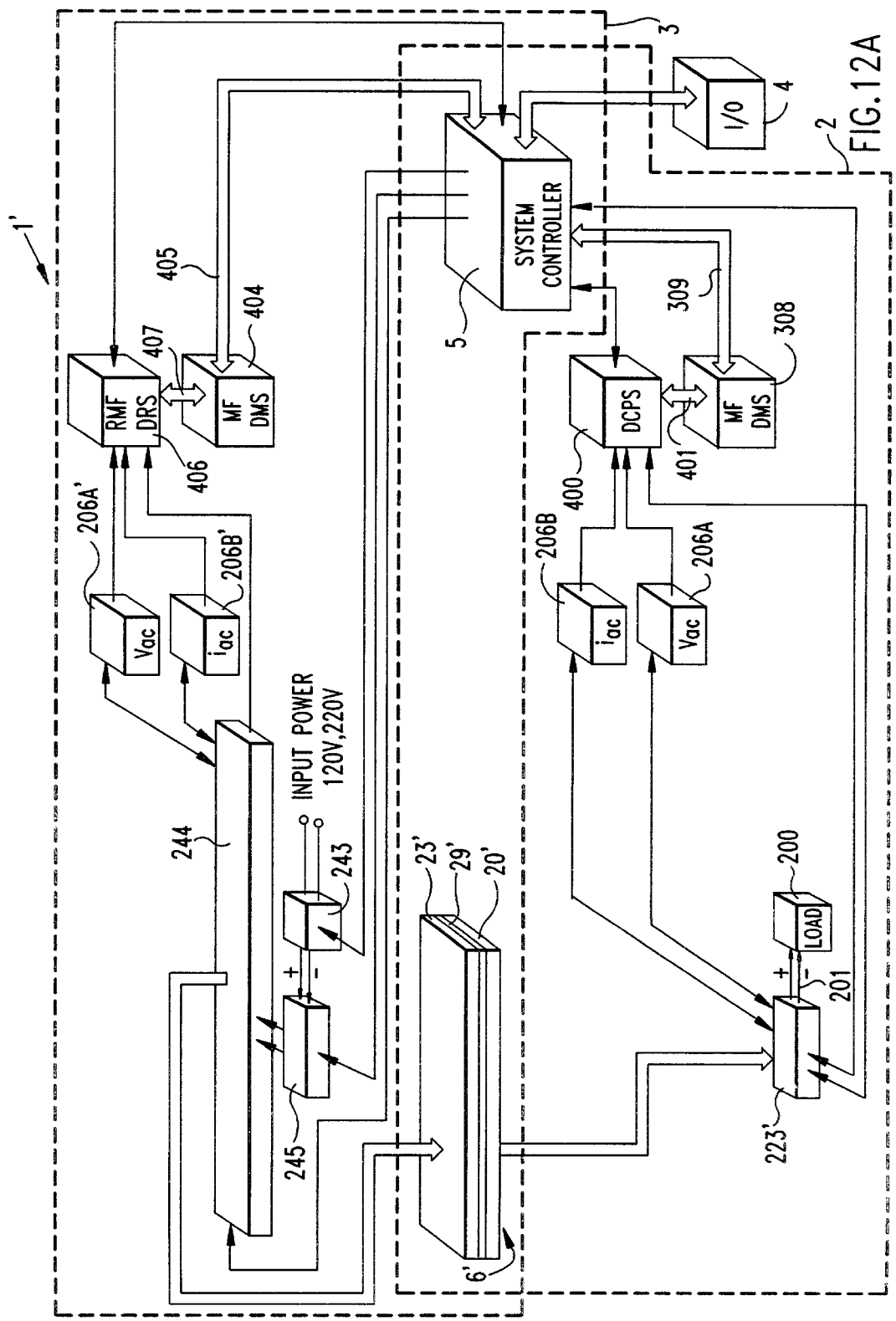

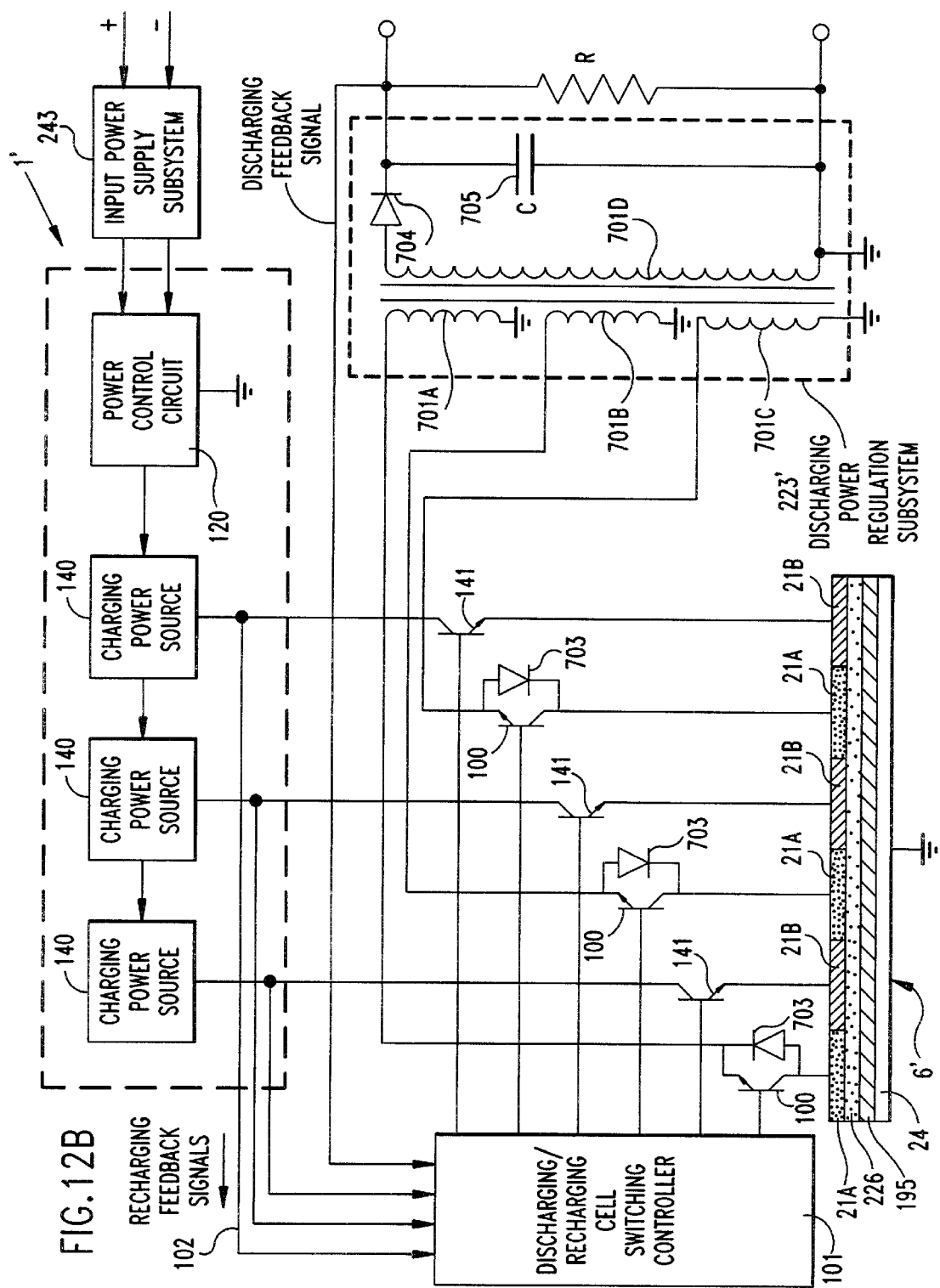

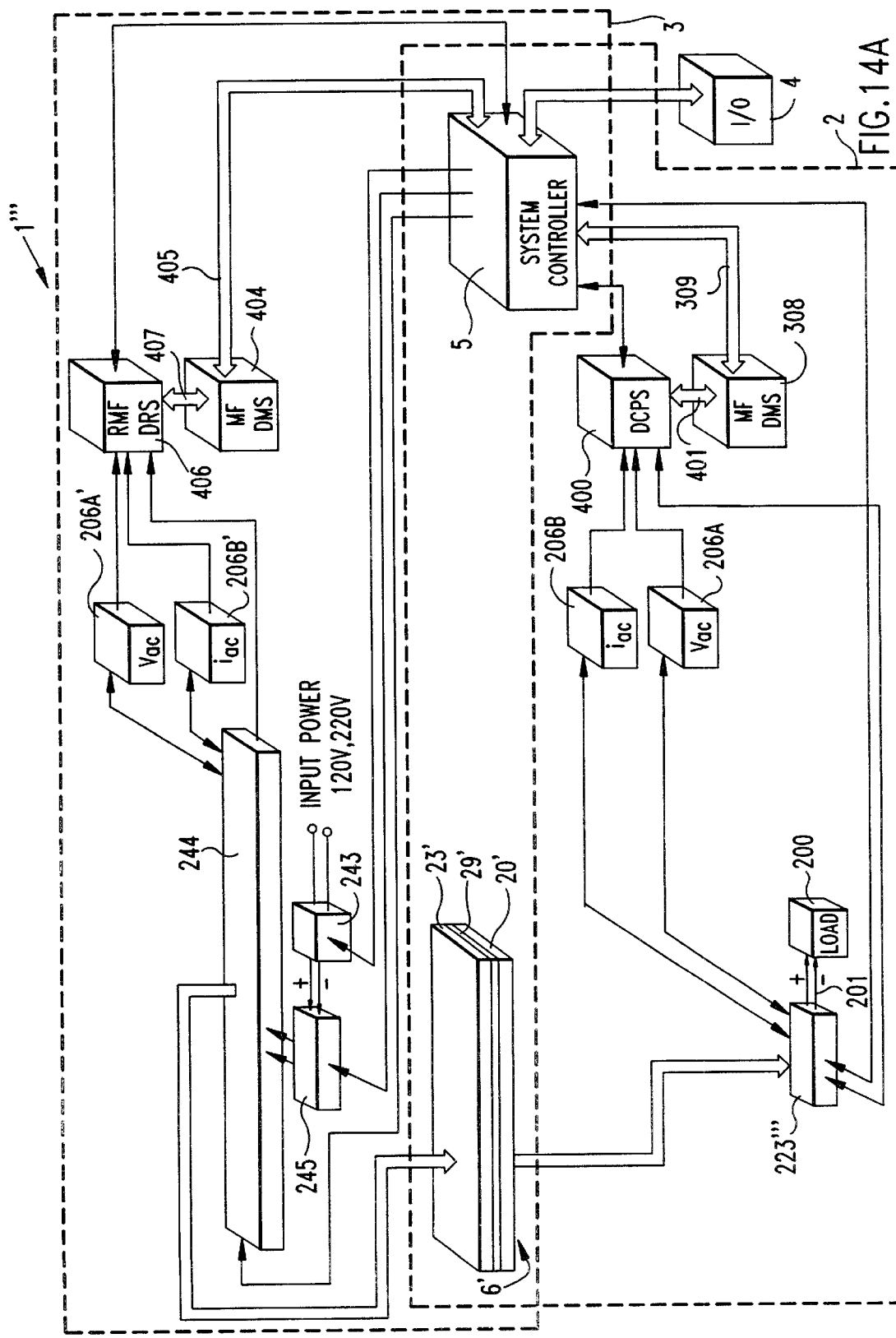

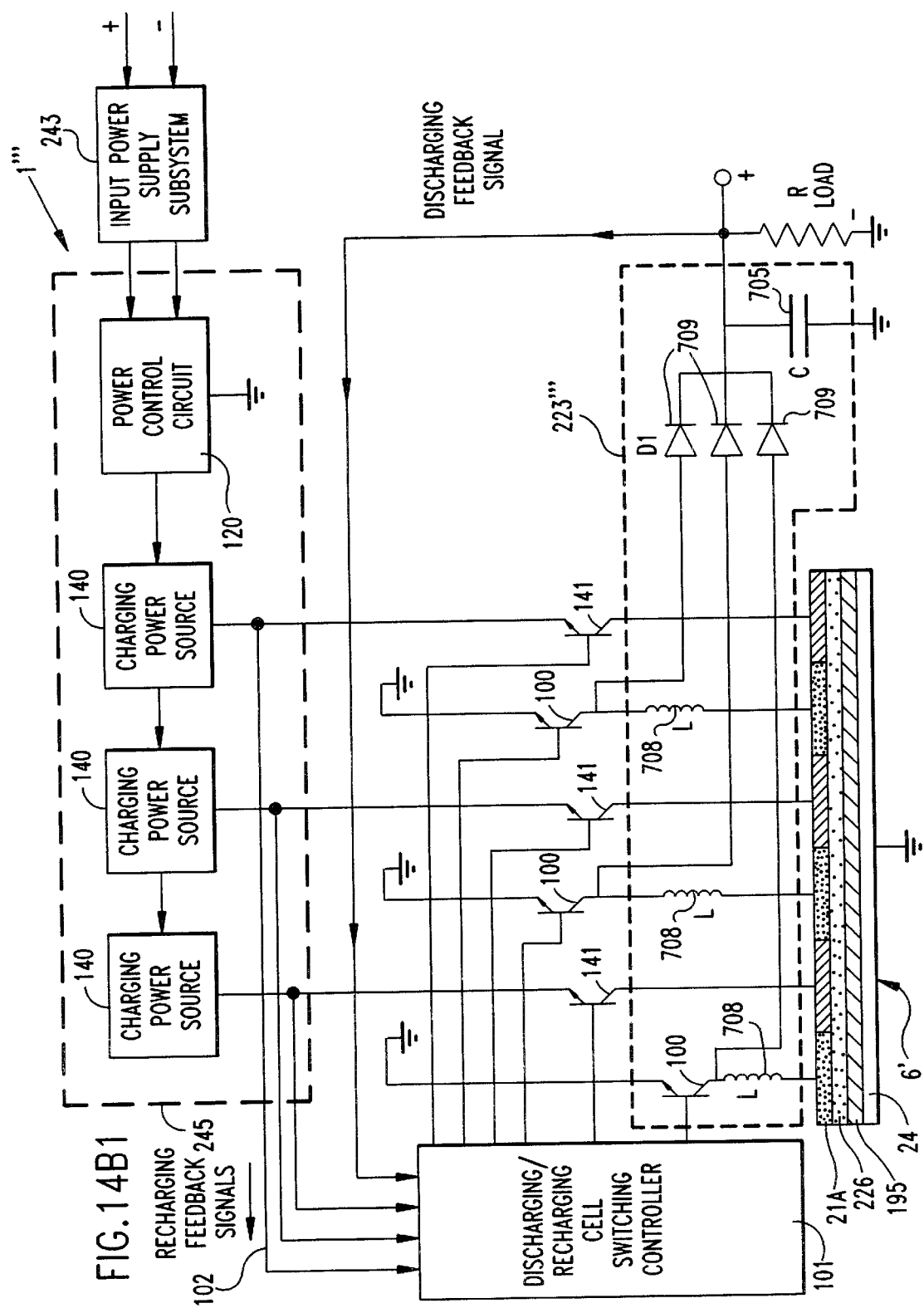

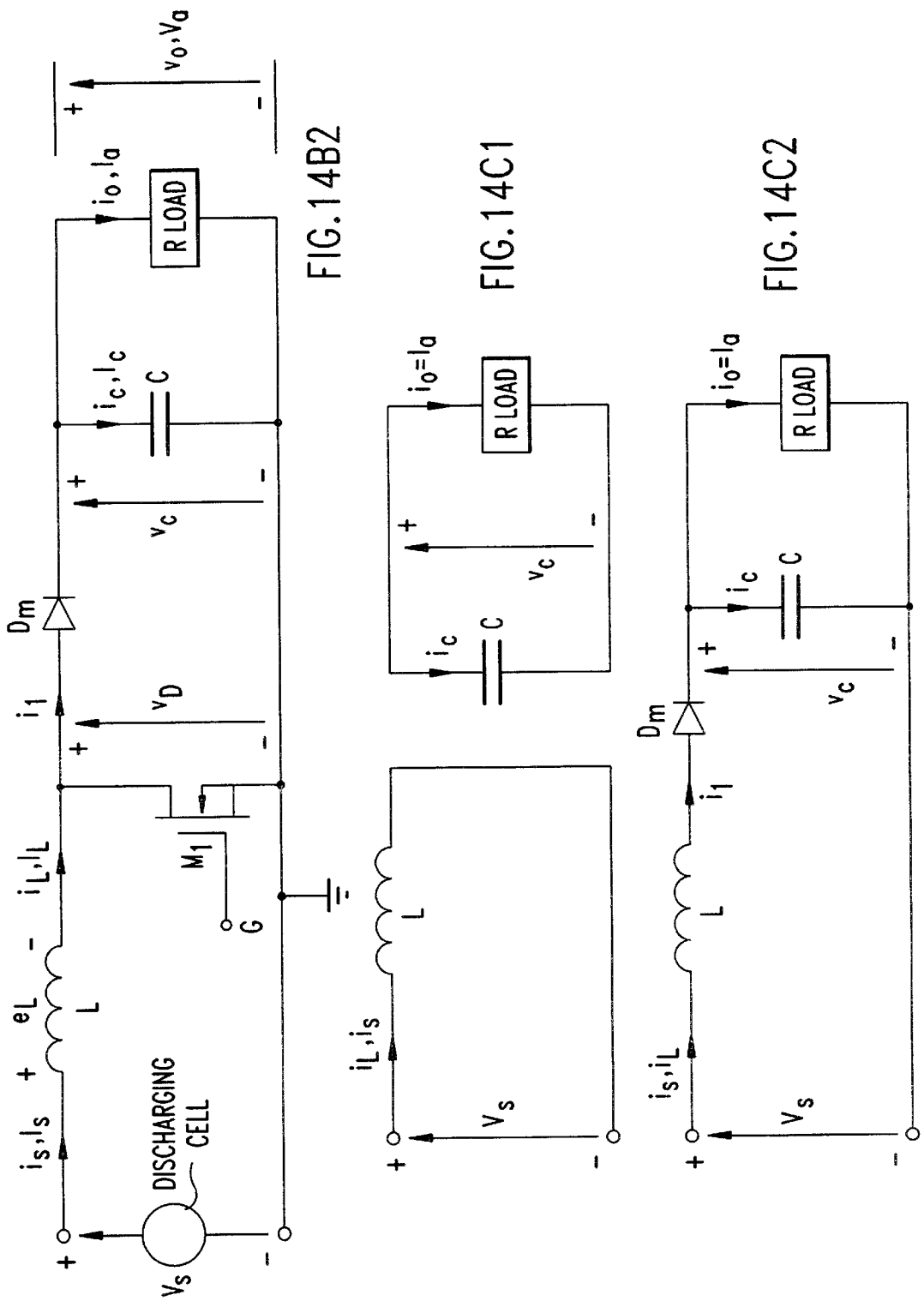
FIG.14B2
FIG.14C1
FIG.14C2

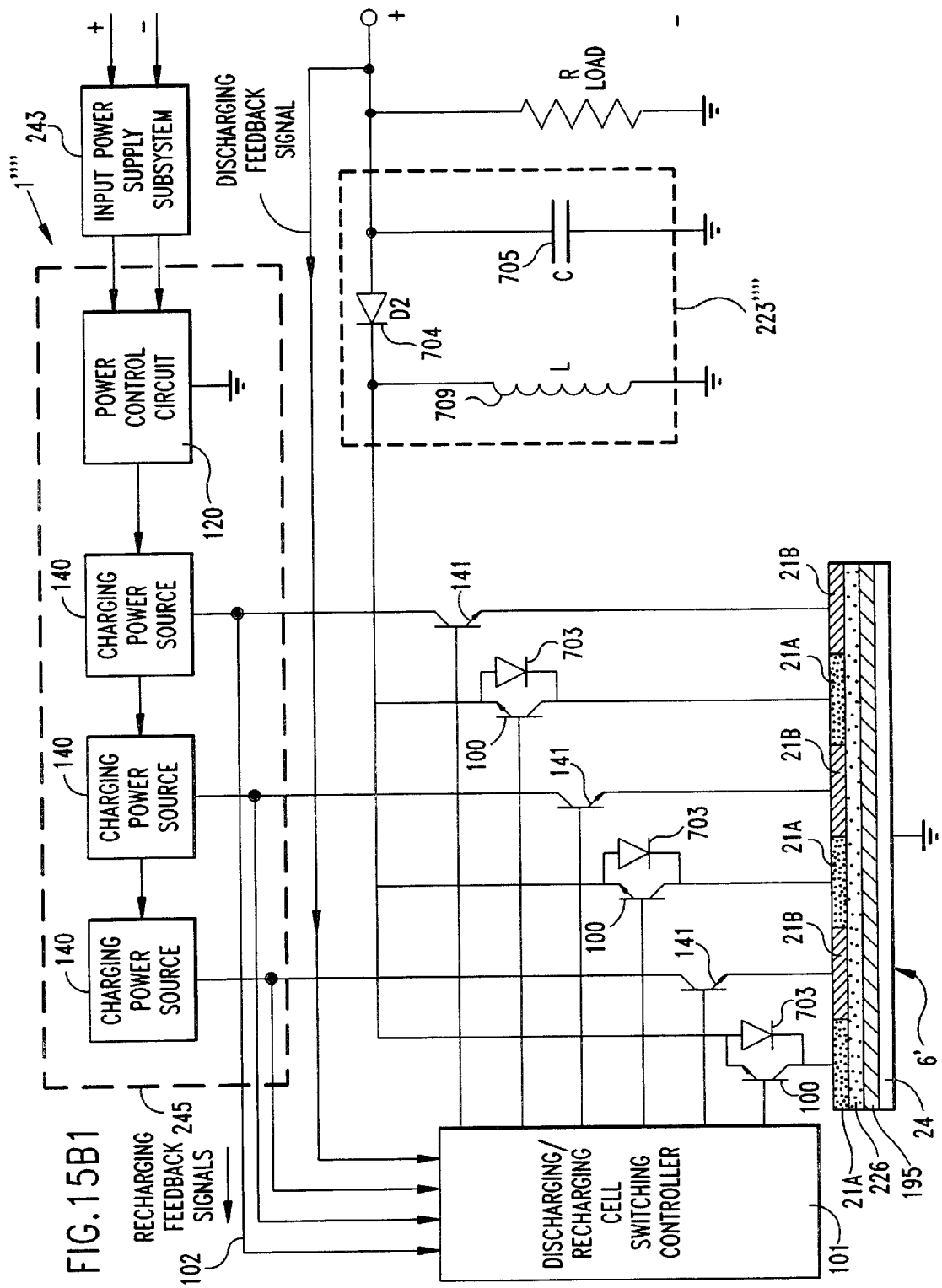
FIG.15B1

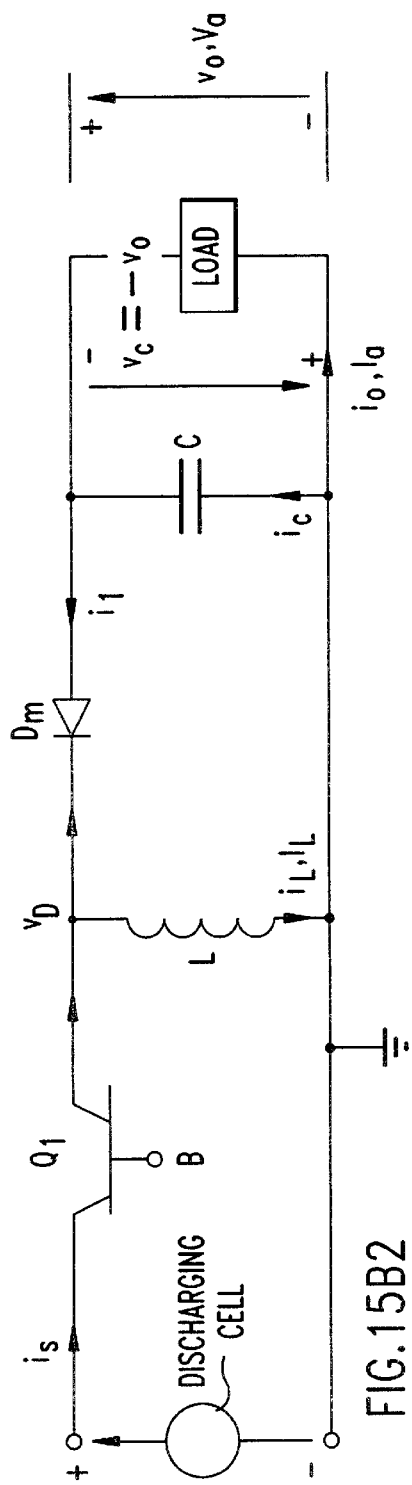
FIG.15B2
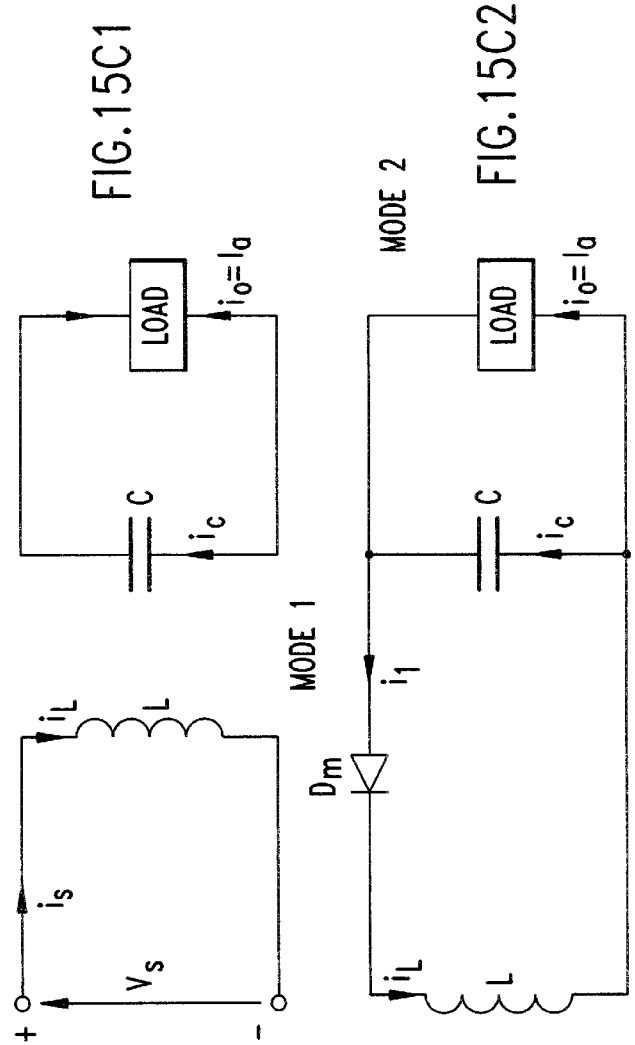

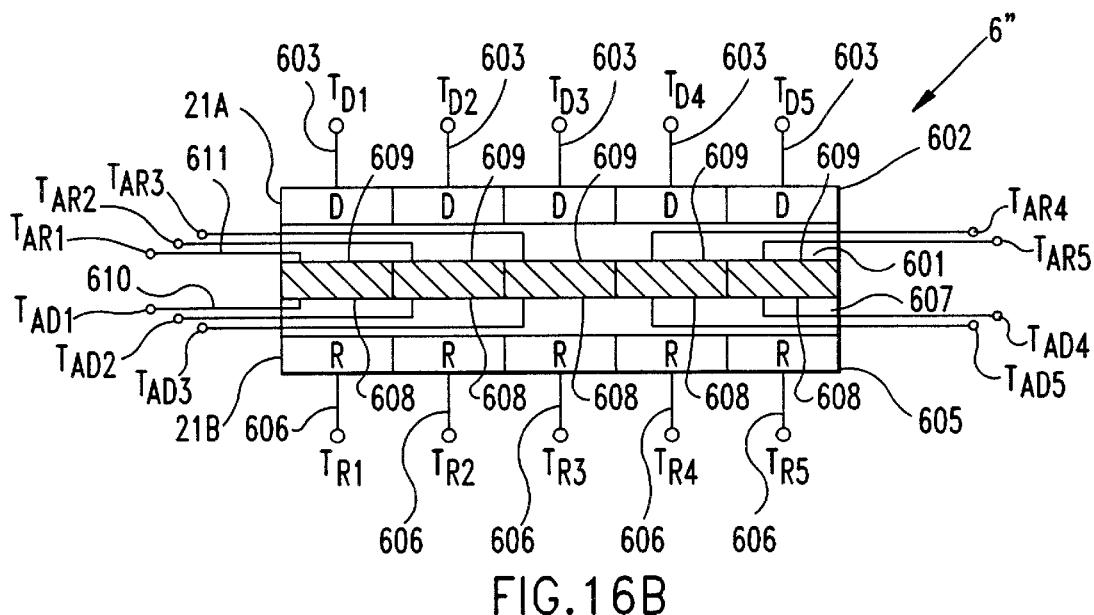

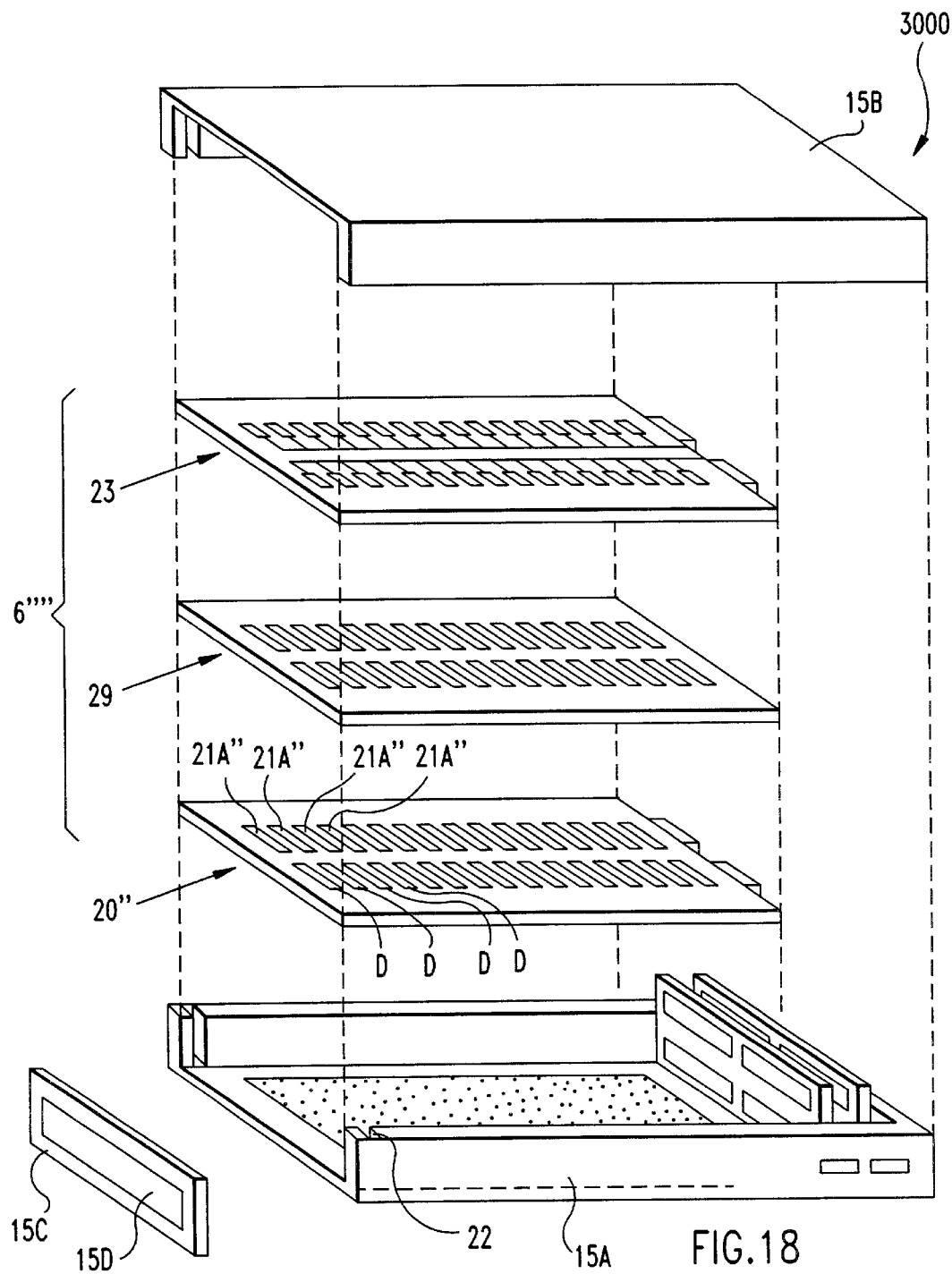

ELECTRO-CHEMICAL POWER GENERATION SYSTEMS EMPLOYING ARRAYS OF ELECTRONICALLY-CONTROLLABLE DISCHARGING AND/OR RECHARGING CELLS WITHIN A UNITY SUPPORT STRUCTURE

RELATED CASES

This is a Continuation-in-Part of: application Ser. No. 09/167,148 entitled "Metal-Air FCB-Based Power Producing Modules And Metal-Fuel Card And Cathode Cartridges For Use Therewith" by Sadeg M. Faris and Tsepin Tsai filed Oct. 6, 1998, now U.S. Pat. No. 6,3 48,277; application Ser. No. 09/143,895 entitled "Metal-Air Fuel Cell Battery System Employing Metal Fuel Cards", now U.S. Pat. Nos. 6,309,771 and 09/143,889, entitled "Metal-Fuel Card Construction For Use In Metal-Air Fuel Cell Battery Systems" each filed Aug. 31, 1998 and each being a Continuation of application Ser. No. 08/944,507 entitled "System And Method For Producing Electrical Power Using Metal-Air Fuel Cell Battery Technology" by Sadeg Faris, et al. filed Oct. 6, 1997, now U.S. Pat. No. 6,296,960; application Ser. No. 09/112,596 entitled "Metal-Air Fuel Cell Battery System Having Mechanism For Extending The Path-Length Of Metal-Fuel Tape During Discharging And Recharging Modes Of Operation" by Sadeg M. Faris and Tsepin Tsai filed Jul. 9, 1998, now U.S. Pat. No. 6,228,519; application Ser. No. 09/232,328 entitled "Ionically Conductive Belt Structure For Use In A Metal-Air Fuel-Cell Battery System And Method Of Fabricating The Same" by Sadeg M. Faris et al. filed Aug. 10, 1998, now U.S. Pat. No. 6,228,519; and application Ser. No. 09/232,327 entitled "Cathode Cylinder For Use In Metal-Air Fuel Cell Battery Systems And Method Of Fabricating The Same" by Sadeg M. Faris filed Aug. 10, 1998, now U.S. Pat. No. 6,218,034, and application Ser. No.09/232,326 entitled "Cathode Belt Structure For Use In A Metal-Air Fuel-Cell Battery System And Method Of Fabricating The Same" by Sadeg M. Faris et al., filed Aug. 10, 1999, now U.S. Pat. No. 6,365,292, each being a Continuation of application Ser. No. 09/110,762 entitled "Metal-Air Fuel Cell Battery System Employing Metal-Fuel Tape And Low-Friction Cathode Structures" by Sadeg M. Faris et al., filed Jul. 3, 1998, now U.S. Pat. No. 6,29,997; application Ser. No. 09/126,213 entitled "Metal-Air Fuel-Cell Battery System Having Means For Discharging And Recharging Metal-Fuel Cards Supplied From A Cassette-Type Storage Device" by Sadeg M. Faris, filed Jul. 30, 1998, now U.S. Pat. No. 6,312,844 which is a Continuation of copending application Ser. No. 09/074,337 entitled "Metal-Air Fuel-Cell Battery Systems" by Sadeg M. Faris and Le Li, filed May 7, 1998; application Ser. No. 09/130,341 entitled "Metal-Air Fuel Cell Battery System Having Means For Means For Managing Controlling Discharging And Recharging Parameters In Real-Time For Improved Operating Efficiency" by Sadeg M. Faris and Tsepin Tsai filed Aug. 6, 1998, now U.S. Pat. No. 6,287,715; copending application Ser. No. 09/130,325 entitled "Metal-Air Fuel Cell Battery System With Means For Recording And Reading Operating Parameters During Discharging And Recharging Modes Of Operation" by Sadeg M. Faris and Tsepin Tsai, filed Aug. 6, 1998; application Ser. No. 09/116,643 entitled "Metal-Air Fuel Cell Battery System Having Means For Simultaneously Discharging And Recharging A Plurality Of Metal-Fuel Cards" by, Sadeg M. Faris et al., filed on Oct. 6, 1998, now U.S. Pat. No. 6,306,534; copending application Ser. No. 09/120,583 entitled "Metal-Air Fuel Cell Battery System Having Bi-Directional Transport for Metal-Fuel Tape And Management Of Metal-Fuel Tape Therealong" by Sadeg M. Faris filed Jul. 22, 1998; application Ser. No. 09/164,063 entitled "Electrical Power Generation System Having Means For Managing The Availability Of Metal-Fuel Among A Network Of Metal-Air Fuel Cell Battery Systems" by Sadeg M. Faris, filed Sep. 30, 1998, now U.S. Pat. No. 6,239,508; copending application Ser. No. 09/133,166 entitled "Metal-Air Fuel Cell battery System Employing Hydrostatic Forces To Enable Simultaneous Transport Of Metal-Fuel Tape, Moveable Cathode Structure, And Ionically-Conductive Medium Therethrough During System Operation" by Sadeg M. Faris et al., filed Aug. 12, 1998, which is a Continuation of application Ser. No. 09/110,761 entitled "Metal-Air Fuel Cell Battery System Employing A Plurality Of Moving Cathodes Structures, For Improved Volumetric Power Density" by Sadeg M. Faris et al., filed Jul. 3, 1998, now U.S. Pat. No. 6,335,111; application Ser. No. 09/167,148 entitled "Metal-Air FCB-Based Power Producing Modules And Metal-Fuel Cards And Cathode Cartridges For Use Therewith" by Sadeg M. Faris et al., filed Oct. 6, 1998, now U.S. Pat. No. 6,348,277; each said application being assigned to Reveo, Inc. and incorporated herein by reference in its entirely.

BACKGROUND OF INVENTION

1. Field of Invention

This present invention relates generally to improvements in the field of rechargeable batteries, and more particularly to improvements in metal-air batteries, including metal-air fuel cell battery (FCB) systems which have both discharging and recharging modes of operations.

2. Brief Description of the State of Knowledge in the Art

In recent times, metal-air fuel cell battery (FCB) systems have received great recognition for their ability to produce large amounts of electrical power from relatively small size devices. During power generation, a metal-fuel structure such as zinc is positioned over a cathode structure in the presence of an ionically-conducting medium, such as an electrolyte-impregnated gel or electrolyte solution. In accordance with well known principles of electro-chemistry, as electrical power is produced from the system the metal-fuel structure is oxidized. Examples of prior art metal-air FCB systems are disclosed in Applicants' U.S. Pat. No. 5,250,370 incorporated herein by reference.

In U.S. Pat. No. 5,250,370, Applicant discloses an improved method of and system for recharging oxidized metal-fuel tape used in prior art metal-air FCB systems. During power generation, metal-fuel tape is transported over a stationary cathode structure in the presence of an ionically-conducting medium, such as an electrolyte-impregnated gel. In U.S. Pat. No. 5,250,370, a recharging head is installed downstream from the discharging head for carrying out recharging operations when the metal-fuel tape has been completely oxidized. In order to enable quicker recharging of metal-fuel tape for reuse in FCB discharging operations, the cathode surface of the recharging head is made substantially greater than the cathode surface of the discharging head. While this arrangement allows for recharging of metal fuel tape, it requires a separate recharging head assembly in order to efficiently carry out recharging operations, in an energy efficient manner. This increases the manufacturing cost of the overall system, and containing the head assemblies within a compact housing quite difficult.

In Applicants' U.S. Pat. No. 6,296,960 Applicants disclose a metal-air fuel cell battery system having a hybrid discharging/recharging head assembly for carrying out discharging and recharging operations as required. In this FCB system design, the recharging head assembly is spaced apart from the discharging assembly, for selectively recharging discharged regions of metal fuel tape.

In Applicants' copending U.S. application Ser. No. 09/074,337, Applicants also disclose a FCB power generation system that produces electrical power by discharging metal-fuel having the form factor of cards and sheets. When the metal-fuel cards are discharged (i.e. oxidized), the metal-fuel cards can be recharged by being reduced by a recharging head assembly provided within the system.

However, despite such advances in rechargeable metal-air FCB systems, prior art metal-air FCB systems, in general, suffer from an number of shortcomings and drawbacks that have made commercial success difficult to attain, namely: (1) some systems and devices employ bi-functional cathode structures which are energy-inefficient and have a relatively short cycle life (e.g. about 40 or so recharging cycles) due to the production of gas bubbles inside the porous cathode structure caused by the recharging action; (2) many systems and devices employ separate recharging head assemblies for recharging metal-fuel structures, which increases the manufacturing cost of the overall system, while containing the head assemblies in a compact housing; (3) some systems employ metal-fuel anode structures having large surface areas which are very difficult to discharge in an uniform manner due to the formation of "spots" during recharging operations which provide places for zinc tree-like structures (referred to as "dendrites") to grow and locations where short-circuiting can occur; (4) some systems and devices employ metal anode structures that undergo significant shape change during recharging operations; (5) some systems and devices employ the electrolyte-pervious metal anode structures from which "dendrites" often grow from towards the cathode structures, eventually shorting-out the power cell structure and thus reducing the cycle life thereof; and (6) some systems and devices employ the metal anode structures that undergo densification during repeated recharging and discharging cycles, thus reducing the cycle life of the power cell structures therewithin as well.

Thus, there is a great need in the fuel-cell battery art for alternative ways and means of electrochemically producing electrical power from metal-air fuel cell battery systems as well as recharging the same as needed, while overcoming the shortcomings and drawbacks of prior art technologies known in the fuel-cell battery field.

OBJECTS AND SUMMARY OF THE INVENTION

Accordingly, a primary object of the present invention is to provide an improved system and method of discharging and/or recharging electro-chemical battery systems and devices, while avoiding the shortcomings and drawbacks of prior art methodologies.

Another object of the present invention is to provide an improved metal-air FCB system, wherein different types of cathode elements are embodied within an integrated support structure in order to achieve improvements in discharging and/or recharging operations, as well as the overall performance of the electrical power generating systems and devices employing the same.

Another object of the present invention is to provide an integrated cathode structure having a plurality of relatively small cathode elements spatially arranged on a cathode support structure, in combination with a plurality of anode-contacting elements spatially arranged on an anode-contacting element support plate, wherein each cathode element is in spatial registration with one of the anode-contacting elements so as to form either a discharging and/or recharging cell that is independently activatable (i.e. enabled) using a solid-state transistor switching technology under the control of a cell switching controller embodied within an electrical power generating module.

Another object of the present invention is to provide such an integrated cathode structure, wherein control over each cell can be achieved by monitoring the cell voltage and/or current during discharging or recharging operations, and then measuring the voltages and/or currents and comparing the same with reference measures to ensure that a particularly selected power, voltage and/or current control method is being carried out in a desired manner.

Another object of the present invention is to provide such an integrated cathode structure, wherein if any cell has lower than normal voltage value thereacross, then the cell switching controller, can automatically determine (by computation) to skip this section during normal discharge, and after a certain period of time, the cell switching controller can return to recheck the status of the skipped cell and decide to "fix/repair" or abandon the same.

Another object of the present invention is to provide such an integrated cathode structure, wherein thinner current conductors can be used to collect the same amount of current within a discharging head assembly.

Another object of the present invention is to provide such an integrated cathode structure which, when used for recharging metal-fuel like structures, enables the recharging power to be evenly distributed among the cathode elements, or in a manner precisely controlled according to feedback signals derived therewhile, so as to achieve uniform recharging and avoidance of dendrite growth, thereby increasing the anode cycle life.

Another object of the present invention is to provide an improved metal-air FCB system, having a hybrid discharging/recharging head assembly which comprises a first array of cathode elements (i.e. segments) that are a disposed on a common support substrate and optimized/designed for use in discharging operations, and a second array of recharging cathode structures also disposed on the common support substrate but optimized/designed for use in recharging operations in order to avoid fast degradation of the cathode and anode elements, while increasing the overall efficiency of the system during discharging and recharging operations.

Another object of the present invention is to provide such improved metal-air FCB system, wherein a first array of anode-contacting elements are provided in spatial registration to the first array of cathode elements (i.e. segments) so as to produce a first plurality of discharging cells for loading metal-fuel material therewithin and generating electrical power therefrom during discharging operations, and a second array of anode-contacting elements are provided in spatial registration to the second array of cathode elements (i.e. segments) so as to produce a second plurality of recharging cells for loading discharged metal-fuel material therewithin and supplying electrical power thereto during recharging operations.

Another object of the present invention is to provide such improved metal-air FCB system, wherein the first and second plurality of discharging and recharging cells are realized within a unity support structure or subassembly, and each discharging cell and/or recharging cell is electronically-controllable in order to carry out any one of a number of power, voltage and/or current control methods under microprocessor control.

A further object of the present invention is to provide such an improved rechargeable metal-air fuel cell battery (FCB) system having both high energy density characteristics as well as improved discharge/recharge cycle lifetimes.

Another object of the present invention is to provide such an improved rechargeable metal-air FCB system, wherein the first plurality of discharging cells and the second plurality of recharging cells are spatially arranged in the form of a "mosaic-like" structure.

Another object of the present invention is to provide such an improved rechargeable FCB system, wherein each discharging-optimized cathode element and each recharging-optimized cathode element in the hybrid discharging/recharging head assembly is switched into operation (i.e. activated) by a programmed microprocessor.

Another object of the present invention is to provide such an improved rechargeable metal-air FCB system, wherein the "mosaic-like" structure is realized within a relatively thin structure and within which a multi-element or single-element metal-fuel card can be disposed for discharging and recharging operations alike.

Another object of the present invention is to provide such an improved rechargeable metal-air FCB system, wherein the metal-fuel card can be manually or electro-mechanically translated into its discharging configuration as well as its recharging position, for operation during discharging and recharging operations, respectively.

Another object of the present invention is to provide such an improved rechargeable metal-air FCB system, wherein the metal-fuel card can be electro-mechanically forced to undergo micro-displacements, relative to the recharging-optimized cathode elements, along the longitudinal direction of the recharging cells during recharging operations, in order to inhibit growth of dendrite formations along the metal fuel elements or regions being recharged.

Another object of the present invention is to provide such an improved rechargeable metal-air FCB system, wherein discharging operations and recharging operations can be carried out at different times or simultaneously, as the application or situation may require.

Another object of the present invention is to provide such an improved rechargeable metal-air FCB system for installation within the battery storage compartment formed in a cellular phone, laptop computer system, or any other electrical power consuming device.

Another object of the present invention is to provide such an improved rechargeable metal-air FCB system, wherein the use of special bi-functional electrodes are completely avoided, while producing conditioned electrical power for driving electrical loads under optimized discharging conditions, as well as receiving conditioned electrical power for recharging discharged metal-fuel structures under optimized recharging conditions.

Another object of the present invention is to provide an improved rechargeable metal-air FCB system, wherein the anode elements are positioned and vibrated relative to the recharging-optimized cathode elements along the metal-fuel card during recharging operations in order to cause the anode elements to have a different direction of re-disposition, thereby reducing dendrite growth and anode shape change during recharging operations, and increasing the number of recharging cycles of the metal-fuel card (e.g. greater than 100) as well as the depth-of-discharge (DOD) within the anode structure to increase energy density of the system.

Another object of the present invention is to provide such an improved rechargeable metal-air FCB system, wherein the segmented cathode construction of the present invention enables improved oxygen transport to the discharging cells thereof to increase the energy density of the system, and also enables improved oxygen evacuation from the recharging cells thereof to increase the energy efficiency of the system.

Another object of the present invention is to provide such an improved rechargeable metal-air FCB system having high energy density and low manufacturing cost, using an environmentally friendly technology having diverse applications including, for example, electric vehicles.

Another object of the present invention is to provide such an improved rechargeable metal-air FCB system, wherein relatively low-current electrical conductors and electronically-controlled power switching circuits are used to selectively recharge particular sections of a loaded metal-fuel structure that have been partially or completely discharged during power generation operations.

Another object of the present invention is to provide such an improved rechargeable metal-air FCB system, wherein small and electrically isolated electrode elements are used so that currents produced therefrom during discharging operations can be handled using thin current collector structures and low-power rating semiconductor switching elements.

Another object of the present invention is to provide such an improved rechargeable metal-air FCB system, wherein a plurality of recharging-optimized cathode element structures are electrically-switched into operation for recharging selected regions of discharged metal-fuel in order to attain increased levels of recharging efficiency during recharging operations, while extending the lifetime of the recharging cathode elements in the system.

Another object of the present invention is to provide such an improved rechargeable metal-air FCB system, wherein a metal-fuel management subsystem is provided for automatically managing the amount of metal-fuel remaining on each indexed region of the metal-fuel structure (e.g. metal-fuel card) being discharged so that, during recharging operations, only the recharging-optimized cathode structures associated with discharged metal-fuel regions are electrically-switched into operation to enable recharging of such metal-fuel regions.

Another object of the present invention is to provide such an improved rechargeable metal-air FCB system, wherein a metal-fuel management subsystem is provided for automatically managing the amount of metal-oxide remaining on each indexed region of the metal-fuel structure (e.g. metal-fuel card) being recharged so that, during discharging operations, only the discharging-optimized cathode elements associated with recharged metal-fuel regions are electrically-switched into operation to enable discharging of such metal-fuel regions.

Another object of the present invention is to provide such an improved rechargeable metal-air FCB system, wherein the recharging-optimized cathode elements, in contrast with the discharging-optimized cathode elements, can be realized as gas permeable structures having a microstructure provided with micro-pores of a very small size.

Another object of the present invention is to provide such an improved rechargeable metal-air FCB system, wherein the discharging-optimized cathode elements, in contrast with the recharging-optimized elements are realized with a microstructure that is optimized for discharging operations.

Another object of the present invention is to provide such an improved rechargeable metal-air FCB system, wherein each discharging-optimized cathode element within the hybrid discharging/recharging head assembly has the capacity to produce AC output currents using low power rating semiconductor switching elements (e.g. transistors) and inductive elements (e.g. coils), so as to increase the output voltage level.

Another object of the present invention is to provide such an improved rechargeable metal-air FCB system, wherein each electrical current-carrying conductor element employed in each electrically-isolated cathode element can be made relatively small and thin due to the low current levels produced from each electronically-controlled FCB cell during discharging operations, thus reducing the weight of the electrical current conductors while improving the efficiency of electrical current distribution within the discharging/recharging head assembly.

Another object of the present invention is to provide an improved metal-air FCB system, wherein a first array of anode-contacting elements are provided in spatial registration with a first array of cathode elements (i.e. segments) so as to produce a plurality of low-power discharging cells for loading recharged metal-fuel material therewithin and generating a first quantity of electrical power therefrom during low-power discharging operations, and a second array of anode-contacting elements are provided in spatial registration with a second array of cathode elements (i.e. segments) so as to produce a plurality of high-power discharging cells for loading recharged metal-fuel material therewithin and generating a second quantity of electrical power therefrom during high-power discharging operations.

Another object of the present invention is to provide such an improved metal-air FCB system, wherein the low-power and high-power discharging cells are realized within a unity support structure or subassembly, and each discharging cell is electronically-controllable in order to carry out any one of a number of output power, voltage and/or current control methods under microprocessor control during discharging operations.

Another object of the present invention is to provide an improved rechargeable metal-air FCB system, wherein a first array of anode-contacting elements are provided in spatial registration with a first array of cathode elements (i.e. segments) so as to produce a plurality of low-power recharging cells for loading discharged metal-fuel material therewithin and supplying a first quantity of electrical power thereto during low-power recharging operations, and a second array of anode-contacting elements are provided in spatial registration with a second array of cathode elements (i.e. segments) so as to produce a plurality of high-power recharging cells for loading discharged metal-fuel material therewithin and supplying a second quantity of electrical power thereto during high-power recharging operations.

Another object of the present invention is to provide such an improved rechargeable metal-air FCB system, wherein the low-power and high-power recharging cells are realized within a unity support structure or subassembly, and each recharging cell is electronically-controllable in order to carry out any one of a number of input power, voltage and/or current control methods under microprocessor control during recharging operations.

Another object of the present invention is to provide a metal-air FCB power production module, wherein the discharging load structures comprises a plurality of electrically-activated discharging cells, each being connected in an electrical circuit having a power-switching transistor and an inductive element (e.g. inductive coil) for producing stepped-up voltage levels which are combined in parallel for increased current capacity, and regulated using capacitative elements at the output of the FCB power producing module.

Another object of the present invention is to provide a metal-air FCB module, wherein a switching transistor, assigned to each discharging cell, chops the low-level DC current generated across the discharging cell, thereby producing low-level high-frequency AC currents which are passed through small inductive elements to generate high-frequency voltage signals which are then passed through low-frequency pass filters (i.e. high-frequency rejection filters) to produce stepped-up DC voltages for driving various types of electrical loads.

Another object of the present invention is to provide such a metal-air FCB module, wherein the stepped-up voltages are combined in series and/or parallel, so as to generate a particular output voltage required to meet the electrical loading conditions at any particular instant in time.

Another object of the present invention is to provide a novel battery-type electrical power producing module comprising: a plurality of discharging cells; a plurality of transistor-based power switches, each being connected to one discharging cell and being controlled by a switching controller; and an inductive element configured with at least one discharging cell and at least one transistor-based power switch, for producing a stepped-up output voltage having a DC voltage component and high-frequency signal components; and a low-pass filtering circuit for filtering out high-frequency signal components from stepped-up output voltage.

Another object of the present invention is to provide a novel method of supplying electrical power to an electrical load from a battery-type electrical power producing module having a plurality of discharging cells, comprising the steps of: generating electrical current pulses from each discharging cell; supplying said electrical current pulses to the primary coil of a step-up type voltage transformer to produce a voltage thereacross; generating a stepped up output voltage across the secondary coil of the voltage transformer; and regulating the stepped-up output voltage by rectifying and low pass-filtering the output current generated therefrom.

Another object of the present invention is to provide such a novel method of supplying electrical power to an electrical load, wherein each discharging cell comprises a discharging cathode structure, an anode structure formed from a metal-fuel material, and an ionically-conducting material disposed between the discharging cathode structure and the anode structure; wherein the anode structures of the discharging cells are realized by an unpatterned or patterned sheet of conductive material maintained at a common electrical potential (e.g. electrical ground); and wherein the ionically conductive medium is a shared medium among the discharging cells, not requiring ionic-isolation therebetween.

Another object of the present invention is to provide a battery-type electrical power producing module for supplying electrical power to an electrical load, comprising: a plurality of discharging cells provided along a support substrate; a plurality of power switching elements for generating electrical current pulses from each discharging cell; a step-up type output voltage transformer having at least one primary coil and at least one secondary coil; a plurality of electrical conductors for conducting the electrical current pulses to the at least one primary coil of the step-up type output voltage transformer to produce a stepped up output voltage across the at least one secondary coil, and the stepped up output voltage having time-varying signal components; a rectifier for rectifying electrical current produced from the at least one secondary coil; and a low pass-filtering capacitor for substantially removing the time-varying signal components from said stepped up output voltage while being applied across an electrical load connected in electrical parallel with the low pass filtering capacitor.

Another object of the present invention is to provide such a battery-type electrical power producing module, wherein each discharging cell comprises a discharging cathode structure, an anode structure formed from a metal-fuel material, and an ionically-conducting material disposed between the discharging cathode structure and the anode structure; wherein the anode structures of the discharging cells are realized by an unpatterned or patterned sheet of conductive material maintained at a common electrical potential (e.g. electrical ground); and wherein the ionically conductive medium is a shared medium among the discharging cells, not requiring ionic-isolation therebetween.

Another object of the present invention is to provide a novel method of supplying electrical power to an electrical load from a battery-type electrical power producing module having a plurality of discharging cells, comprising the steps of: generating electrical current pulses from each the discharging cell; supplying the electrical current pulses to an inductive element to produce a stepped-up output voltage across the inductive element; rectifying the output current generated from the inductive element to produce a rectified output current having time-varying signal components; using a low pass-filtering capacitor to remove a significant portion of the time-varying signal components from the rectified output current, while maintaining a substantially constant output voltage across an electrical load connected in electrical parallel with the low pass-filtering capacitor.

Another object of the present invention is to provide such a novel method of supplying electrical power to an electrical load, wherein each discharging cell comprises a discharging cathode structure, an anode structure formed from a metal-fuel material, and an ionically-conducting material disposed between the discharging cathode structure and the anode structure; wherein the anode structures of the discharging cells are realized by an unpatterned or patterned sheet of conductive material maintained at a common electrical potential (e.g. electrical ground); and wherein the ionically conductive medium is a shared medium among the discharging cells, not requiring ionic-isolation therebetween.

Another object of the present invention is to provide a novel battery-type electrical power producing module for supplying electrical power to an electrical load, comprising: a plurality of discharging cells provided along a support substrate; a plurality of power switching elements for generating electrical current pulses from each discharging cell; a plurality of inductive elements connected in electrical series with the plurality of discharging cells, each inductive element producing a stepped-up voltage across each the inductive element in response to the electrical current pulses being supplied therethrough by the discharging cell, and each stepped up voltage having time-varying signal components; at least one rectifier for rectifying electrical current produced from the inductive elements; and a low pass-filtering capacitor for receiving the rectified electrical current and substantially removing the time-varying signal components from the stepped up voltages while an electrical load is connected in electrical parallel with the low pass filtering capacitor.

Another object of the present invention is to provide such a novel method of supplying electrical power to an electrical load, wherein each discharging cell comprises a discharging cathode structure, an anode structure formed from a metal-fuel material, and an ionically-conducting material disposed between the discharging cathode structure and the anode structure; wherein the anode structures of the discharging cells are realized by an unpatterned or patterned sheet of conductive material maintained at a common electrical potential (e.g. electrical ground); and wherein the ionically conductive medium is a shared medium among the discharging cells, not requiring ionic-isolation therebetween.

Another object of the present invention is to provide a novel method of supplying electrical power to an electrical load from a battery-type electrical power producing module having a plurality of discharging cells, comprising the steps of: generating electrical current pulses from each discharging cell; supplying said electrical current pulses to an inductive element configured in electrical series with the discharging cell so as to produce a stepped-up voltage across each the inductive element; rectifying the output current generated from the inductive element to produce a rectified output current having time-varying signal components; and low pass-filtering the rectified output current to remove a substantial portion of the time-varying signal components while maintaining a substantially constant output voltage across an electrical load.

Another object of the present invention is to provide such a novel method of electrical power production, wherein each discharging cell comprises a discharging cathode structure, an anode structure formed from a metal-fuel material, and an ionically-conducting material disposed between the discharging cathode structure and the anode structure; wherein the anode structures of the discharging cells are realized by an unpatterned or patterned sheet of conductive material maintained at a common electrical potential (e.g. electrical ground); and wherein the ionically conductive medium is a shared medium among the discharging cells, not requiring ionic-isolation therebetween.

Another object of the present invention it to provide a novel battery-type electrical power producing module for supplying electrical power to an electrical load, comprising: a plurality of discharging cells provided along a support substrate; a plurality of power switching elements for generating electrical current pulses from each discharging cell; an inductive element for producing an stepped up output voltage in response to the electrical current pulses supplied therethrough; a plurality of electrical conductors for conducting said electrical current pulses to the inductive element to produce the stepped up voltage across said inductive element, said stepped up voltage having time-varying signal components; at least one rectifier for rectifying electrical current produced from each inductive element; and a low pass-filtering capacitor for substantially removing the time-varying signal components from the stepped up voltage while being applied across an electrical load connected in electrical parallel with the low pass filtering capacitor.

Another object of the present invention is to provide such a metal-air FCB power producing module, wherein each discharging cell comprises a discharging cathode structure, an anode structure formed from a metal-fuel material, and an ionically-conducting material disposed between the discharging cathode structure and the anode structure; wherein the anode structures of the discharging cells are realized by an unpatterned or patterned sheet of conductive material maintained at a common electrical potential (e.g. electrical ground); and wherein the ionically conductive medium is a shared medium among the discharging cells, not requiring ionic-isolation therebetween.

Another object of the present invention is to provide such battery-type electrical power producing modules, wherein by producing stepped-up output voltages using low-magnitude switching currents results in a significant decrease in the weight, size, and cost of the battery module in various applications as well as a significant decrease in heat dissipation due to IxR power losses, thus increasing the overall switching efficiency of the resulting battery module while avoiding the need to use large heat sinking structures.

A further object of the present invention is to provide such an improved method of generating electrical power from metal-air fuel cell battery (FCB) systems.

These and other Objects of the present invention will become apparent hereinafter.

BRIEF DESCRIPTION OF THE DRAWINGS

For a more complete understanding of the Objects of the Present Invention, the following detailed Description of the Illustrative Embodiments Of the Present Invention should be read in conjunction with the accompanying Drawings, wherein:

FIG. 4A1 is a perspective, partially cut-away, view of the cathode support structure (i.e. plate) employed in the hybrid discharging/recharging head assembly of the metal-air FCB power producing module of FIG. 1, wherein a matrix of cathode element receiving recesses are provided for receiving discharging-optimized and recharging-optimized cathode elements and electrolyte-impregnated pads therein;

FIG. 4A2A is a schematic diagram of a discharging-optimized cathode element insertable within the lower portion of a discharging-optimized cathode receiving recess in the cathode support plate of FIG. 4A1, associated with a discharging cell provided within the system;

FIG. 4A2B is a schematic diagram of a recharging-optimized cathode element insertable within the lower portion of a recharging-optimized cathode receiving recess in the cathode support plate of FIG. 4A1, associated with a recharging cell provided within the system;

FIG. 4A3A is a schematic diagram of an electrolyte-impregnated pad for insertion over the discharging-optimized cathode element in the upper portion of each discharging-optimized cathode receiving recess in the cathode support plate of FIG. 4A1, associated with the discharging cell provided within the system;

FIG. 4A3B is a schematic diagram of an electrolyte-impregnated pad for insertion over the recharging-optimized cathode element in the upper portion of each recharging-optimized cathode receiving recess in the cathode support plate of FIG. 4A1, associated with the recharging cell provided within the system;

FIG. 4A4 is a perspective, partially cut-away, view of the an unoxidized segmented metal-fuel card designed for discharging within the rechargeable FCB power generation system of FIG. 1, shown comprising a plurality of spatially-isolated recesses, wherein each such recess supports a metal-fuel strip (i.e. element or segment) and permits ionic contact with a spatially-corresponding cathode element disposed thereabove when the metal-fuel card is loaded within the system, and also permits electrical contact with a spatially corresponding anode-contacting electrode through an aperture formed in the bottom surface of the recess;

FIG. 4A5 is a cross-sectional view of the metal-fuel support plate of FIG. 4A4, taken along line 4A5—4A5 thereof;

FIG. 4A6 is a perspective, partially cut-away, view of an electrode support plate for supporting a plurality of electrodes which are designed to establish electrical contact with the anodic metal-fuel strips supported within the metal-fuel support plate of FIG. 4A4, during discharging and recharging operations alike carried out within the metal-air FCB power generation module of FIG. 1;

FIG. 4A7 is a perspective, partially cut-away, exploded view of a hybrid discharging and recharging head assembly of the present invention, showing its cathode support plate, metal-fuel support plate, and anode contacting electrode support plate arranged in a disassembled, yet spatially registered relationship;

FIG. 5B1 is a schematic representation of the first illustrative embodiment of the rechargeable FCB power generation module of the present invention, showing transistor-based electrical-switching circuitry used to activate (i) selected discharging cells under the control of the system controller during discharging operations, as well as (ii) selected recharging cells under the control of the system controller during recharging operations;

FIG. 5B2 is a schematic representation of the first illustrative embodiment of the rechargeable FCB power generation module of FIG. 5B1, indicating that selected discharging cells along the hybrid discharging/recharging head assembly are electronically activated in a sequential manner in order to produce full-scale output electrical power pulses under the control of the system controller during discharging operations;

FIG. 6B is a schematic representation of the information structure maintained within the Metal-Fuel Database Management Subsystem employed in the FCB power generation module of FIG. 1, shown comprising a set of information fields for use in recording discharge parameters, and metal-oxide and metal-fuel indicative data for each metal-fuel zone/region along the metal-fuel card during discharging operations;

FIG. 6C is a schematic representation of the information structure maintained within the Metal-Fuel Database Management Subsystem employed in the FCB power generation module of FIG. 1, shown comprising a set of information fields for use in recording recharge parameters, and metal-fuel and metal-oxide indicative data for each metal-fuel zone along a metal-fuel card during recharging operations;

FIG. 7 is a high-level flow chart illustrating the method of producing electrical power by discharging a metal-fuel card within the rechargeable FCB power generation system of FIG. 1 during its discharging mode of operation;

FIG. 12A is a generalized schematic representation of the second illustrative embodiment of the rechargeable FCB power generation module of FIG. 1, showing its subsystems and subcomponents in greater detail, with a metal-fuel card shown inserted between the mosaic-like cathode and anode-contacting structures of the hybrid discharging/recharging head thereof;

FIG. 12B is a schematic representation of the second illustrative embodiment of the rechargeable FCB power generation module depicted in FIG. 12A, comprising (i) transistor-based electrical-switching circuitry for producing electrical pulse waveforms from each selected discharging cell under the control of the system controller during discharging operations, (ii) an output transformer having a plurality of electrically-isolated primary coils driven by the produced electrical voltages for generating input voltage waveforms, (iii) a single output coil for producing a stepped-up output voltage waveform, (iv) a diode for rectifying the output voltage waveform, and (v) a low-pass filtering circuit for filtering out high-frequency signal components from the stepped-up DC output voltage waveform;

FIG. 14A is a generalized schematic representation of the fourth illustrative embodiment of the rechargeable FCB power generation module of FIG. 1, showing its subsystems and subcomponents in greater detail, with a metal-fuel card shown inserted between the mosaic-like cathode and anode-contacting structures of the hybrid discharging/recharging head thereof;

FIG. 14B1 is a schematic representation of the fourth illustrative embodiment of the rechargeable FCB power generation module depicted in FIG. 14A, comprising (i) a transistor-based electrical-switch and inductive element configured in series with each discharging cell for producing electrical voltage pulse waveforms having stepped-up voltage levels from selected discharging cells under the control of the system controller during discharging operations, (ii) a plurality of diodes for rectifying the stepped-up voltage signals, and (iii) a low-pass filtering circuit for filtering out high-frequency signal components from the stepped-up DC output voltage waveform;

FIG. 14B2 is a schematic diagram of the voltage boost regulation circuitry embodied about each discharging cell in the rechargeable FCB power generation module of FIG. 14B1;

FIG. 14C1 is an equivalent schematic diagram for the circuitry shown in FIG. 14B2, shown operated in its first mode of operation (Mode 1);

FIG. 14C2 is an equivalent schematic diagram for the circuitry shown in FIG. 14B2, shown operated in its second mode of operation (Mode 2);

FIG. 15B1 is a schematic representation of the fifth illustrative embodiment of the rechargeable FCB power generation module depicted in FIG. 15A, comprising (i) a transistor-based electrical-switch for producing electrical voltage pulse waveforms that are used to drive an output inductive element across which a stepped-up output voltage waveform is produced, (ii) a diode for rectifying the output current from the output inductive element, and (iii) a low-pass filtering circuit for filtering out high-frequency signal components from the stepped-up output voltage waveform;

FIG. 15B2 is a schematic diagram of the voltage buck-boost regulation circuitry embodied about each discharging cell in the rechargeable FCB power generation module of FIG. 15A;

FIG. 15C1 is an equivalent schematic diagram for the circuitry shown in FIG. 15B2, shown operated in its first mode of operation (Mode 1);

FIG. 15C2 is an equivalent schematic diagram for the circuitry shown in FIG. 15B2, shown operated in its second mode of operation (Mode 2);

FIG. 16B is a schematic representation of the hybrid discharging/recharging head assembly employed within the FCB power generation system of FIG. 16A;

FIG. 16C is a table identifying corresponding pairs of terminals connected to (i) the discharging-optimized cathode elements on the segmented cathode structure and (ii) the anode-contacting elements (i.e. electrodes) located on the lower side of the segmented metal-fuel card structure employed in the FCB system of FIG. 16A;

FIG. 16D is a table identifying corresponding pairs of terminals connected to (i) the recharging-optimized cathode elements on the segmented cathode structure and (ii) the anode-contacting elements (i.e. electrodes) located on the upper side of the segmented metal-fuel card structure employed in the FCB system of FIG. 16A;

FIG. 18 is an exploded view of an illustrative embodiment of an eighth (non-rechargeable) embodiment of the FCB-based power generation module of the present invention, showing the major components thereof including a multi-element cathode structure, a multi-element anode-contacting structure, a replaceable multi-element metal fuel card, upper and lower housing portions, a housing end panel with an aperture for insertion of the metal-fuel card, and a pair of miniature printed circuit (PC) boards employed within the module and carrying the electrical circuits realizing many of the subsystems thereof;

DETAILED DESCRIPTION OF THE ILLUSTRATIVE EMBODIMENTS OF THE PRESENT INVENTION

Referring now to the figures in the accompanying Drawings, the illustrative embodiments of the present invention will now be described in great technical detail, wherein like elements are indicated by like reference numbers.

According to one of the broader aspects of the present invention, a novel segmented-type cathode structure is provided. In general, this principle of cathode segmentation can be applied in many ways. For example, the individual cathode segments can be designed to have discharging-optimized characteristics or recharging-optimized characteristics; high-power characteristics or low-power characteristics; high-energy density characteristics or low-energy density characteristics; high-voltage characteristics or low-voltage characteristics; high-cost characteristics or low-cost characteristics; and any combinations of these above-identified characteristics, as well as others. Naturally, each cathode element (or segment) will have a corresponding anode-contacting element, between which an anodic metal-fuel element or region will be disposed during discharging and recharging operations alike. The size of each cathode element, and its physical placement along the cathode element, will depend on the particular embodiment at hand.

As shown in FIGS. 3 through 5A, the principle of cathode segmentation in accordance with the present invention is used to construct a novel hybrid discharging/recharging head assembly, wherein both segmented discharging and recharging cells are spatially arranged along the structure of the discharging/recharging head assembly. This particular cathode construction is shown used in the system of FIG. 5A.

Figure 3:
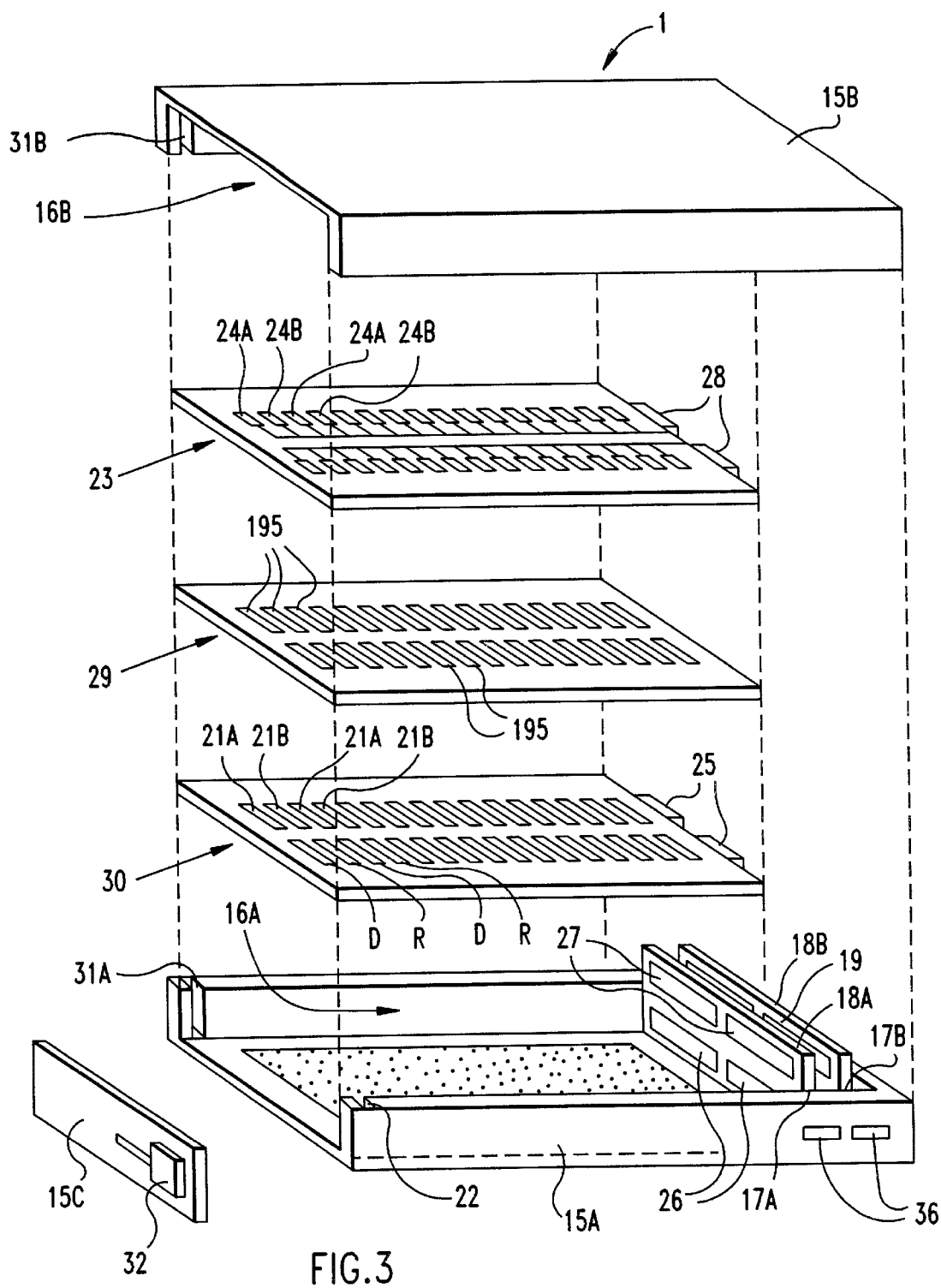
FIG. 3 is an exploded view of a first illustrative embodiment of the rechargeable FCB-based power generation module of the present invention depicted in FIG. 1, showing the major components thereof including a multi-element cathode structure, a multi-element anode-contacting structure, a multi-element metal fuel card, upper and lower housing portions, a housing end panel; and a pair of miniature printed circuit (PC) boards employed within the module and carrying the electrical circuits realizing many of the subsystems thereof.
Figure 7:
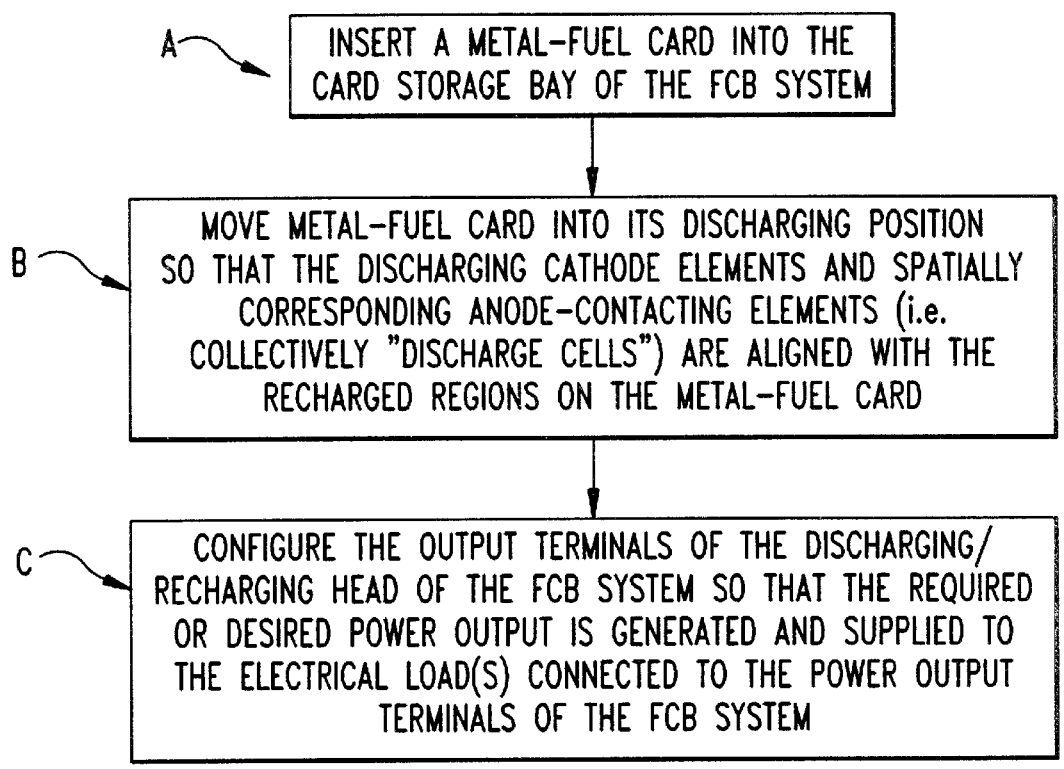
Figure 8:
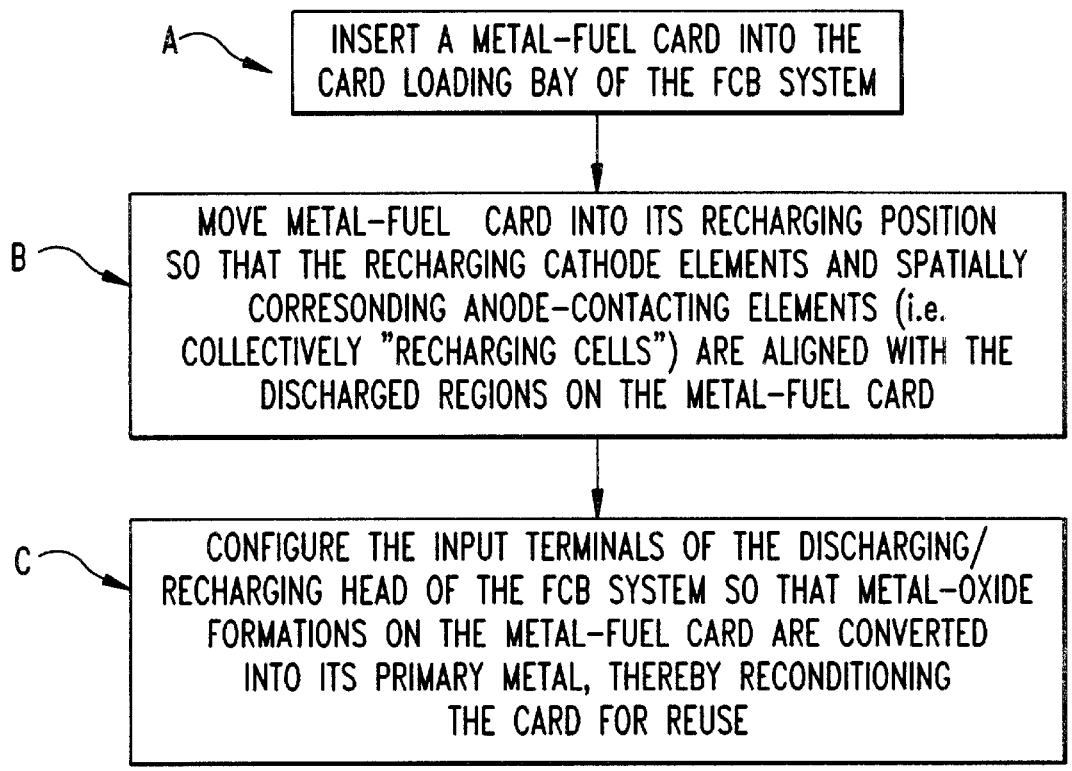
FIG. 8 is a high-level flow chart illustrating the method of recharging an oxidized metal-fuel card within the rechargeable FCB power generation system of FIG. 1 during its recharging mode of operation.

The cathode construction shown in FIGS. 3 through 4A7 is modified in various ways to provide alternative cathode constructions for used in the rechargeable discharging/recharging head assemblies of FIGS. 12A, 13A, 14A, and 15A, wherein the anode structure of each discharging cell thereof is connected to a common potential reference, such as electrical ground in the system.

The cathode construction shown in FIGS. 3 through 4A7 is further modified to provide a cathode construction for use in improved discharging head assembly, wherein segmented discharging and recharging cells are spatially arranged along the structure of the head assembly.

Figure 19A:
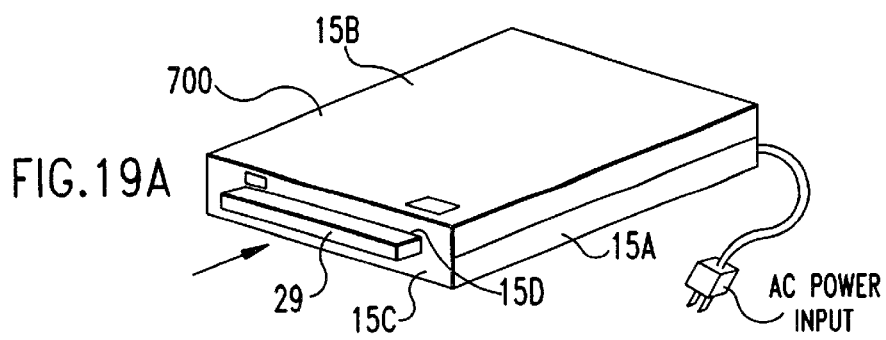
FIG. 19A is a schematic representation of an illustrative embodiment of a metal-air FCB recharging module (i.e. metal-fuel card recharger) of the present invention, in which a metal-fuel card of the present invention can be inserted within the housing thereof for recharging.
Figure 19B:
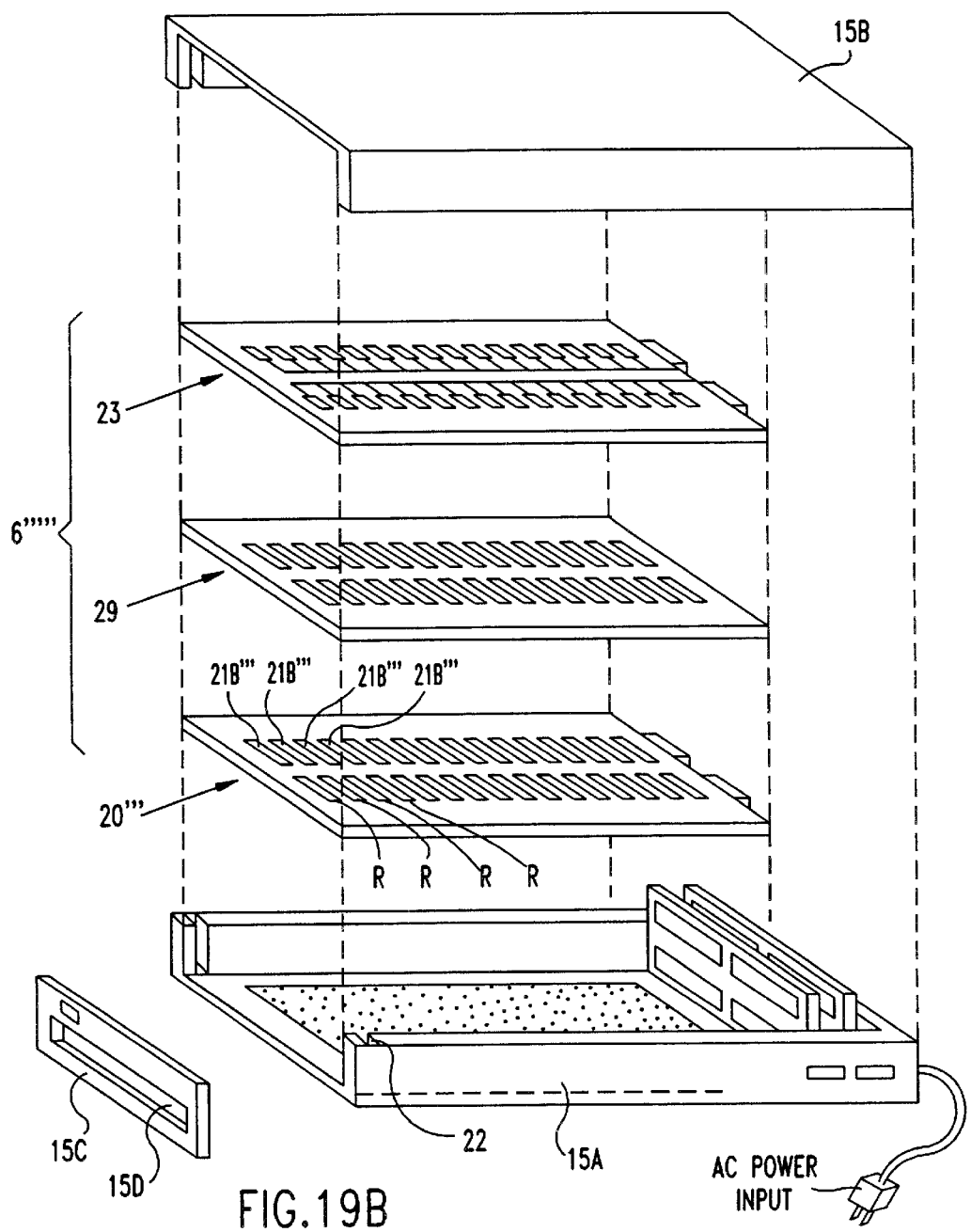
FIG. 19B is an exploded view of an illustrative embodiment of the metal-air FCB recharging module of the present invention depicted in FIG. 19A, showing the major components thereof including a multi-element cathode structure, a multi-element anode-contacting structure, a multi-element metal-fuel card for recharging within the recharging module, upper and lower housing portions, a housing end panel having an aperture for insertion of the metal-fuel card into the recharger module, and a pair of miniature printed circuit (PC) boards employed within the recharging module and carrying the electrical circuits realizing many of the subsystems thereof.

In FIG. 18, the principle of cathode segmentation is used to construct an improved recharging head assembly, wherein only segmented discharging cells are spatially arranged along the structure of the head assembly. As shown in FIGS. 19A and 19B, the principle of cathode segmentation is used to construct an improved metal-air FCB recharging module (i.e. unit), in accordance with the present invention.

Figure 5A:
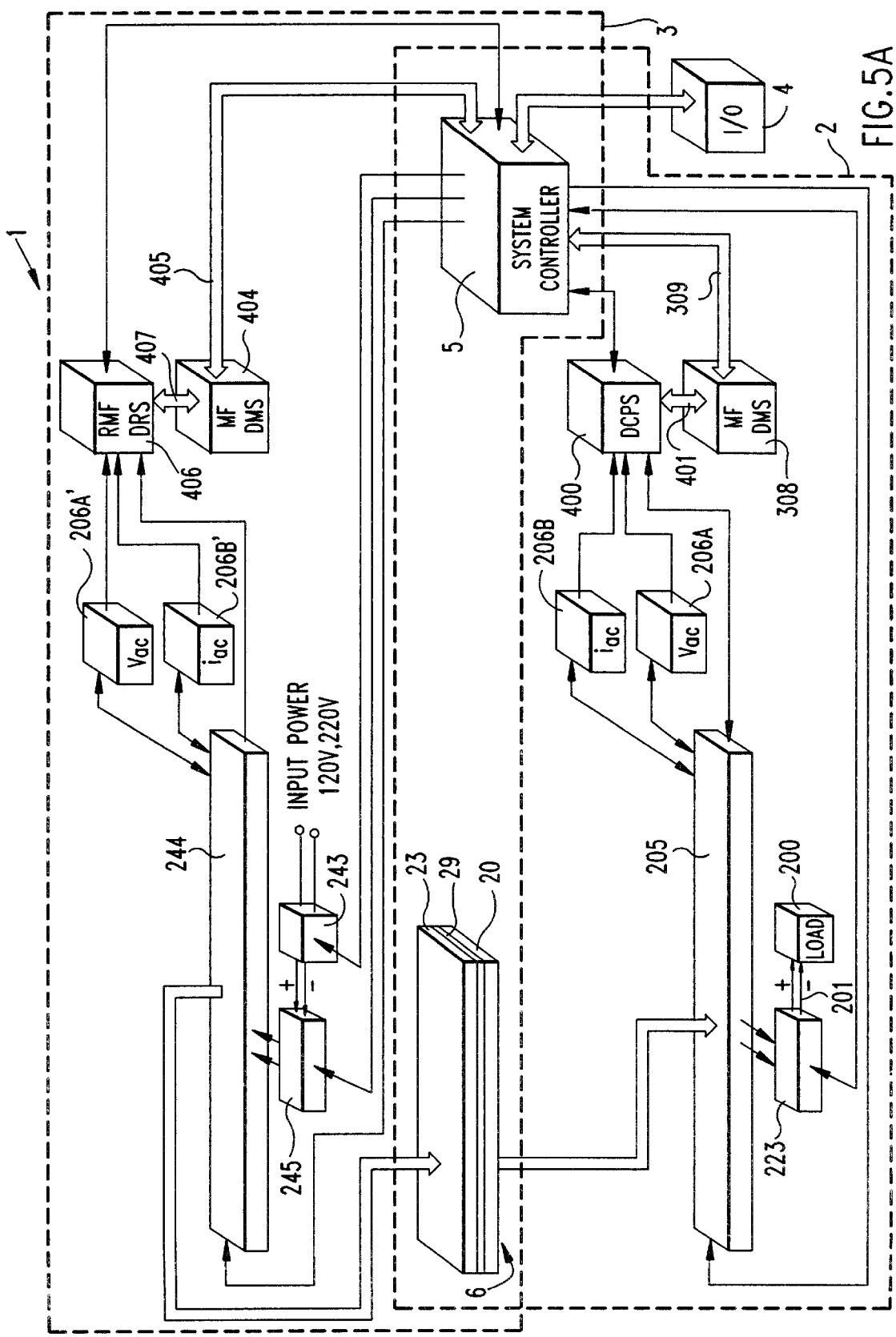
FIG. 5A is a generalized schematic representation of the first illustrative embodiment of the rechargeable FCB power generation module of FIG. 1, showing its subsystems and subcomponents in greater detail, with a metal-fuel card shown inserted between the mosaic-like cathode and anode-contacting structures of the hybrid discharging/recharging head thereof.

For purposes of illustration, the rechargeable discharging/recharging head assembly shown in FIG. 3 will be first described in the context of the FCB power generation system of FIG. 5A, wherein both discharging and recharging subsystems are integrated to provide a useful commercially viable product. Thereafter, the embodiments shown in FIGS. 13 through 19B will be described.

Metal-Air FCB Power Producing Module of the First Illustrative Embodiment of the Present Invention As shown in FIG. 5A, the metal-air FCB system 1 comprises, at the topmost system-level, two different subsystems, namely: a Metal-Fuel Card Discharging Subsystem 2 for discharging the metal-fuel card loaded within the system; a Metal-Fuel Card Recharging Subsystem 3 for recharging the metal-fuel card; an input/output control subsystem 4 for controlling all functionalities of the FCB system by way of the resultant system, within which the FCB power generation mode is embedded, or a remote system to which the power generation module is operably connected; and system controller 5 for managing the operation of the above mentioned subsystems during the various modes of system operation. As shown in FIG. 5A, each subsystem 2 and 3 cooperates with the hybrid discharging/recharging head assembly (i.e. structure) 6 during discharging and recharging modes of operation.

Figure 1:
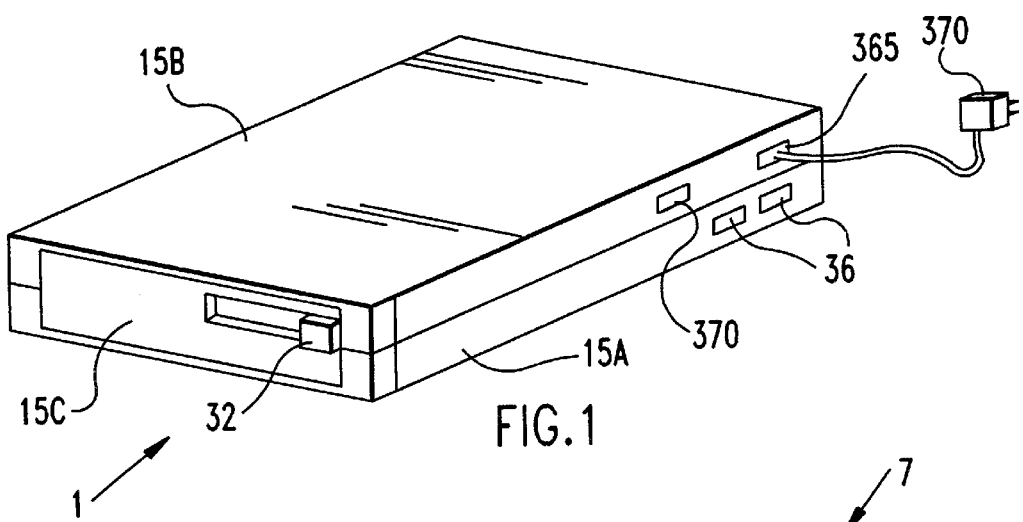
FIG. 1 is a perspective view of a first illustrative embodiment of the rechargeable FCB-based power generation module of the present invention, in which a metal-fuel card or like structure is loaded or installed to provide a supply of fuel for electrical power generation therefrom.

In the illustrative embodiment shown in FIG. 1, the rechargeable metal-air FCB system of the present invention 1 is realized as a metal-air FCB power producing module of ultra-compact construction capable of generating and delivering regulated electrical power to any type of appliance, electronic device, electronic system or electronic/opto-electronic instrument requiring electrical power at a particular voltage range for its operation.

Figure 2A:
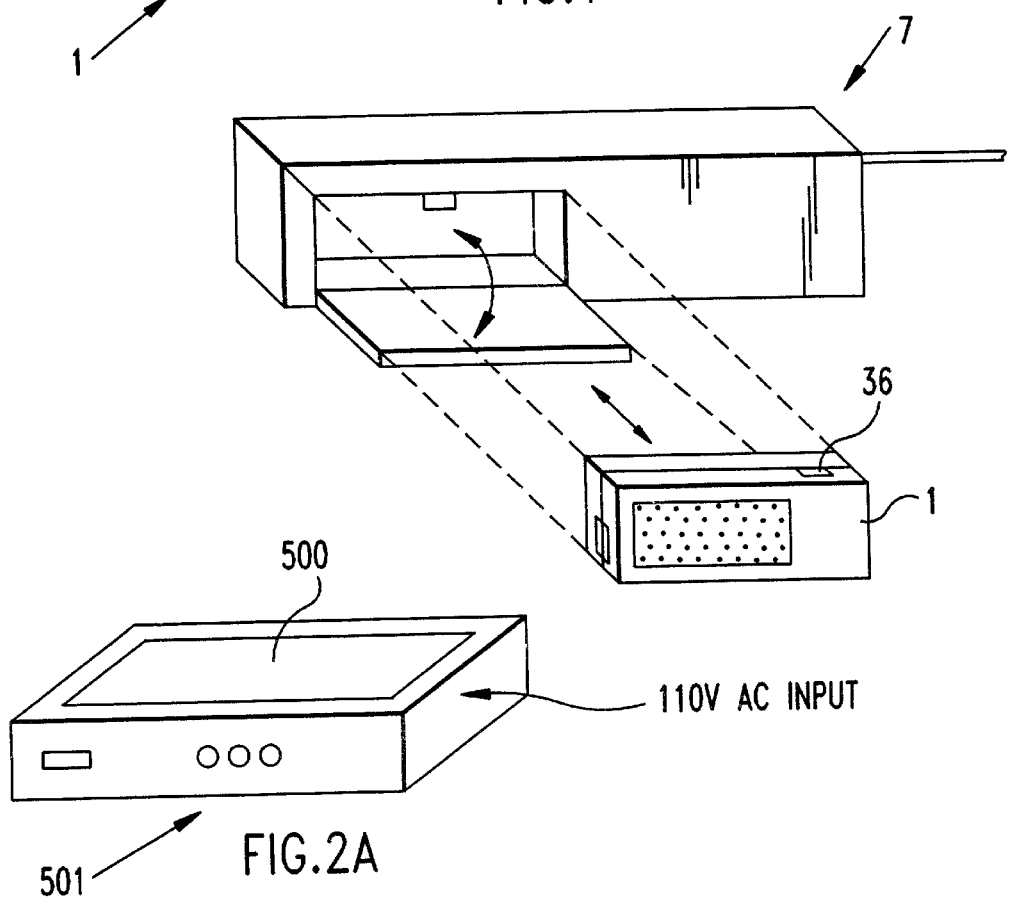
FIG. 2A is a perspective view of a portable (cellular) telephone into which the rechargeable metal-air FCB power producing module of FIG. 1 is installed for electrical power generation.
Figure 2B:
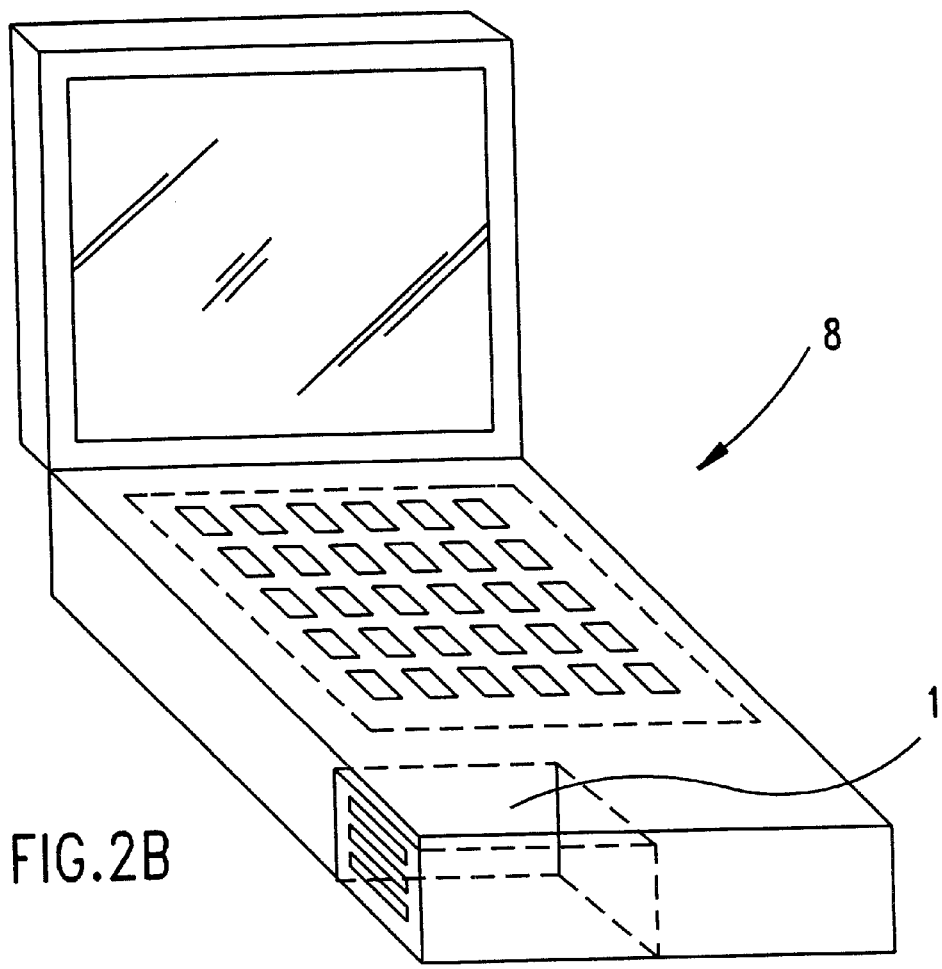
FIG. 2B is a perspective view of a laptop computer system within which the rechargeable metal-air FCB power producing module of FIG. 1 is installed for electrical power generation.
Figure 2C:
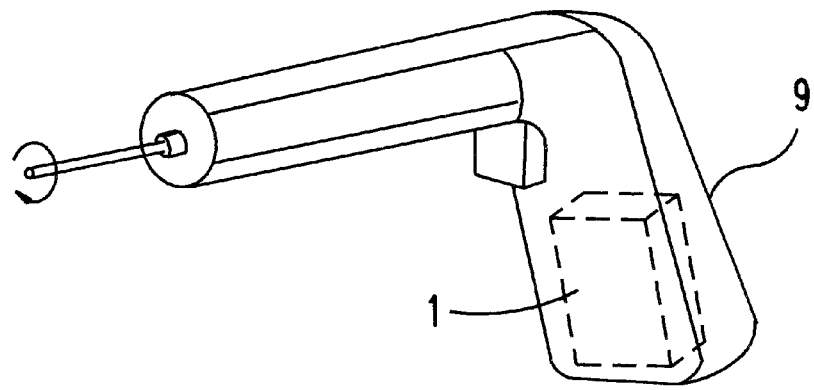
FIG. 2C is a perspective view of a portable power tool into which the rechargeable metal-air FCB power producing module of FIG. 1 is installed for electrical power generation.
Figure 2D:
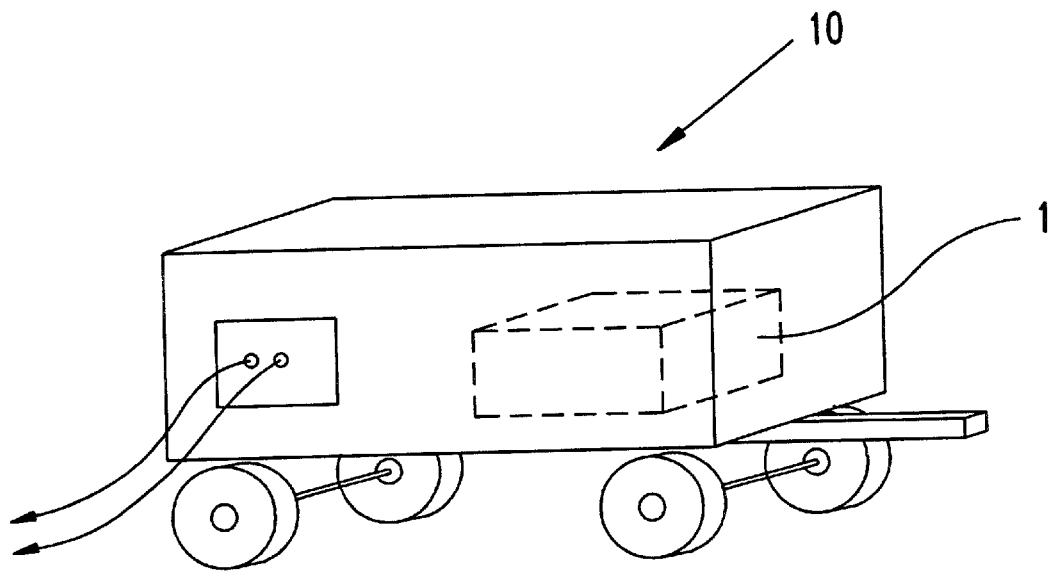
FIG. 2D is a perspective view of a transportable electrical power generation plant into which the rechargeable metal-air FCB power producing module of FIG. 1 is installed for electrical power generation.
Figure 2E:
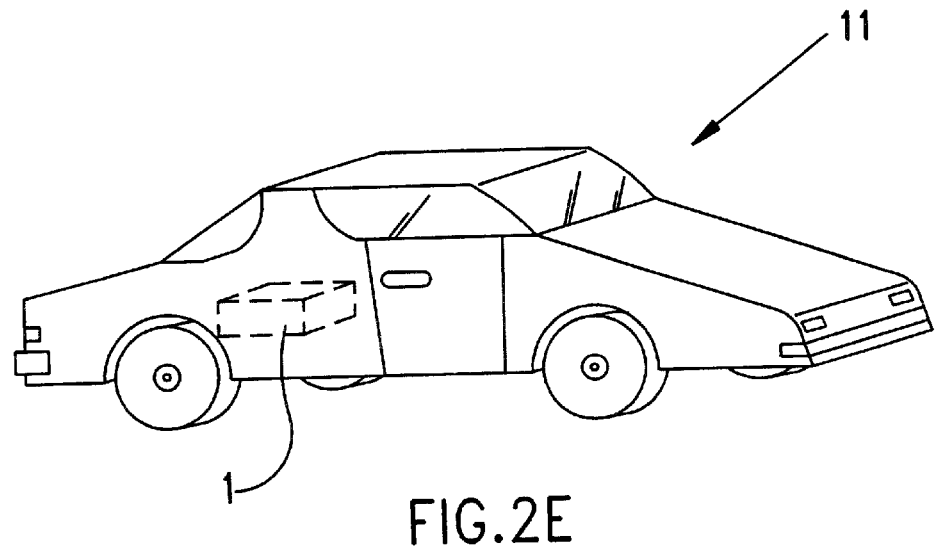
FIG. 2E is a perspective view of an electric vehicle (i.e. automobile) into which the rechargeable metal-air FCB power producing module of FIG. 1 is installed for electrical power generation.

Naturally, the form factor of the FCB power generation module of the present invention will be appropriately selected in order to accommodate the allocated volume within the particular system or device for which the power generation module has been designed. Such electrical power consuming systems and devices may include, but are not limited to: cellular telephones 7 as shown in FIG. 2A; laptop and palmtop computers 8 as shown in FIG. 2B; electrical power tools 9 as shown in FIG. 2C; electrical power plants 10 as shown in FIG. 2D; electric vehicles 11 as shown in FIG. 2E; or any other form of energy consuming apparatus presently known, or to be developed in the future. In other embodiments of the present invention, the FCB power generation module hereof may be integrated within the housing of the cellular telephone, laptop computer, or other electrical power consuming device.

As shown in FIG. 3, the rechargeable metal-air FCB module 1 comprises an assembly of subcomponents, namely: a housing of compact construction having (1) a lower housing portion 15A having a first recess 16A, and a pair of transverse slots 17A and 17B for receiving a pair of small printed circuit (PC) boards 18A and 18B therewithin (interconnected by way of a flexible circuit 19), and (2) an upper housing portion 15B for snap-fit connection with the lower housing portion 15A and having second recess 16B; a multi-element (segmented) cathode structure (i.e. submodule) 20 releasably inserted within the first recess 16A of the lower housing portion 15A, and having a first plurality of discharging-optimized cathode elements 21A and a second plurality of electrically-isolated recharging-optimized cathode elements 21B, spatially arranged in a predetermined pattern selected to facilitate efficient discharging and recharging of selected regions of metal-fuel cards or sheets, respectively; an air-pervious window (i.e. aperture) 22 formed in the bottom of the lower housing portion 15A for allowing ambient air to flow into the module housing and through the multi-element cathode structure thereof; a multi-element anode contacting structure (i.e. submodule) 23 releasably inserted within the second recess 16B of the upper housing portion 15B, and disposed adjacent the pair of printed circuit (PC) boards 18A and 18B, and having a first plurality of anode-contacting elements 24A spatially corresponding to and cooperating with the discharging-optimized cathode elements 21A, and also a second plurality of electrically-isolated anode-contacting elements 24B spatially corresponding to and cooperating with the recharging-optimized cathode elements 21B; a first pair of electrical connectors 25 formed on the edge of the multi-element cathode structure 20 and adapted for establishing electrical contact with a matching pair of electrical connectors 26 mounted on the first PC board 18A; a second pair of electrical connectors 28 formed on the edge of the multi-element anode contacting structure 23 adapted for establishing electrical contact with a second pair of matching electrical connectors 27 mounted on the first PC board 18A; a multi-element (segmented), or less desirable, non-segmented metal-fuel card or sheet 29 designed for loading within a slot formed between the multi-element cathode structure 20 and the multi-element anode contacting structure when the electrical power producing module is completely assembled, as shown in FIG. 1; and a housing end panel 15C for insertion within slots 31A and 31B formed in the housing portions 15A and 15B, respectively, and having a manually slide-able discharging/recharging selection switch 32 which, when slid into its discharging position indicated by DP in FIG. 1, forces the recharged regions along the loaded metal-fuel card 29 into spatial alignment with the discharging-optimized cathode elements 21A of the module, whereas when slid into its recharging position indicated by RP in FIG. 1, forces the discharged regions along the loaded metal-fuel card 29 into spatial alignment with the recharging-optimized cathode elements 21B of the module.

Notably, while the first illustrative embodiment shown in FIGS. 1 and 3 employs manually slidable discharging/recharging selection switch 32 to physically displace the metal-fuel card, from its discharging position to its recharging position, it is understood, however, that in alternative embodiments of the present invention, this metal-fuel card displacement function can be realized using alternative means, such as, for example, using a suitable low-power electro-mechanical metal-fuel card translation mechanism 33 shown in FIGS. 9A–9E embodied within the housing of the FCB module. One way of realizing this metal-fuel card translation mechanism 33 is using a miniature motor for producing rotary shaft movement and a micro-cam mechanism for translating the rotary movement of the motor shaft into linear displacement of the metal-fuel card from its discharging position to its recharging position, and vice versa, under the control of the system controller 5. To ensure that the electromechanical device 33 will be operable at times prior to complete discharge of the metal-fuel card, a metal-fuel level monitoring program, executable by the system controllers, can be provided within the FCB module in order to generate a "recharge necessary" light (e.g. LED) 34 on the exterior of the module housing, as shown in FIG. 1, or host device so as to visually signal the user to recharge the FCB module as soon as possible (i.e. while there is still a sufficient amount of metal fuel available on the metal-fuel card to drive the electromechanical device 33). The above-described way of translating the metal-fuel card from its discharging position to its recharging position, and vice versa, will be preferred in applications where it is desirable or necessary to retain the FCB module within the storage compartment of the electrical host device or system during discharging and recharging modes of operation alike. Using this automated method of metal-fuel card translation allows the FCB module to be switched from its discharging configuration and mode of operation, to its recharging configuration and mode of operation, simply by supplying a source of input power to the FCB module and possibly, although not necessarily, actuation of "start recharging" switch or button provided on the FCB module or electrical host device consuming electrical power produced from the FCB module.

As shown in FIGS. 9A through 9E, a piezo-electric crystal or electromagnetic coil 35 is mechanically attached to one end of the metal-fuel card in order to vibrate the same during recharging operations in order to avoid dendrite formation and anode deformation. Like all other subcomponents, the operation of this vibratory element will also be controlled by the system controller or like device.

As shown in FIG. 5A, the discharging-optimized cathode elements 21A are connected to electrical loads externally-connected to the system for carrying out discharging operations, whereas the recharging-optimized cathode elements 21B are connected to electrical power sources externally-connected to the system for carrying out recharging operations. As will be described in greater detail hereinafter, each discharging-optimized cathode element 21A and corresponding anode-contacting element 24A, forms one "discharging cell", which is regulated by a semiconductor power switching device (e.g. transistors or MOSFETs) provided for within the discharging cell output terminal reconfiguration subsystem 205, shown in FIG. 5A, for regulating the power output from the discharging cells during discharging operations. Likewise, each recharging-optimized cathode element 21B and corresponding anode-contacting element 24B, forms one "recharging cell" which is regulated by a semiconductor power switching device (e.g. transistors or MOSFETs) provided for within the recharging cell input terminal reconfiguration subsystem 244, for regulating the input power supplied to the recharging cells during recharging operations.

The dimensions of the discharging-optimized cathode elements and recharging-optimized cathode elements are both close to the thickness of the overall thickness of the discharging and recharging cells, respectively. In such instances, the current distribution on the anode elements can be close to half of the current density on the discharging-optimized and recharging-optimized cathode elements, thereby increasing the anode discharge/recharge cycle life.

In the illustrative embodiments, the FCB power producing module 1 employs passive diffusion of ambient oxygen $O_2$ to the segmented arrangement of discharging-optimized cathode elements 21A, rather than actively forced or controlled air flow thereto during discharging operations. Similarly, the FCB power producing module 1 employs passive diffusion of liberated $O_2$ to the segmented arrangement of recharging-optimized cathode elements 21B, rather than actively evacuated or exhausted air flow therefrom during recharging operations. Notably, while actively-forced $O_2$ flow can be used, as taught in Applicant's U.S. Pat. No. 6,306,534 incorporated herein by reference, the passive-diffusion approach to $O_2$ transport simplifies the construction and cost of the FCB power producing module hereof without compromising its performance in a diverse range of power applications.

As shown in FIGS. 1 through 3, the module housing 15 has a pair of electrical power terminals 36, accessible external to the module housing, for physically contacting the positive and negative power terminals of a host system (e.g.

cell phone 7 or laptop computer system 8) when the module housing 15 is loaded into the battery storage compartment thereof. In any particular application, the overall size of the power generation module will be slightly less than the dimensions of the battery compartment into which it is to be installed.

Input/Output Control Subsystem within the Metal-Fuel Card Discharging Subsystem

In some applications, it may be desirable or necessary to combine two or more FCB systems or their Metal-Fuel Card Discharging and Recharging Subsystems 2 and 3 in order to form a resultant system with functionalities not provided by the such subsystems operating alone. Contemplating such applications, the FCB power generation system hereof includes Input/Output Control Subsystem 224 which allows an external system (e.g. microcomputer or microcontroller) to override and control aspects of the Metal-Fuel Card Discharging and/or Recharging Subsystem as if its system controller were carrying out such control functions. In the illustrative embodiment, the Input/Output Control Subsystem 4 is realized as a standard IEEE I/O bus architecture which provides an external or remote computing, control or information processing system with a way and means of directly interfacing with the system controller 5 and managing various aspects of system and subsystem operation in a straightforward manner.

Metal-Fuel Card Discharging Subsystem of the Present Invention

As shown in FIGS. 4A7 and 5A, the Metal-Fuel Card Discharging Subsystem 2 comprises a number of subsystems, namely: the hybrid multi-element discharging/recharging head assembly 6; "discharging" cathode-anode (i.e. cell) output terminal configuration subsystem 205 for configuring the output terminals of the discharging-optimized cathode and anode-contacting elements (21A and 24A) under the control of system controller 5 so as to maintain the output voltage required by a particular electrical load connected to the FCB system; a "discharging" cathode-anode (i.e. cell) voltage monitoring subsystem 206A, connected to the discharging cathode-anode (i.e. cell) output terminal configuration subsystem 205 for monitoring (i.e. sampling) the voltages produced across each discharging cell along the multi-element cathode structure, and producing (digital) data representative of the sensed voltage levels; a "discharging" cathode-anode (i.e. cell) current monitoring subsystem 206B, connected to the discharging cell output terminal configuration subsystem 205, for monitoring (e.g. sampling) the currents flowing through the cathode-anode (i.e. cell) interfaces of each discharging cell during the Discharging Mode, and producing digital data representative of the sensed current levels; a relational-type Metal-Fuel Database Management Subsystem (MFDMS) 308 operably connected to system controller 5 by way of local system bus 309, and designed for receiving particular types of information derived from the output of various subsystems; a Data Capture and Processing Subsystem (DCPS) 400 including a programmed microprocessor-based data processor adapted to (i) receive data signals produced from discharging cell voltage monitoring subsystem 206A and discharging cell current monitoring subsystem 206B, and enable (ii) the reading metal-fuel card identification data from the loaded metal-fuel card, (iii) the recording sensed discharge parameters and computed metal-oxide indicative data derived therefrom in the Metal-Fuel Database Management Subsystem 308 using local system bus 401, and (iv) the reading prerecorded recharge parameters and prerecorded metal-fuel indicative data stored in the Metal-Fuel Database Management Subsystem (MFDMS) 308 using local system bus 309; a discharging (i.e. output) power regulation subsystem 223 connected between the output terminals of the discharging cell output terminal configuration subsystem 205 and the input terminals of the electrical load 200 connected to the FCB system for regulating the output power delivered across the electrical load (and regulate the voltage and/or current characteristics as required by the Discharge Power Control Method carried out by the system controller 203).

Metal-Fuel Card Recharging Subsystem of the Present Invention

As shown in FIGS. 4A7 and 5A, the Metal-Fuel Card Recharging Subsystem 3 of the illustrative embodiment comprises a number of subsystems, namely: the hybrid multi-element discharging/recharging head assembly 6; an input power supply subsystem 243 for converting externally supplied AC power signals (e.g. supplied from a 110–220 volt, 50–60 Hertz source) into DC power supply signals having voltages suitable for recharging metal-fuel regions along the metal-fuel card loaded within the discharging/recharging head assembly 6; a "recharging" cathode-anode (i.e. cell) input terminal configuration subsystem 244, for connecting the output terminals (i.e. port) of the input power supply subsystem 243 to the input terminals (i.e. port) of the recharging-optimized cathode elements 21B and anode-contacting elements 24B of the recharging cells, under the control of the system controller 5 so as to supply input voltages thereto for electro-chemically converting metal-oxide formations into its primary metal during the Recharging Mode; a "recharging" cathode-anode (i.e. cell) voltage monitoring subsystem 206A', connected to the cathode-anode (i.e. cell) input terminal configuration subsystem 244, for monitoring (i.e. sampling) the voltage applied across the cathode and anode structures of each recharging cell, and producing (digital) data representative of the sensed voltage levels; a "recharging" cathode-anode (i.e. cell) current monitoring subsystem 206B', connected to the recharging cell input terminal configuration subsystem 244, for monitoring (i.e. sampling) the electrical currents flowing through the cathode and anode structures of each recharging cell, and producing (digital) data representative of the sensed current levels; a relational-type metal-fuel database management subsystem (MFDMS) 404 operably connected to system controller 5 and designed for receiving particular types of information devised from the output of various subsystems within the Metal-Fuel Card Recharging Subsystem 3; a Data Capture and Processing Subsystem (DCPS) 406 including a programmed microprocessor-based data processor adapted to (i) receive data signals produced from recharging cell voltage monitoring subsystem 206A' and recharging cell current monitoring subsystem 206B' and enable (ii) the reading metal-fuel card identification data from the loaded metal-fuel card, (iii) the recording sensed recharge parameters and computed metal-fuel indicative data derived therefrom in the Metal-Fuel Database Management Subsystem 404 using local system bus 407, and (iv) the reading prerecorded discharge parameters and prerecorded metal-oxide indicative data stored in the Metal-Fuel Database Management Subsystem 404 using local system bus 405. These subsystems will be described in greater technical detail below.

Multi-Element Segmented Cathode Structure of the Present Invention

As shown in greater detail in FIGS. 4A1 through 4A7, the multi-element cathode structure 20 comprises: a cathode element support plate 198 having a first plurality of isolated recesses 224A and a second plurality of isolated recesses 224B, each permitting the free flow of oxygen ($O_2$) through perforations 225 formed in the bottom portion thereof; a first plurality of electrically-conductive discharging-optimized cathode elements (e.g. strips) 21A for insertion within the lower portion of recesses 224A, and a second plurality of electrically-conductive recharging-optimized cathode elements (e.g. strips) 21B for insertion within the lower portion of recesses 224B; and a plurality of electrolyte-impregnated strips 226A and 226B for placement over the cathode strips 21A and 21B, and support within the recesses 224A and 224B, respectively.

As shown in FIGS. 4A3A and 4A3B, each electrolyte-impregnated strip 226A and 226B is realized by impregnating an electrolyte-absorbing carrier strip with a gel-type electrolyte. Preferably, the electrolyte-absorbing carrier strip is realized as a strip of low-density, open-cell foam material made from PET plastic. The gel-electrolyte for the discharging and recharging cells alike can be made from a formula consisting of alkali solution, a gelatin material, water, and additives well known in the art.

As shown in FIG. 4A2A, each discharging-optimized cathode strip 21A is made from a sheet of nickel wire mesh 228A coated with porous carbon material and granulated platinum or other catalysts 229A to form a discharging-type cathode element that is optimized for use during discharging operations carried out within the metal-air FCB module of the present invention. Details of cathode construction for use in air-metal FCB systems are disclosed in U.S. Pat. Nos. 4,894,296 and 4,129,633, incorporated herein by reference. To form a current collection pathway, an electrical conductor (nickel) 230A is soldered to the underlying wire mesh sheet 228A of each cathode strip. As shown in FIG. 4A7, each electrical conductor 230A, attached to its cathode strip is passed through a hole 231A formed in the bottom surface of a recess of the cathode support plate 198, and is connected to an electrical conductor (e.g. wire) which extends out from its respective subchamber and terminates at a conventional conductor 235A. During assembly, the cathode strip pressed into the lower portion of the recess to secure the same therein.

As shown in FIG. 4A2B, each recharging-optimized cathode strip 21B is made from a sheet of rigid nickel wire mesh 228A coated with porous carbon material and granulated platinum or other catalysts 229B to form a recharging-type cathode element that is optimized for use during recharging operations carried out within the metal-air FCB module of the present invention. Details of cathode construction for use in air-metal FCB systems are disclosed in U.S. Pat. Nos. 4,894,296 and 4,129,633, incorporated herein by reference. To form a current collection pathway, an electrical conductor (nickel) 230B is soldered to the underlying wire mesh sheet 228B of each cathode strip. As shown in FIG. 4A1, each electrical conductor 230B, attached to its cathode strip is passed through a hole 231B formed in the bottom surface of a recess of the cathode support plate 198, and is connected to an electrical conductor (e.g. wire) which terminates at a conventional conductor. During assembly, the cathode strip pressed into the lower portion of the recess to secure the same therein.

As shown in FIG. 4A1, the bottom surface of each recess 224A and 224B has numerous perforations 225 formed therein to allow the free passage of air and oxygen therethrough to the cathode strips 21A and 21B, respectively, (at atmospheric temperature and pressure). In the illustrative embodiment, electrolyte-impregnated strip 226A is placed over each cathode strip 21A, and secured within the upper portion of the cathode supporting recess by adhesive, retaining structures or the like. Similarly, electrolyte strip 226B is placed over each cathode 21B As shown in FIG. 4A2B, when the cathode strips and thin electrolyte strips are mounted in their respective recesses in the cathode support plate 198, the outer surface of each electrolyte-impregnated strip is disposed flush with the upper surface of the plate defining the recesses.

The interior surfaces of the cathode support recesses 224A and 224B are coated with a hydrophobic material (e.g. Teflon) to ensure the expulsion of water within electrolyte-impregnated strips 226A and 226B and thus optimum oxygen transport across the cathode strips. Hydrophobic agents are added to the carbon material constituting the oxygen-pervious cathode elements in order to repel water therefrom. Preferably, the cathode support plate is made from an electrically non-conductive material, such as polyvinyl chloride (PVC) plastic material well known in the art. The cathode support plate can be fabricated using injection-molding technology also well known in the art.

Multi-Segment Metal-Fuel Card of the Present Invention

The structure of the metal-fuel card 29 of the illustrative embodiment loaded into the FCB system of FIG. 1 is illustrated in greater detail in FIGS. 4A4 and 4A5. As shown, the metal fuel card comprises: an electrically non-conductive anode support plate 228 of rigid construction having a plurality of recesses 194A and 194B formed therein and a longitudinal slot or hole 300 formed through the bottom surface of each neighboring pairs of recesses associated with discharging and recharging cells as shown in FIG. 4A4; and the plurality of strips of metal (e.g. zinc fuel) 195, each being disposed within a recess within the anode support plate 228. Notably, the spacing and width of each metal fuel strip is designed so that it is spatially registered with a corresponding cathode strip in the discharging/recharging head of the system in which the fuel card is intended to be used. The metal-fuel card described above can be made by forming zinc strips in the shape of recesses in the anode support plate, and then inserting a metal fuel strip into each of the recesses. When inserted within its respective recess in the cathode-anode (i.e. cell) support plate 228, each metal fuel strip is electrically isolated from all other metal fuel strips.

In the FCB system of FIG. 3, metal-fuel card 29 has multiple fuel zones, as taught, in principle, in Applicant's copending application Ser. No. 08/944,507, supra. The use of a "multi-zoned" metal-fuel card and a multi-zoned discharging/recharging head enables the simultaneous production of multiple output voltages {V1, V2, . . . , Vn} selectable by the end user. Such output voltages can be used for driving various types of electrical loads 200 connected to the output power terminals 201 of the FCB system, as shown in FIG. 5A. This is achieved by selectively configuring the individual output terminals of the cathode and anode-contacting structures of each discharging cell so that the output voltages produced thereacross during card discharging operations can be combined in an additive manner in accordance with well known laws of physics.

In general, the multi-zone metal-fuel card 29 can be made using several different techniques. Preferably, the metal-fuel elements contained with each card-like device is made from zinc as this metal is inexpensive, environmentally safe, and easy to work. Several different techniques will be described below for making zinc-fuel elements according to this embodiment of the present invention.

For example, in accordance with a first fabrication technique, a thin metal layer (e.g. nickel or brass) of about 0.1 to about 5 microns thickness is applied to the surface of low-density plastic material (drawn and cut in the form of a card-like structure). The plastic material should be selected so that it is stable in the presence of an electrolyte such as KOH. The function of the thin metal layer is to provide efficient current collection at the anode surface. Thereafter, zinc powder is mixed with a binder material and then applied as a coating (e.g. 1–500 microns thick) upon the surface of the thin metal layer. The zinc layer should have a uniform porosity of about 50% to allow the ions within the ionically-conducting medium (e.g. electrolyte ions) to flow with minimum electrical resistance between the cathode and anode structures. As will be explained in greater detail hereinafter, the resulting metal-fuel structure can be mounted within an electrically insulating casing of thin dimensions to improve the structural integrity of the metal-fuel card 29, while providing the discharging heads access to the anode structure when the card is loaded within its card storage bay. The casing of the metal-fuel card can be provided with a slidable panel that enables access to the metal-fuel strips when the card is received in the storage bay and the discharging head is transported into position for discharging operations.

In accordance with a second fabrication technique, a thin metal layer (e.g. nickel or brass) of about 0.1 to about 5 microns thickness is applied to the surface of low-density plastic material (drawn and cut in the form of card). The plastic material should be selected so that it is stable in the presence of an electrolyte such as KOH. The function of the thin metal layer is to provide efficient current collection at the anode surface. Thereafter zinc is electroplated onto the surface of the thin layer of metal. The zinc layer should have a uniform porosity of about 50% to allow ions within the ionically-conducting medium (e.g. electrolyte) to flow with minimum electrical resistance between the cathode and anode structures. As will be explained in greater detail hereinafter, the resulting metal-fuel structures can be mounted within an electrically insulating casing of thin dimensions to provide a metal-fuel card having suitable structural integrity, while providing the discharging heads access to the anode structure when the card is loaded within its card storage bay. The casing of the metal-fuel card can be provided with slidable panels that enable access to the metal-fuel strips when the card is received in the storage bay and the discharging head is transported into position for discharging operations.

In accordance with a third fabrication technique, zinc power is mixed with a low-density plastic base material and drawn into electrically-conductive sheets. The low-density plastic material should be selected so that it is stable in the presence of an electrolyte such as KOH. Each electrically-conductive sheet should have a uniform porosity of about 50% to allow ions within the ionically-conducting medium (e.g. electrolyte) to flow with minimum electrical resistance between the current collecting elements of the cathode and anode structures.

Then a thin metal layer (e.g. nickel or brass) of about 1 to 10 microns thickness is applied to the surface of the electrically-conductive sheet. The function of the thin metal layer is to provide efficient current collection at the anode surface. As will be explained in greater detail hereinafter, the resulting metal-fuel structures can be mounted within an electrically insulating casing of thin dimensions to provide a metal-fuel card having suitable structural integrity, while providing the discharging heads access to the anode structure when the card is loaded within its card storage bay. The card housing can be made from any suitable material designed to withstand heat and corrosion. Preferably, the housing material is electrically non-conducting to provide an added measure o user-safety during card discharging and recharging operations.

Each of the above-described techniques for manufacturing metal-fuel elements can be ready modified to produce "double-sided" metal-fuel cards, in which single track or multi-zone metal-fuel layers are provided on both sides of the base (i.e. substrate) material. Such embodiments of metal-fuel cards will be useful in applications where discharging heads are to be arranged on both sides of metal-fuel card loaded or otherwise installed within the FCB system. When making double-sided metal-fuel cards, it will be necessary in most embodiments to form a current collecting layer (of thin metal material) on both sides of the plastic substrate so that current can be collected from both sides of the metal-fuel card, associated with different cathode structures. When making double-sided fuel cards, it may be desirable or necessary to laminate together two metal-fuel sheets together, as described hereinabove, with the substrates of each sheet in physical contact. Adaptation of the above-described methods to produce double-sided metal-fuel cards will be readily apparent to those skilled in the art having had the benefit of the present disclosure. In such alternative embodiments of the present invention, the anode-contacting structures within the each discharging head will be modified so that electrical contact is established with each electrically-isolated current collecting layer formed within the metal-fuel card structure being employed therewith.

Multi-Element Anode-Contacting Structure of the Present Invention

In FIG. 4A6, an exemplary metal-fuel (anode) element contacting structure (assembly) 23 is disclosed for use with the multi-element fuel card 29 having cathode support structure 228. As shown in FIGS. 4A6 and 4A7, a plurality of electrically conductive elements 24A and 24B in the form of conductive posts are supported from a metal-fuel contacting support platform 233. The position of these electrically conductive posts spatially coincide with the elongated slots 300 formed in the bottom surfaces of recesses in the anode supporting plate 228. As shown, each electrical conductors 234 is electrically connected to a conductive post 24A or 24B, and anchored along the surface of the anode support plate (e.g. within a recessed groove) and terminate in a conventional connector 235B similar to conductors terminating at electrical connector 235A. This connector is electrically connected to the discharging cell output terminal configuration subsystem 205. The width and length dimensions of the anode-contacting element support plate 233 are substantially similar to the width and length dimensions of the cathode support plate 198 as well as the anode metal-fuel support plate 228.

FIG. 4A7 illustrates the spatial relationship between the anode contacting support plate 198, cathode support plate 233, and anode (metal-fuel) support plate (i.e. fuel card) 228 when the fuel card 29 is loaded therebetween. In this loaded configuration, each discharging-optimized and recharging-optimized cathode element 21A and 21B along the cathode support plate 198 establishes ionic contact with the front exposed surface of a spatially-corresponding metal-fuel element 21A (21B) by way of electrolyte-impregnated pad 226A (226B) disposed therebetween. Also, in this loaded configuration, each anode-contacting element (e.g. conductive post) 24A (24B) projects from the anode contacting support plate 233 through elongated central hole formed therein in the anode-contacting support plate 233 and establishes electrical contact with the corresponding metal-fuel strip 21A (21B) mounted therein, completing an electrical circuit through a single discharging (or recharging) cell of the present invention.

Advantages Associated with the Hybrid Discharging/Recharging Head Assembly of the Present Invention Notably, as the recharging-optimized cathode elements in FCB system 1 are made from a rigid porous metal, such as nickel, the life of such recharging-optimized cathode elements should be extremely long. In addition, as each anode element can be made to operate at low current densities, discharge/recharge cycle life of the anode can significantly increased by virtue of the present invention. As the rechargeablity of each discharging cell is improved using the cathode structure of the present invention, the depth of discharge of each metal-fuel element/region of the metal-fuel card can thus be significantly higher than that achieved in conventional rechargeable zinc-air FCB systems. Thus, the energy density of the FCB system 1 can be significantly higher as well. In addition, both discharge-only and recharge-only cathode elements can be made light-weight and thin, thereby reducing the weight and volume contributions to the overall system and thus increasing the energy density thereof. Also, as the discharging-optimized (i.e. discharge-only) and recharging-optimized (i.e. recharge-only) cathode elements are optimized for low polarization, both the discharging and recharging cells should have high energy efficiency.

Assembling the Components of the FCR Power Generation Module

The components of the FCB power producing module shown in FIG. 3 can be assembled in the manner described below. The first and second PC boards 18A and 18B are installed within the lower housing portion 15A of the metal-air FCB power producing module. Then, the multi-element cathode cartridge 20 is slidably inserted into the first storage recess 16B formed in the lower housing portion of the module, causing the edge-located conductive elements 25 on the multi-element cathode structure (i.e. cartridge) to engage with respective conductive elements associated with the first pair of connectors 26 on the first PC board 18A. Then, the second pair of edge-located conductive elements 28 on the anode-contacting structure (i.e. cartridge) 23 are slidably engaged with respective conductive elements associated with the second pair of connectors 27 on the first PC board 18A, and then the metal-fuel card 29 is slidably installed within the recess formed between the multi-element cathode structure 20 and the multi-element anode-contacting structure 23. Then, the housing end panel 15C, supporting the integrated discharging/recharging configuration switch 32, is snap-fitted into the slots 31A, formed on the open end of the lower housing portion 15A, and thereafter the upper housing portion 15B is snap-fitted onto the lower housing portion 15A, with the top portion of end panel 15C filtering into slot 31B in upper housing portion 15B, thereby containing all of the components of the module within the assembled housing.

Preferably, the outer edge portions of the cathode cartridge 20 and metal-fuel card 29 are each adapted to form a vapor tight seal with the module housing when the multi-element cathode cartridge and metal-fuel card are loaded within the module housing, as shown in FIG. 1. This will prevent the electrolyte from evaporating prior to discharging operations. Optionally, a small reservoir of water or electrolyte make-up solution can be encapsulated within support plate of the cathode cartridge and distributed to the electrolyte pads via micro conduits formed along the substructure. The electrolyte supply can protrude from the surface of the cathode cartridge surface, on the side thereof which contacts metal-fuel card, so that the metal-fuel card exerts force on the protrusion when the metal-fuel card is loaded in the FCB module. The protrusion structure can be similar to the bulbous structure provided in conventional devices used to package and dispense saline solution to human eyes by applying pressurized action upon the dispenser. As electrolyte is consumed during discharging operations, additional electrolyte is automatically withdrawn from the electrolyte reservoir within the cathode cartridge by way of pressure exerted upon the cathode substrate by the metal fuel card loaded within the FCB module. It is understood, however, that there are numerous other ways of providing an ionically-conducting medium between each cathode element and metal-fuel element within the FCB module. Such alternative techniques might include ionically-conducting polymers having a lifecycle engineered for 50 or more recharging cycles prior to requiring replacement. Even in such embodiments, it may be desirable to apply or supply a sufficient i amount of $H_2O$ at the interface between the anode and ionically-conductive medium. The above-described fluid dispensing technique can be used in such instances.

When fully assembled, as shown in FIG. 1, each discharging-optimized cathode element 21A supported along the multi-element cathode structure 198 is spatially-aligned with one anode-contacting element 24A supported along the anode-contacting structure 233, thereby forming a single "discharging cell." Also, each recharging-optimized cathode element 21B supported along the multi-element cathode structure 198 is spatially-aligned with one anode-contacting element 24B supported along the anode-contacting structure 233, thereby forming a single "recharging cell". In the illustrative embodiment shown in FIG. 3, there are two columns of sixteen (or more) cathode elements (i.e. segments) spatially arranged along the surface of the multi-element cathode structure of the present invention. Thus, there are sixteen discharging cells and sixteen recharging cells provided for within the discharging/recharging head assembly 6 of the present invention. As shown in FIG. 3, each recharging cell is contiguous with a pair of neighboring discharging cells along the direction of the longitudinal axis of the metal-fuel cell. Also, a small region of the metal-fuel card is disposed between each discharging cell and each recharging cell arranged within the discharging/recharging head assembly.

Discharging Cell Output Terminal Configuration Subsystem

As shown in FIG. 5A, the discharging cell output terminal configuration subsystem 205 is connected between the input terminals of the discharging power regulation subsystem 223 and the output terminals of the cathode-anode pairs of each discharging cell. The system controller 5 is operably connected to discharging cell output terminal configuration subsystem 205 in order to supply control signals for carrying out its functions during the Discharging Mode of operation. The function of the discharging cell output terminal configuration subsystem 205 is to automatically configure (in series or parallel the output terminals of selected cathode-anode pairs of the discharging cells that the required output voltage level is produced across the electrical load 20 connected to the FCB system during card discharging operations. As shown in FIG. 5A, the discharging cell output terminal configuration mechanism 205 can be realized as one or more electrically-controllable power switching transistor or like devices, wherein the cathode and anode-contacting elements associated with the discharging cells are connected to the input terminals of the discharging power regulating subsystem 223. Such electrical switching operations are carried out by controller 10 under the control of the system controller 5 so that the required output voltage is produced across the electrical load connected to the discharging output power regulating subsystem 223 of the FCB system.

As shown in FIG. 5B1, an illustrative embodiment of the discharging cell output terminal configuration mechanism 205 comprises: a solid-state power switching transistor (e.g. MOSFET) 100 connected in electrical series with (i) each discharging cell (21A, 22B, 24A) provided for along the hybrid discharging/recharging head assembly 6, and (ii) the discharging output power regulation subsystem 223. As shown, each switching transistor 100, for activating a preassigned discharging cell, is controlled by a microprocessor-based discharging/recharging cellswitching controller 101 that senses the output current, voltage and/or power level produced by the individual and group of electrically-enabled discharging cells (i.e. in the form of a feedback signals 102), and on the basis of the detected feedback signals, electronically-activates the corresponding switching transistors 100 in order to control the current, voltage and/or power produced by the discharging cells so as to carry out the Discharging Power Control Method selected within the system controller 5. Typically, the same microprocessor or microcontroller used to realize the functions of the system controller 5 can be used to carry out the functions of the discharging/recharging cell switching controller 101.

Discharging Cell Voltage Monitoring Subsystem within the Metal-Fuel Card Discharging Subsystem As shown in FIG. 5A, the discharging cell voltage monitoring subsystem 206A is operably connected to the discharging cell output terminal configuration subsystem 205 for sensing voltage levels and the like therewithin. This subsystem is also operably connected to the system controller for receiving control signals required to carry out its functions. In the first illustrative embodiment, the discharging cell voltage monitoring subsystem 206A has two primary functions: (i) to automatically sense the instantaneous voltage level produced across the cathode-anode elements associated with each discharging cell during the Discharging Mode; and (ii) to produce a (digital) data signal indicative of the sensed voltages for detection, analysis and response by Data Capture and Processing Subsystem 400.

In the illustrative embodiment, the Discharging cell Voltage Monitoring Subsystem 206A can be realized using electronic circuitry adapted for sensing voltage levels produced across the cathode-anode elements associated with each discharging cell in the FCB system. In response to such detected voltage levels, the electronic circuitry can be designed to produce digital data signals indicative of the sensed voltage levels for detection and analysis by Data Capture and Processing Subsystem 400.

Discharging Cell Current Monitoring Subsystem within the Metal-Fuel Card Discharging Subsystem As shown in FIG. 5A, the discharging cell current monitoring subsystem 206B is operably connected to the discharging-cell output terminal configuration subsystem 205. The discharging-cell current monitoring subsystem 206B has two primary functions: (i) to automatically sense the magnitude of electrical currents flowing through the cathode-anode (i.e. cell) pair of each discharging cell in the FCB system during the Discharging Mode; and (ii) to automatically produce digital data signals indicative of the sensed currents for detection and analysis by Data Capture and Processing Subsystem 400. In the first illustrative embodiment of the present invention, the discharging cell current monitoring subsystem 206B can be realized using current sensing circuitry for sensing electrical currents flowing through the cathode-anode pairs of each discharging cell in the FCB system, and producing digital data signals indicative of the sensed currents passing therethrough. As will be explained in greater detail hereinafter, these detected current levels are used by the system controller 5 in carrying out its discharging power regulation method, and well as creating a "discharging condition history" and metal-fuel availability records for each fuel zone on the discharged metal-fuel card.

Data Capture and Processing Subsystem within the Metal-Fuel Card Discharging Subsystem In the illustrative embodiment, Data Capture And Processing Subsystem (DCPS) 400 shown in FIG. 5A carries out a number of functions, including, for example: (1) sensing (i.e. detecting) various "discharge parameters" within the Metal-Fuel Card Discharging Subsystem 2 existing during the time period that the metal-fuel card is loaded within the discharging/recharging head assembly thereof; (2) computing one or more parameters, estimates or measures indicative of the amount of metal-oxide produced during discharging operations, and producing "metal-oxide indicative data" representative of such computed parameters, estimates and/or measures; and (3) recording in the Metal-Fuel Database Management Subsystem 400 (accessible by system controller 5, sensed discharge parameter data as well as computed metal-fuel indicative data both correlated to its respective metal-fuel element during the Discharging Mode of operation. As will become apparent hereinafter, such recorded information maintained within the Metal-Fuel Database Management Subsystem 308 by Data Capture and Processing Subsystem 400 can be used by the system controller 5 in various ways including, for example: optimally discharging (i.e. producing electrical power from) partially or completely oxidized metal-fuel elements or regions on a metal-fuel card in an efficient manner during the Discharging Mode of operation; and optimally recharging partially or completely oxidized metal-fuel elements or regions along a metal-fuel card in a rapid manner during the Recharging Mode of operation.

During discharging operations, the Data Capture and Processing Subsystem 400 automatically samples (or captures) data signals representative of "discharge parameters" associated with the various subsystems constituting the Metal-Fuel Card Discharging Subsystem 5 described above. These sampled values are encoded as information within the data signals produced by such subsystems during the Discharging Mode. In accordance with the principles of the present invention, "discharge parameters" shall include, but are not limited to: the discharging voltages produced across the discharging-optimized cathode and anode structures along particular metal-fuel elements monitored, for example, by the discharging cell voltage monitoring subsystem 206A; and the electrical (discharging) currents flowing across the discharging-optimized cathode and anode structures along particular metal-fuel tracks monitored, for example, by the discharging cell current monitoring subsystem 206B; and the time duration ($\Delta T_d$) of the state of any of the above-identified discharge parameters. In alternative embodiments, the discharge parameters may also include: the oxygen saturation level ($pO_{2d}$) within the discharging-optimized cathode structure of each discharging cell, monitored by a cathode oxygen pressure control subsystem to be provided within the FCB system as taught in Applicant's U.S. Pat. No. 6,306,534; the moisture ($H_2O_d$) level (or relative humidity) level across or near the discharging-optimized cathode-electrolyte interface along particular metal-fuel elements in monitored, for example, by a ion-concentration control subsystem to be provided within the FCB system as taught in Applicant's co-pending application Ser. No. 09/116,643; and the temperature ($T_r$) of the discharging cells during card discharging operations in monitored, for example, by a temperature monitoring subsystem to be provided within the FCB system as taught in Applicant's co-pending application Ser. No. 09/116,643.

Discharging Power Regulation Subsystem within the Metal-Fuel Card Discharging Subsystem As shown in FIG. 5A, the input port of the discharging power regulation subsystem 223 is operably connected to the output port of the discharging-cell input terminal configuration subsystem 205, whereas the output port of the discharging power regulation subsystem 223 is operably connected to the input port of the electrical load 200. While the primary function of the discharging power regulation subsystem 223 is to regulate the electrical power delivered the electrical load 200 during its Discharging Mode of operation (i.e. produced from each loaded discharging cell in the hybrid discharging/recharging head assembly 6), the discharging power regulation subsystem 223 has a mode of programmed operation, wherein the output voltage across the electrical load as well as the electrical current flowing across the cathode-anode (i.e. cell) interface of any particular discharging cell is regulated during discharging operations. Such control functions are managed by the system controller 5 and can be programmably selected in a variety of ways in order to achieve optimal regulation to the electrical load 200 as multi-element and single-element (i.e. non-segmented) metal-fuel cards are discharged in accordance with the principles of the present invention.

The discharging power regulating subsystem 223 can be realized using solid-state power, voltage and current control circuitry well known in the power, voltage and current control arts. Such circuitry can include electrically-programmable power switching circuits using transistor-controlled technology, in which one or more current-controlled power sources are connectable- in electrical series with the cathode and anode structures in order to control the electrical currents therethrough in response to control signals produced by the system controller 5 carrying out a particular Discharging Power Control Method. As indicated hereinabove, such electrically-programmable power switching circuits can also include transistor-controlled technology (e.g. MOSFETS), in which one or more voltage-controlled sources are connectable in electrical parallel with the cathode and anode structures in order to control the voltage thereacross in response to control signals produced by the system controller. Such circuitry can be combined and controlled by the system controller 5 in order to provide constant power (and/or voltage and/or current) control across the electrical load 200.

In the illustrative embodiments of the present invention, the primary function of the discharging power regulation subsystem 223 is to carry out real-time power regulation to the electrical load 200 using any one of the following Discharge Power Control Methods, namely: (1) a Constant Output Voltage/Variable Output Current Method, wherein the output voltage across the electrical load is maintained constant while the current is permitted to vary in response to loading conditions; (2) a Constant Output Current/Variable Output Voltage Method, wherein the current into the electrical load is maintained constant while the output voltage thereacross is permitted to vary in response to loading conditions; (3) a Constant Output Voltage/Constant Output Current Method, wherein the voltage across and current into the load are both maintained constant in response to loading conditions; (4) a Constant Output Power Method, wherein the output power across the electrical load is maintained constant in response to loading conditions; (5) a Pulsed Output Power Method, wherein the output power across the electrical load is pulsed with the duty cycle of each power pulse being maintained in accordance with preset conditions; (6) a Constant Output Voltage/Pulsed Output Current Method, wherein the output current into the electrical load is maintained constant while the current into the load is pulsed with a particular duty cycle; and (7) a Pulsed Output Voltage/Constant Output Current Method, wherein the output power into the load is pulsed while the current thereinto is maintained constant.

In the preferred embodiment of the present invention, each of the seven (7) Discharging Power Regulation Methods are preprogrammed into ROM associated with the system controller 5. Such power regulation methods can be selected in a variety of different ways, including, for example, by manually activating a switch or button on the module housing, by automatic-detection of a physical, electrical, magnetic or optical condition established or detected at the interface between the electrical load and the Metal-Fuel Card Discharging Subsystem 2 within the FCB power generating module.

In FIG. 5B2, the FCB module 1 is shown operated using the Pulsed Output Power Method, wherein the hybrid discharging/recharging head assembly 6 is configured differently electronically than shown in FIG. 5B1. As shown therein, each of the individual discharging cells are controlled by the discharging/recharging cell switching controller 101 so that each discharging cell produces a full-scale power pulse in sequence, thus enabling the current level in the output power from the discharging power regulation subsystem 223 to be higher than normal discharge current, due to some idle intervals between two active discharging cells.

Alternatively, by pulsing each discharging cell at variable frequency and amplitude, it is possible to maximize power output or satisfy various types of loading conditions. The switching transistors 100 associated with each discharging cell can also be modulated to produce different power output levels at different voltages and currents during different applications. In many applications, it will be important to increase the voltage output, because, as the output voltage increases, the output current typically decreases, and by producing lower output currents, there will be less IR loss and heat dissipation problems associated with the electrical load connected to the FCB power generation module.

System Controller within the FCB Power Generation System

As illustrated in the detailed description set forth above, the system controller 5 performs numerous operations in order to carry out the diverse functions of the FCB system within its Discharging Mode. In the preferred embodiment of the FCB system of FIG. 3, the system controller 5 is realized using a programmed microcontroller having program and data storage memory (e.g. ROM, EPROM, DRAM and the like) and a system bus structure well known in the microcomputing and control arts. In any particular embodiment of the present invention, it is understood that two or more microcontrollers may be combined in order to carry out the diverse set of functions performed by the FCB system hereof. All such embodiments are contemplated embodiments of the system of the present invention.

Input Power Supply Subsystem within the Metal-Fuel Card Recharging Subsystem

In the illustrative embodiment, the primary function of the Input Power Supply Subsystem 243 is to receive as input, standard alternating current (AC) electrical power (e.g. at 120 or 220 Volts) through an insulated power cord, and to convert such electrical power into regulated direct current (DC) electrical power at a regulated voltage required at across each recharging cell during the recharging mode of operation. For zinc anodes and carbon cathodes, the required "open-cell" voltage vac. across each recharging cell during recharging is about 2.2–2.3 Volts in order to sustain electrochemical reduction of the anode elements. This subsystem can be realized in various ways using power conversion and regulation circuitry well known in the art.

Recharging Cell Input Terminal Configuration Subsystem within the Metal-Fuel Card Recharging Subsystem As shown in FIG. 5A, the recharging cell input terminal configuration subsystem 244 is connected between the input terminals of the recharging power regulation subsystem 245 and the input terminals of the cathode-anode pairs associated with each recharging cell within the FCB system. The system controller 5 is operably connected to recharging cell input terminal configuration subsystem 244 in order to supply control signals thereto for carrying out its functions during the Recharge Mode of operation.

The function of the recharging cell input terminal configuration subsystem 244 is to automatically configure (in series or parallel) the input terminals associated with electronically-enabled recharging cells in the FCB system so that the required input (recharging) voltage level is applied across each such recharging cell containing discharged fuel material requiring recharging. In the illustrative embodiment of the present invention, the recharging cell input terminal configuration mechanism 244 can be realized as one or more electrically-controllable power switching transistors 100 or the like, as shown in FIG. 5B1, wherein the recharging-optimized cathode elements and corresponding anode-contacting elements are connected to the output terminals of the input power regulating subsystem 245. Such switching operations are carried out by controller 101, under the control of the system controller 5 so that the required output voltage produced by the recharging power regulating subsystem 245 is applied across the recharging cells loaded with metal-fuel elements requiring recharging.

Recharging Cell Voltage Monitoring Subsystem within the Metal-Fuel Card Recharging Subsystem As shown in FIG. 5A, the recharging cell voltage monitoring subsystem 206A' is operably connected to the recharging cell input terminal configuration subsystem 244 for sensing voltage levels across the cathode and anode structures connected thereto. This subsystem is also operably connected to the system controller 5 for receiving control signals therefrom required to carry out its functions. In the first illustrative embodiment, the recharging cell voltage monitoring subsystem 206A' has two primary functions: to automatically sense the instantaneous voltage levels applied across each recharging cell during the Recharging Mode; and to produce (digital) data signals indicative of the sensed voltages for detection and analysis by the Data Capture and Processing Subsystem 406 within the Metal-Fuel Card Recharging Subsystem 3.

In the first illustrative embodiment, the recharging cell voltage monitoring subsystem 206A' can be realized using electronic circuitry adapted for sensing voltage levels applied across each recharging cell within the FCB system. In response to such detected voltage levels, the electronic circuitry can be designed to produce a digital data signals indicative of the sensed voltage levels for detection and analysis by the Data Capture and Processing Subsystem 406. As will be described in greater detail hereinafter, such data signals can be used by the system controller 5 to carry out its Recharging Power Regulation Method during the recharging mode of operation.

Recharging Cell Current Monitoring Subsystem within the Metal-Fuel Card Recharging Subsystem As shown in FIG. 5A, recharging the cathode-anode current monitoring subsystem 206B' is operably connected to the recharging cell input terminal configuration subsystem 244. The recharging cell current monitoring subsystem 206B' has two primary functions: (1) automatically sense the magnitude of electrical current flowing through the cathode-anode pair of each "loaded" recharging cell in the discharging/recharging head assembly 6 during the discharging mode; and (2) automatically produce digital data signal indicative of the sensed currents for detection and analysis by Data Capture and Processing Subsystem 406 within the Metal-Fuel Card Recharging Subsystem 3.

In the second illustrative embodiment of the present invention, the recharging cell current monitoring subsystem 206B' can be realized using current sensing circuitry for sensing the electrical current passed through the cathode-anode pair of each loaded recharging cell along the hybrid discharging/recharging head assembly, and producing digital data signals indicative of the sensed current levels. As will be explained in greater detail hereinafter, these detected current levels can be used by the system controller in carrying out its recharging power regulation method, and well as creating a "recharging condition history" information file for each element or subsection of the recharged metal-fuel card.

Data Capture and Processing Subsystem within the Metal-Fuel Card Recharging Subsystem In the illustrative embodiment, Data Capture And Processing Subsystem (DCPS) 406 shown in FIG. 5A carries out a number of functions, including, for example: (1) identifying each metal-fuel card immediately before it is loaded within a particular recharging head within the discharging/recharging head assembly 6 and producing metal-fuel card identification data representative thereof; (2) sensing (i.e. detecting) various "recharge parameters" within the Metal-Fuel Card Recharging Subsystem 3 existing during the time period that the identified metal-fuel card is loaded within the recharging head assembly thereof; (3) computing one or more parameters, estimates or measures indicative of the amount of metal-fuel produced during recharging operations, and producing "metal-fuel indicative data" representative of such computed parameters, estimates and/or measures; and (4) recording in the Metal-Fuel Database Management Subsystem 404 (accessible by system controller 5), sensed recharge parameter data as well as computed metal-fuel indicative data both correlated to its respective metal-fuel element/region identified during the Recharging Mode of operation. As will become apparent hereinafter, such information recorded within the Metal-Fuel Database Management Subsystem 404 by Data Capture and Processing Subsystem 406 can be used by the system controller 5 in various ways including, for example: optimally recharging partially or completely oxidized metal-fuel elements or regions in a rapid manner during the Recharging Mode of operation.

During recharging operations, the Data Capture and Processing Subsystem 406 automatically samples (or captures) data signals representative of "recharge parameters" associated with the various subsystems constituting the Metal-Fuel Card Recharging Subsystem 3 described above. These sampled values are encoded as information within the data signals produced by such subsystems during the Recharging Mode. In accordance with the principles of the present invention, "recharge parameters" shall include, but are not limited to: (i) the voltages produced across the cathode and anode structures along particular metal-fuel elements or regions along a metal-fuel card monitored, for example, by the recharging cell voltage monitoring subsystem 206A'; (ii) the electrical currents flowing through the cathode and anode structures associated with particular recharging cells along a metal-fuel card being monitored, for example, by the recharging cell current monitoring subsystem 206B'; and (iii) the time duration ($\Delta T_r$) of the state of any of the above-identified recharge parameters. In alternative embodiments, in which additional parameter sensing apparatus is embodied within the FCB power generation module hereof, additional sensed recharge parameters may include, for example: the oxygen saturation level ($pO_2$) within the cathode structure of each recharging cell, monitored by a cathode oxygen pressure control subsystem as taught in Applicant's U.S. Pat. No 6,306,534; the moisture ($H_2O$) level (or relative humidity) level across or near the cathode-anode (i.e. cell) interface along particular metal-fuel elements loaded in particular recharging cells monitored, for example, by an ion-concentration control subsystem as taught in Applicant's U.S. Pat. No. 6,306,534; the temperature ($T_r$) of the recharging cells during recharging operations by temperature sensing apparatus as taught in Applicant's copending U.S. application Ser. No. 09/116,643.

Recharging Power Regulation Subsystem within the Metal-Fuel Card Recharging Subsystem As shown in FIG. 5A, the output port of the recharging power regulation subsystem 245 is operably connected to the input port of the recharging cell input terminal configuration subsystem 244, whereas the input port of the recharging power regulation subsystem 245 is operably connected to the output port of the input power supply 243. While the primary function of the recharging power regulation subsystem 245 is to regulate the electrical power supplied to metal-fuel card during the Recharging Mode of operation, the recharging power regulation subsystem 245 can also regulate the voltage applied across each electronically-enabled recharging cell, as well as the electrical currents flowing through the cathode-anode interfaces thereof during recharging operations. As best illustrated in FIG. 5B1, such control functions are carried out by power/voltage control circuitry 120 within subsystem 245, under the management of the system controller 5 and can be programmably selected in a variety of ways in order to achieve optimal recharging of multi-element and single-element metal-fuel card structures in accordance with the present invention. In general, subsystem 245 can use electrically-controlled power switching and supply circuits, wherein, one or more current-controlled sources are connectable in electrical series with the cathode and anode structures of electronically-enabled recharging cells in order to control the electrical currents therethrough in response to control signals produced by the system controller 5 carrying out a particular Recharging Power Control Method.

As shown in FIG. 5B1, such a recharging power control method can carried out by providing a charging power source 140 in series with a low-power rating switching transistor (e.g. MOSFET) 141 and each recharging cell (21B, 226B, 24B) provided within the hybrid head 6. As shown, each power switching transistor 141 is controlled by the discharging/recharging cell switching controller 101, under the control of system controller 5. In addition, one or more voltage-controlled sources (e.g. MOSFETs) may be connected in electrical parallel with the cathode and anode structures of recharging cells in order to control the voltage thereacross in response to control signals produced by the system controller 5 or other microcontroller under its management. Such circuitry can be combined with and controlled by the system controller 5 in order to provide power (and/or voltage and/or current) control across the recharging cells configured along the metal-fuel card.

Notably, the advantage of using small charging power sources 140 as described above is that it enables the supply of small recharging currents to the individual recharging cells, enabling the use of thinner, lower cost and very small recharging-optimized cathode elements having low IR losses and thus higher efficiencies.

In the illustrative embodiments of the present invention, the primary function of the recharging power regulation subsystem 245 is to carry out real-time power regulation to the recharging cells configured along the loaded metal-fuel card 29 using any one of the following methods, namely: (1) a Constant Input Voltage/Variable Input Current Method, wherein the input voltage applied across each cathode-anode (i.e. cell) structure is maintained constant while the current therethrough is permitted to vary in response to loading conditions presented by metal-oxide formations on the recharging card; (2) a Constant Input Current/Variable Input Voltage Method, wherein the current into each recharging cell is maintained constant while the output voltage thereacross is permitted to vary in response to loading conditions; (3) a Constant Input Voltage/Constant Input Current Method, wherein the voltage applied across and current into each recharging cell during recharging are both maintained constant in response to loading conditions; (4) a Constant Input Power Method, wherein the input power applied across each recharging cell during recharging is maintained constant in response to loading conditions; (5) a Pulsed Input Power Method, wherein the input power applied across each recharging cell during recharging pulsed with the duty cycle of each power pulse being maintained in accordance with preset or dynamic conditions; (6) a Constant Input Voltage/Pulsed Input Current Method, wherein the input current into each recharging cell during recharging is maintained constant while the current into the recharging cell is pulsed with a particular duty cycle; and (7) a Pulsed Input Voltage/Constant Input Current Method, wherein the input power supplied to each recharging cell during recharging is pulsed while the current thereinto is maintained constant.

In the preferred embodiment of the present invention, each of the seven (7) Recharging Power Regulation Methods are preprogrammed into ROM associated with the system controller 5. Such power regulation methods can be selected in a variety of different ways, including, for example, by manually activating a switch or button on the system housing, by automatically detection of a physical, electrical, magnetic and/or optical condition established or detected at the interface between the metal-fuel card device and the Metal-Fuel Card Recharging Subsystem 3.

Managing Metal-Fuel Availability within the Metal-Air FCB System of the Present Invention During the Discharging Mode:

In the FCB system of the illustrative embodiment, means are provided for automatically managing the metal-fuel availability within the Metal-Fuel Card Discharging Subsystem 2 during discharging operations. Such system capabilities will be described in greater detail hereinbelow.

During discharging operations, data signals representative of discharge parameters (e.g., $i_{acd}$, $v_{acd}$, ..., $pO_{2d}$, $H_2O_d$, $T_{acd}$, $v_{acr}/i_{acr}$) are automatically provided as input to the Data Capture and Processing Subsystem 400 within the Metal-Fuel Card Discharging Subsystem 2. After sampling and capturing, these data signals are processed and converted into corresponding data elements and then written into an information structure 409 as shown, for example, in FIG. 6B. Each information structure 409 comprises a set of data elements which are "time-stamped" and correlated with (i.e. linked to) a unique machine-readable metal-fuel card identifier affixed to the metal-fuel card loaded within the FCB system. Each time-stamped information structure is then recorded within the Metal-Fuel Database Management Subsystem 308 in the Metal-Fuel Card Discharging Subsystem 2, for maintenance, subsequent processing and/or access during future recharging and/or discharging operations.

As mentioned hereinabove, various types of information are sampled and collected by the Data Capture and Processing Subsystem 400 during the discharging mode. Such information types include, for example: (1) the amount of electrical current ($i_{acd}$) discharged across the cathode-anode structures of particular discharging cells; (2) the voltage generated across each discharging cell; and optionally parameters, such as (3) the oxygen concentration ($PO_{2d}$) level within each discharging cell; (4) the moisture level ($H_2O_d$) near each cathode-anode (i.e. cell) interface within each discharging cell; and (5) the temperature ($T_{acd}$) within each discharging cell. From such collected i information, the Data Capture and Processing Subsystem 400 can readily compute (i) the time ($\Delta T_d$) duration that electrical current was discharged across discharging cell configured along a metal fuel card loaded within the FCB system.

The information structures produced by the Data Capture and Processing Subsystem 400 are stored within the Metal-Fuel Database Management Subsystem 308 within the Metal-Fuel Card Discharging Subsystem 2 on a real-time basis and can be used in a variety of ways during discharging operations.

For example, the above-described current ($i_{acd}$) and time ($\Delta T_d$) information is conventionally measured in Amperes and Hours, respectively. The product of these measures, denoted by "AH", provides an approximate measure of the electrical charge (–Q) that has been "discharged" from the discharging cells configured along the metal-fuel card. Thus the computed "AH" product provides an accurate amount of metal-oxide that one can expect to have been formed on a particular region or element of a metal-fuel card at a particular instant in time, during discharging operations.

When used with historical information about metal oxidation and reduction processes, the Metal-Fuel Database Management Subsystems 308 and 404 within the Metal-Fuel Card Discharging and Recharging Subsystems 2 and 3, respectively, can account for or determine how much metal-fuel (e.g. zinc) should be available for discharging (i.e. producing electrical power) from a loaded zinc-fuel card, or how much metal-oxide is present for reducing therealong. Thus such information can be very useful in carrying out metal-fuel management functions including, for example, determination of metal-fuel amounts available along a particular metal-fuel region or segment.

In the illustrative embodiment, metal-fuel availability is managed within the Metal-Fuel Card Discharging Subsystem 2, using the method of metal-fuel availability management described in copending U.S application Ser. No. 09/1 16,643.

Controlling Discharging Parameters During the Discharging Mode Using Information Recorded During the Prior Modes of Operation In the FCB system of the illustrative embodiment, the system controller 5 can automatically control discharge parameters using information collected during prior recharging and discharging operations and recorded within the Metal-Fuel Database Management Subsystems of the FCB system.

Figure 6A:
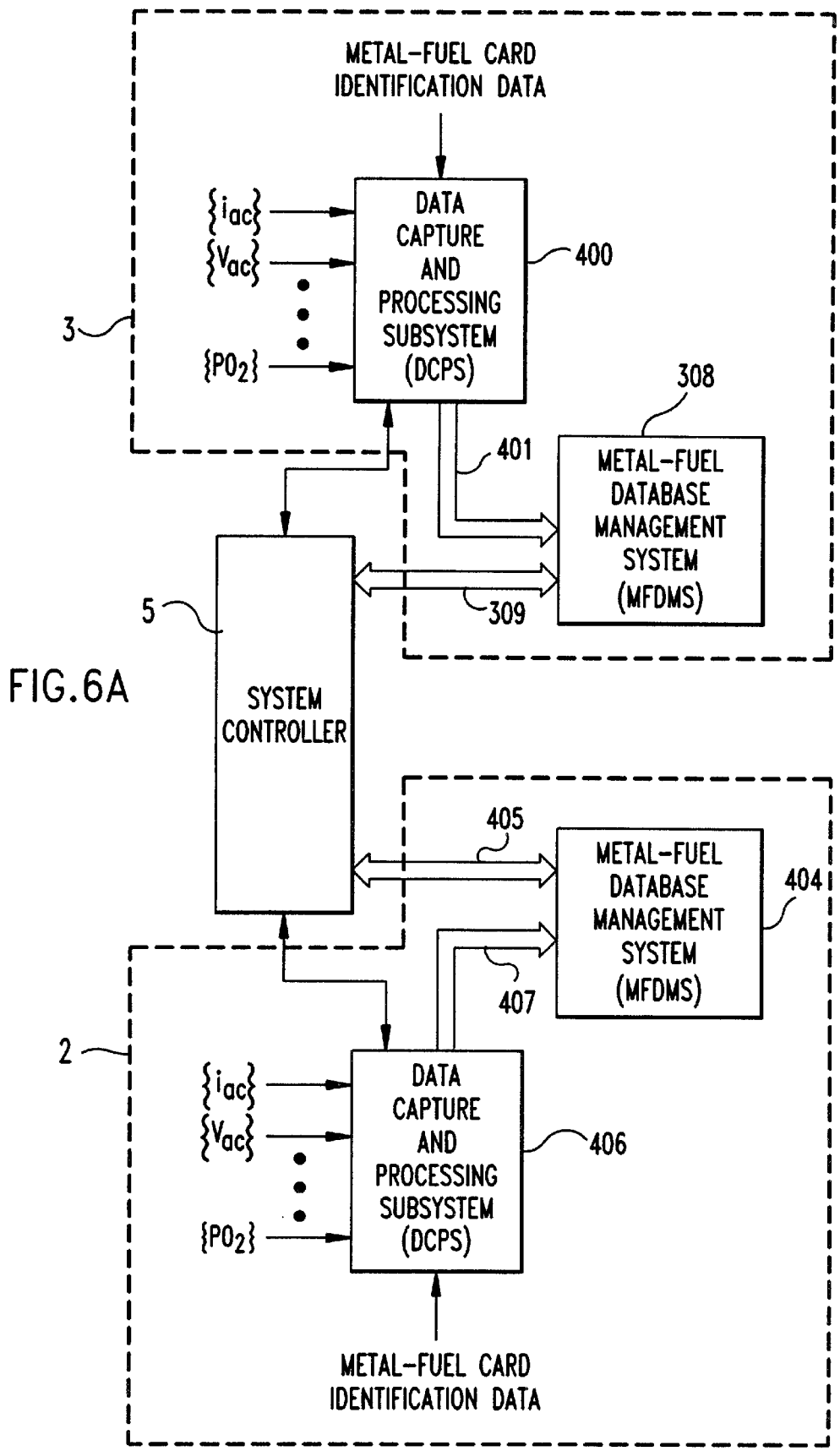
FIG. 6A is a schematic representation of the subsystems within the rechargeable metal-air FCB power generation module of FIG. 1 which enable, (1) during the discharging operations: (a) recording in memory, sensed discharge parameters obtained from the loaded metal-fuel card and computed metal-fuel indicative data derived therefrom, and (b) reading (accessing) from memory, recharge parameters and computed metal-fuel indicative data recorded during previous discharging and/or recharging operations; and (2) during the recharging operations: (a) recording in memory, sensed recharge parameters and computed metal-fuel indicative data derived therefrom, and (b) reading (accessing) from memory, discharge parameters and computed metal-oxide and metal-oxide indicative data recorded during previous discharging and/or recharging operations.

As shown in FIG. 6A, the subsystem architecture and buses provided within and between the Discharging and Recharging Subsystems 2 and 3 enable system controller 5 to access and use information recorded within the Metal-Fuel Database Management Subsystem 404 of the Metal-Fuel Card Recharging Subsystem 3. Similarly, the subsystem architecture and buses provided within and between the Discharging and Recharging Subsystems 2 and 3 enable system controller 5 to access and use information recorded within the Metal-Fuel Database Management Subsystem 308 of the Metal-Fuel Card Discharging Subsystem 2. The advantages of such information and sub-file sharing capabilities will be explained hereinbelow.

During the discharging operations, the system controller 5 can access various types of information stored within the Metal-Fuel Database Management Subsystems provided for in the Discharging and Recharging Subsystems 2 and 3. One important information element will relate to the amount of metal-fuel currently available at each metal-fuel element (i.e. zone or region) along at a particular instant of time (i.e. $MFE_t$). Using this information, the system controller 5 can determine if there will be sufficient metal-fuel along a particular element or section of a metal-fuel card to satisfy current electrical power demands imposed on the FCB system. The metal-fuel along one or more regions of the metal-fuel card may been substantially consumed as a result of prior discharging operations, and may not have been recharged since the last discharging operation. The system controller 5 can anticipate such metal-fuel conditions within each discharging cell. Depending on the metal-fuel conditions detected along the metal-fuel card, the system controller 5 may respond as follows: connect the cathode-anode structures of metal-fuel "rich" discharging cells to the input terminals of the discharging power regulation subsystem 223 when high electrical loading conditions are detected at electrical load 200, and connect cathode-anode structures of metal-fuel "depleted" discharging cells into this subsystem when low loading conditions are detected at electrical load 200. In system embodiments provided with means for monitoring and controlling additional discharging parameters, the system controller may further respond as follows: (ii) enable an increase in the amount of oxygen (passively or actively) transported into the corresponding cathode support structures when the metal-fuel is thinly present in particular discharging cells, and enable a decrease in the amount of oxygen (passively or actively) transported into the corresponding cathode support structures when the metal-fuel is thickly present in particular discharging/recharging cells, in order to maintain power produced from the discharging/recharging head 6; (iii) control the temperature of the discharging head 6 when the sensed temperature thereof exceeds predetermined thresholds; etc. It is understood that in alternative embodiments of the present invention, the system controller 5 may operate in different ways in response to the detected conditions along a metal-fuel card subjected to discharging operations.

Managing Metal-Oxide Presence within the Metal-Air FCB System of the Present Invention During the Recharging Mode In the FCB system of the illustrative embodiment, are provided for automatically managing the metal-oxide presence within the Metal-Fuel Card Recharging Subsystem 3 during recharging operations. Such system capabilities will be described in greater detail hereinbelow.

During recharging operations, data signals representative of recharge parameters (e.g. $i_{acr}$, $v_{acr}$, ..., $pO^2_r$, $H_2O_r$, $T_r$, $v_{acr}/i_{acr}$) are automatically provided as input to the Data Capture and Processing Subsystem 406 in the Metal-Fuel Card Recharging Subsystem 3. After sampling and capturing, these data signals are processed and converted into corresponding data elements and then written into an information structure 410 as shown, for example, in FIG. 6C. As in the case of discharge parameter collection, each information structure 410 for recharging parameters comprises a set of data elements which are "time-stamped" and correlated with (i.e. linked to) the unique machine-readable metal-fuel card identifier affixed to the metal-fuel card loaded within the FCB system. Each time-stamped information structure is then recorded within the Metal-Fuel Database Management Subsystem 404 of the Metal-Fuel Card Recharging Subsystem 3, shown in FIG. 5A, for maintenance, subsequent processing and/or access during future recharging and/or discharging operations.

As mentioned hereinabove, various types of information are sampled and collected by the Data Capture and Processing Subsystem 406 during the recharging mode. Such information types include, for example: (1) the recharging voltage applied across each recharging cell in the FCB system; (2) the amount of electrical current ($i_{acr}$) supplied across each recharging cell; and optionally, parameters such as (3) the oxygen concentration ($PO_{2r}$) level in each recharging cell; (4) the moisture level ($H_2O_r$) near the cathode-anode interface within each recharging cell or cluster thereof; and (5) the temperature ($T_{acr}$) within each recharging cell or cluster thereof during recharging operations. From such collected information, the Data Capture and Processing Subsystem 406 can readily compute various parameters of the system including, for example, the time duration ($\Delta T_r$) that electrical current was supplied to a particular recharging cell.

The information structures produced and stored within the Metal-Fuel Database Management Subsystem 404 of the Metal-Fuel Card Recharging Subsystem 3 on a real-time basis can be used in a variety of ways during recharging operations. For example, the above-described current ($i_{acr}$) and time duration ($\Delta T_T$) information acquired during the recharging mode is conventionally measured in Amperes and Hours, respectively. The product of these measures (AH) provides an accurate measure of the electrical charge (−Q) supplied to the recharging cells configured along the metal-fuel card during recharging operations. Thus the computed "AH" product provides an accurate amount of metal-fuel that one can expect to have been produced on the identified metal-fuel zone or region, at a particular instant in time, during recharging operations.

When used with historical information about metal oxidation and reduction processes, the Metal-Fuel Database Management Subsystems 308 and 404 within the Metal-Fuel Card Discharging and Recharging Subsystems 2 and 3, respectively, can be used to account for or determine how much metal-oxide (e.g. zinc-oxide) should be present for recharging (i.e. conversion back into zinc from zinc-oxide) along the metal-fuel card. Thus such information can be very useful in carrying out metal-fuel management functions including, for example, determination of metal-oxide amounts present within each recharging cell during recharging operations.

In the illustrative embodiment, the metal-oxide presence process may be managed within the Metal-Fuel Card Recharging Subsystem 3 using method described hereinbelow.

Controlling Recharging Parameters During the Recharging Mode Using Information Recorded During Prior Modes of Operation In the FCB system of the illustrative embodiment, the system controller 5 can automatically control recharge parameters using information collected during prior discharging and recharging operations and recorded within the Metal-Fuel Database Management Subsystems 308 and 404 of the FCB system.

During the recharging operations, the system controller 5 can access various types of information stored within the Metal-Fuel Database Management Subsystem 404. One important information element stored therein will relate to the amount of metal-oxide currently present along each recharging cell at a particular instant of time (i.e. $MOA_r$). Using this information, the system controller 5 can determine on which zones significant metal-oxide deposits are present, and thus can connect the input terminals of the corresponding recharging cells, to the input terminals of the recharging power control subsystem 245 by way of the recharging cell input terminal configuration subsystem 244, to efficiently and quickly carry out recharging operations therealong. The system controller 5 can anticipate such metal-oxide conditions prior to conducting recharging operations. Depending on the metal-oxide condition of the metal-fuel elements loaded within the discharging cells of the system, the system controller 5 may respond as follows: connect the cathode-anode structures of metal-oxide "rich" recharging cells, to the output terminals of the recharging power regulation subsystem 245 for long recharging durations, and connect the cathode-anode structures of metal-oxide "depleted" recharging cells, to the output terminals of the recharging power regulation subsystem 245, for relatively shorter recharging operations. In system embodiments provided with means for monitoring and controlling additional recharging parameters, the system controller may further respond as follows: (ii) enable an increase in the rate of oxygen evacuation from the cathode support structures of recharging cells having thickly formed metal-oxide formations therealong during recharging operations, and enable a decrease in the rate of oxygen evacuation from the cathode support structures of recharging cells having thinly formed metal-oxide formations therealong during recharging operations; (iii) control the temperature of the recharging cells when the sensed temperature thereof exceeds predetermined thresholds; etc. It is understood that in alternative embodiments, the system controller 5 may operate in different ways in response to the detected condition of particular regions along a loaded metal-fuel card.

Method of Operating the FCB Power Generation System of the First Illustrative Embodiment of the Present Invention In its fully assembled state, the user initially may fully recharge the FCB module 1 by either loading it into the cradle 500 of a recharging unit 501 having an on-board AC-DC power supply, as shown in FIG. 2A, or alternatively, by supplying a source of electrical input power to the FCB module while contained within battery storage bay of the hosting device (e.g. 7, 8, 9, 10 or 11) when the FCB module 1 is equipped with an automated mechanism for translating the metal-fuel card 29 between its discharging position (DP) and its recharging position (RP), and vice versa. In the former case, it will be preferred in most applications to manually displace the metal-fuel card from its discharging position (DP) to its recharging position (RP) after the FCB module has been removed from its host device. In the latter case, it would be preferred to leave the FCB module in the storage compartment of the host device and automatically displace the metal-fuel card 29, from its discharging position to its recharging position, using the low-power electromechanical translation device 33, shown in FIGS. 9A through 9E and described in detail hereinabove. In this latter instance, all that will typically be required to configure the FCB module for the recharging mode of operation is to simply attach an AC-DC transformer 370 (of FIG. 1) into an AC-power wall socket and then plug the DC-power output plug thereof either (1) directly into an input power receiving socket provided for on the exterior of the FCB module, as shown in FIG. 1, or (2) into an input power receiving socket provided for on the exterior of the power consuming host device, thereby automatically initiating recharging operations.

For purposes of illustration only, the balance of this method of operation description will assume that the FCB module hereof employs a manually-actuatable metal-fuel card displacement mechanism, as shown in FIGS. 1 and 3, and that the FCB module must be physically removed from the host device when performing recharging operations. It is understood, however, this embodiment is merely illustrative, and that in many applications, the FCB module will remain stored within the storage compartment (or battery bay) of the electrical power consuming host device during both discharging and recharging operations, and that metal-fuel card displacement between discharging and recharging positions will be effected electro-mechanically using means similar to that described in detail hereinabove.

Figure 9A:
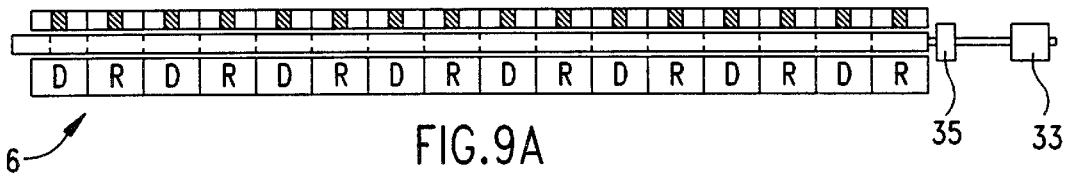
FIG. 9A is a schematic cross-sectional diagram of the discharging/recharging head employed in the rechargeable FCB power generation module of FIG. 1, showing an unconsumed metal-fuel card disposed between the spatially arranged arrays of discharging cells and recharging cells of the FCB power generation module, before discharging operations.
Figure 9B:
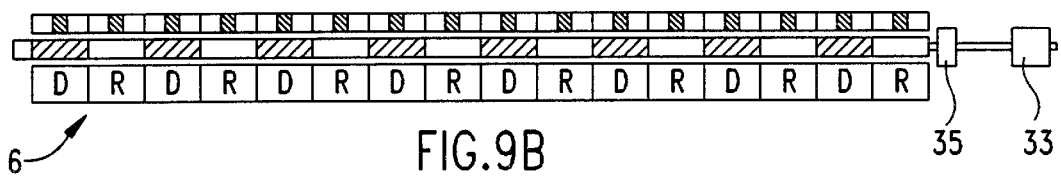
FIG. 9B is a schematic cross-sectional diagram of the hybrid discharging/recharging head employed in the rechargeable FCB power generation module of FIG. 1, showing a metal-fuel card disposed between spatially arranged arrays of discharging cells and recharging cells of the FCB power generation module, with oxidation regions of the metal-fuel card formed between the discharging cells after discharging operations.

In a conventional manner, the FCB module is manually loaded within the storage compartment (or battery bay) of the electrical host device so that the output power terminals 36 of the FCB module 1 establish electrically contact the input power terminals of the host device (e.g. typically by way of electrical contacts, but may be achieved using alternatives means available in the electrical arts). In this arrangement, the FCB module supplies electrical power to the electrical load to which it is connected, as metal-fuel (e.g. zinc) loaded within the discharging cells of the discharging/recharging head assembly 6 oxidizes to a depth determined by the electrical loading conditions and the power control method employed by the system controller. FIG. 9B graphically indicates an exemplary discharge state attained by the metal-fuel card after a predetermined time period of discharging.

Figure 9C:
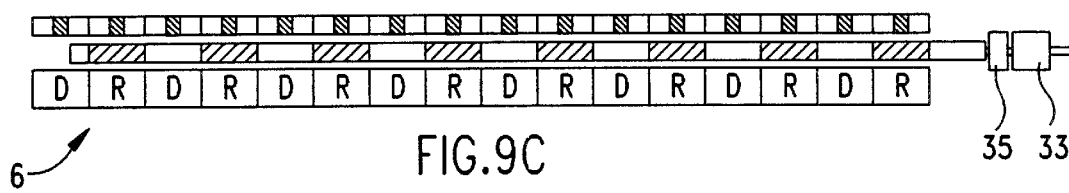
FIG. 9C is a schematic cross-sectional diagram of the hybrid discharging/recharging head employed in the rechargeable FCB power generation module of FIG. 1, showing a metal-fuel card disposed between spatially arranged arrays of discharging cells and recharging cells of the FCB power generation module, wherein the oxidation regions shown in FIG. 9B are disposed between the array of recharging cells of the FCB power generation module, before recharging operations.
Figure 9D:
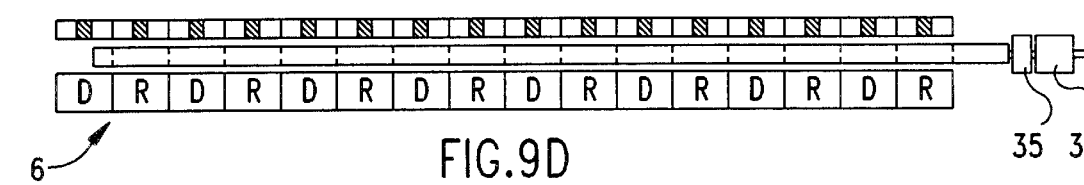
FIG. 9D is a schematic cross-sectional diagram of the hybrid discharging/recharging head employed in the rechargeable FCB power generation module of FIG. 1, showing a metal-fuel card disposed between the spatially arranged arrays of discharging cells and recharging cells of the FCB power generation module, wherein the oxidation regions shown in FIG. 9C have been electrochemically reduced after recharging operations.

When metal-fuel supply along the loaded metal-fuel card is depleted to a minimum threshold level, as determined by a metal-fuel management program carried out by the system controller 5, the FCB module will require recharging and a visual indicator light will be energized in order to signal this condition to the user of the FCB module in the application at hand. In the illustrative embodiment shown in FIG. 2A, for example, this would be achieved by removing the FCB module from the host device (e.g. cellular phone), loading it within the cradle of the recharging unit 501A, shown in FIG. 2A, and manually displacing the discharging/recharging configuration switch 32 to its recharging position. This switching action causes the metal-fuel card preloaded within the FCB module to be translated along its longitudinal axis by a distance equal to the length of one row of discharging-optimized cathode elements so as to now load each discharged metal-fuel element into its neighboring "recharging cell", as schematically depicted in FIG. 9C. In this configuration, the discharged metal-fuel regions loaded within the recharging cells of the hybrid discharging/recharging head assembly are recharged in an optimal manner by supplying electrical input power to subsystem 245 shown in FIG. 5A while electronically-enabling selected recharging-optimized cathode elements under the control of the system controller 5. During recharging operations, the system controller sends control signals to subsystem 245 in order to supply particular levels of recharging current to certain recharging cells requiring a particular degree of electro-chemical reduction, as determined by the information recorded within the Metal-Fuel Database management subsystems 308 and 404. Notably, during recharging operations, the system controller 5 activates micro-vibrator 35 so that it automatically reciprocates (i.e. vibrates) the metal-fuel card along its longitudinal axis by very small displacements (e.g. a fraction of the length of each metal-fuel region) in order to inhibit the growth of dendrites during recharging operations. The precise magnitude of vibration along the longitudinal axis of the metal-fuel card will depend on a number of factors, including for example:

During recharging operations, the selected zones or regions of metal fuel loaded within the recharging cells are automatically recharged in an optimal manner (i.e. using optimal recharging currents, etc) until all of the oxidized metal fuel regions have been completely reduced, as shown in FIG. 9D. The vibrational force produced by micro-vibrator 35, and which causes the metal-fuel card to vibrate during recharging operations, can be generated from a piezoelectric crystal or an electromagnetic coil, connected at one end of the metal-fuel card 29, while the anode to cathode distance is maintained constant by resting the metal-fuel card on housing-supported rails or like structures located on the sides of the metal-fuel card.

Figure 9E:
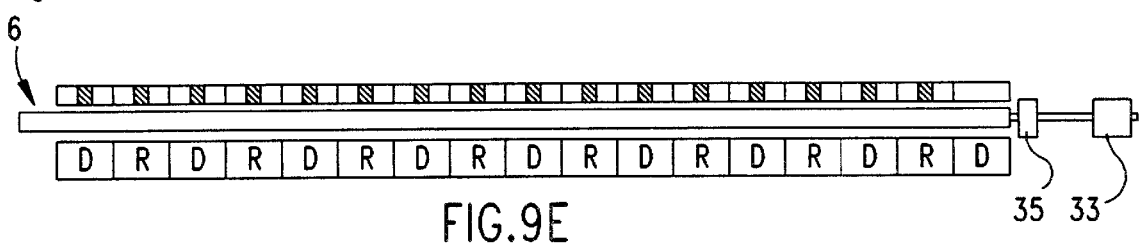
FIG. 9E is a schematic cross-sectional diagram of the discharging/recharging head employed in the rechargeable FCB power generation module of the first illustrative embodiment, showing a metal-fuel card disposed between the spatially arranged arrays of discharging cells and recharging cells thereof after being returned to its discharging position, as shown in FIG. 9A.

When recharging is completed, switch 32 is returned to its discharging position (DP), as shown in FIG. 9E, and then the FCB module is once again loaded within the storage compartment of the electrical host device within which it is to be used. In this configuration, the metal fuel card is arranged in the FCB module as shown in FIG. 9A and is ready to generate electrical power for supply to the host device as loading conditions dictate. In this configuration, any combination of loaded discharging cells, as defined above, can produce electrical power as loading conditions require. Thus, using the discharging cell output terminal reconfiguration subsystem 205(of FIG. 5B2) thereof, one or more discharging cells that have been loaded with metal-fuel and actively switched into operation thereby, can generate small levels of output electrical power which can be combined to produce a net output power level at range of different output voltages required by the connected load 200. In the illustrative embodiment, the output voltage of the FCB producing module can be selected by a multi-position switch 370 located on the exterior of the module housing, as shown in FIG. 1, prior to loading the FCB module into the battery storage compartment of the host device.

Modifications and Variations On the First Illustrative Embodiment of the Present Invention In alternative embodiments of the present invention, the output voltage can be selected automatically by providing the FCB module with a circuit capable of sensing a control voltage produced by the host system (i.e. which indicates the output voltage required thereby), and then automatically controlling the discharging cell output terminal reconfiguration subsystem 205 of the FCB module to produce the required voltage. Such modifications will readily occur to those skilled in the art having the benefit of reading the present invention disclosure.

Figure 10:
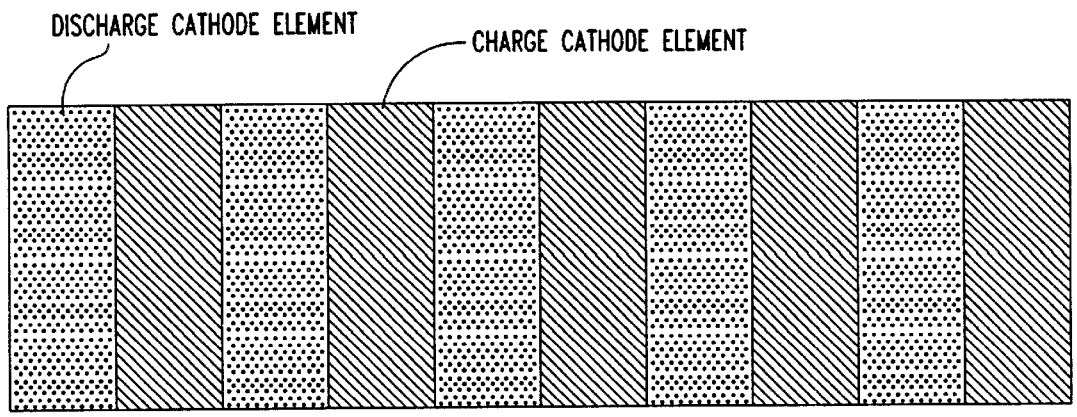
FIG. 10 is a first alternative arrangement for the spatially arranged arrays of hybrid discharging cells and recharging cells within the discharging/recharging head of the present invention, wherein the discharging-optimized cathode element of each discharging cell and the recharging-optimized cathode element of each recharging cell is realized as a rectangular strip arranged in an alternating stripe-like pattern, although the surface area of each such cathode element in the discharging and recharging cells may vary along the surface of the discharging/recharging head assembly.
Figure 11:
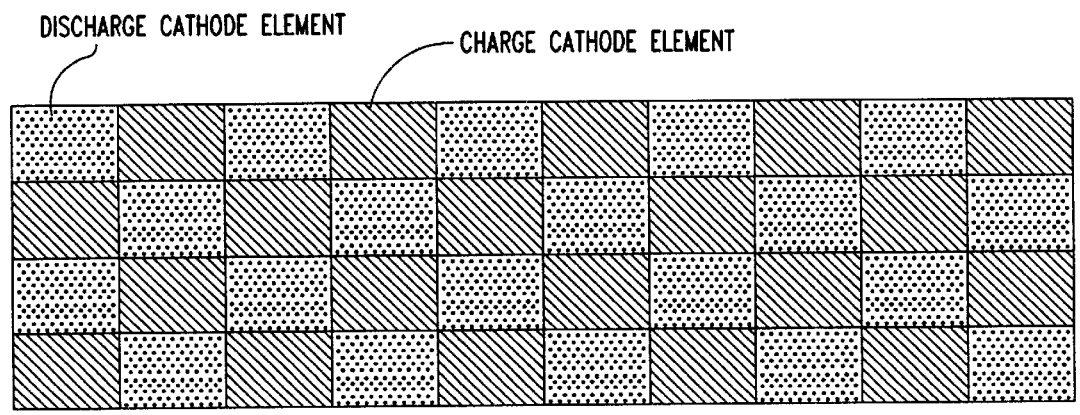
FIG. 11 is a second alternative arrangement for the multi-element cathode and anode-contacting structures of the discharging/recharging head assembly of the present invention, wherein the each discharging and recharging cathode structure is realized as a rectangular element arranged in an checker-board like pattern.

In the first illustrative embodiment of the FCB module shown in FIGS. 1 and 3, in particular, the spatial arrangement of the discharging and recharging cathode elements were shown to be in the form of a two-column, sixteen-row array, wherein discharging and recharging cathode elements alternate. Alternative spatial arrangements for the discharging and recharging elements are shown in FIGS. 10 and 11. It us understood, however, that virtually any arbitrary pattern may be acceptable depending on the application at hand.

Metal-Air FCB Power Producing Module of the Second Illustrative Embodiment of the Present Invention In FIGS. 12A and 12B, the second illustrative embodiment of the metal-air FCB power generation module 1' is shown in detail. In this alternative embodiment of the present invention, output voltages from the FCB power generation module 1' are produced by (i) generating electrical current pulses from each discharging cell, (ii) supplying these electrical current pulses to the primary coil 701A (701B, 701C) of a step-up type voltage transformer 701 to produce a voltage thereacross, (iii) generating a stepped up output voltage across the secondary coil 701D of the voltage transformer, and (iv) regulating the stepped-up output voltage by rectifying and low pass-filtering the output current. This is in marked constrast 1with the voltage "boosting" technique employed by the FCB power generation module of the first illustrative embodiment, wherein the anode and cathode structure of each discharging cell are electrically isolated, and the output voltages produced by the FCB module are generated by configuring the output terminals of each such discharging cell in electrical series and/or parallel configuration.

As shown in FIG. 12A, the second illustrative embodiment of the rechargeable FCB power generation module of the present invention 1' is similar in all respects to the FCB module 1 shown in FIG. 5A, except as follows: (1) the anode structures 24 of the discharging cells are realized by an unpatterned or patterned sheet of conductive material maintained at a common electrical potential (e.g. electrical ground); (2) the ionically conductive medium 226 is a shared medium, not requiring ionic-isolation among neighboring discharging and recharging cells, as is the case of FCB module 1; (3) the metal-fuel material 195 need not be segmented on a cell by cell basis required in the first illustrative embodiment of FIG. 3, and can be a single continous sheet of metal-fuel material; (4) a single anode-contacting electrode 24 can be used to establish contact with the metal-fuel sheet; and (5) the discharging cell output terminal configuration subsystem 205 used in FCB module 1 is eliminated, and instead, the anode and cathode structures of each discharging cell therein are connected to a discharging output voltage regulation subsystem 223', schematically detailed in FIG. 12B.

As shown in FIG. 12B, discharging output voltage regulation subsystem 223' comprises: a switching transistor 100 connected in series with the cathode element 21A of each discharging cell (21A, 226, 195, 24) and one end of a primary coil 701A (701B, 701C) associated with step-up voltage transformer 701, for producing electrical pulse waveforms from each selected discharging cell under the control of the dicharging/recharging cell switching controller 101 during discharging operations; a diode (D1) 703 connected across each switching transistor 100for protecting the switching transistor from high-voltage spikes (i.e. high-voltage inductive transients) produced by its associated primary coil; a diode D2 704 connected between the secondary coil 701D of the output voltage transformer 701 and a low-pass filtering capacitor (C) 705, for rectifying the output voltage waveform produced from the secondary coil 701D; wherein the low pass-filtering circuit formed by capacitor 705 and resistive load (R) filters out high-frequency signal components in the stepped-up DC output voltage waveform produced across the electrical load (R) while the electrically-isolated primary coils of the output voltage transformer 701D are driven by the pulsed electrical currents supplied to the plurality of primary coils 701A through 701C thereof by the electrically switched discharging cells.

As shown in FIG. 12B, the anode elements associated with the discharging cells are connected to electrical ground, as is each of the primary coils 701A (701B, 701C) in the output voltage transformer 701. Also, the voltages produced across the secondary coil 701D of the output voltage transformer as well as the electrical load R connected thereto are also referenced to electrical ground, as shown. Notably, as each discharging cell is switched into operation by a control voltage supplied by switching controller 101 to the base terminal of each switching transistor 100 associated therewith, the output current from the discharging cell will have time-varying magnitude characteristics. Thus, a current-limiting impedence will naturally be presented in the series circuitry embodying the discharging cell, thus limiting the electrical current passing therethrough and providing a measure of protection against overpowering the rating of the power switching transistor 100. The duty cycle of each power switching transistor will be selected so as to control the input voltage supplied to the corresponding primary coil of the output voltage transformer 701, and the winding ratio of the primary and secondary coils therein will be selected to control the output voltage produced across the secondary coil 701D thereof. The effects of the rectifying diode 704and low-pass filter capacitor 705 on the output voltage across the electrical load R are generally well known in the power supply construction art.

Figure 13A:
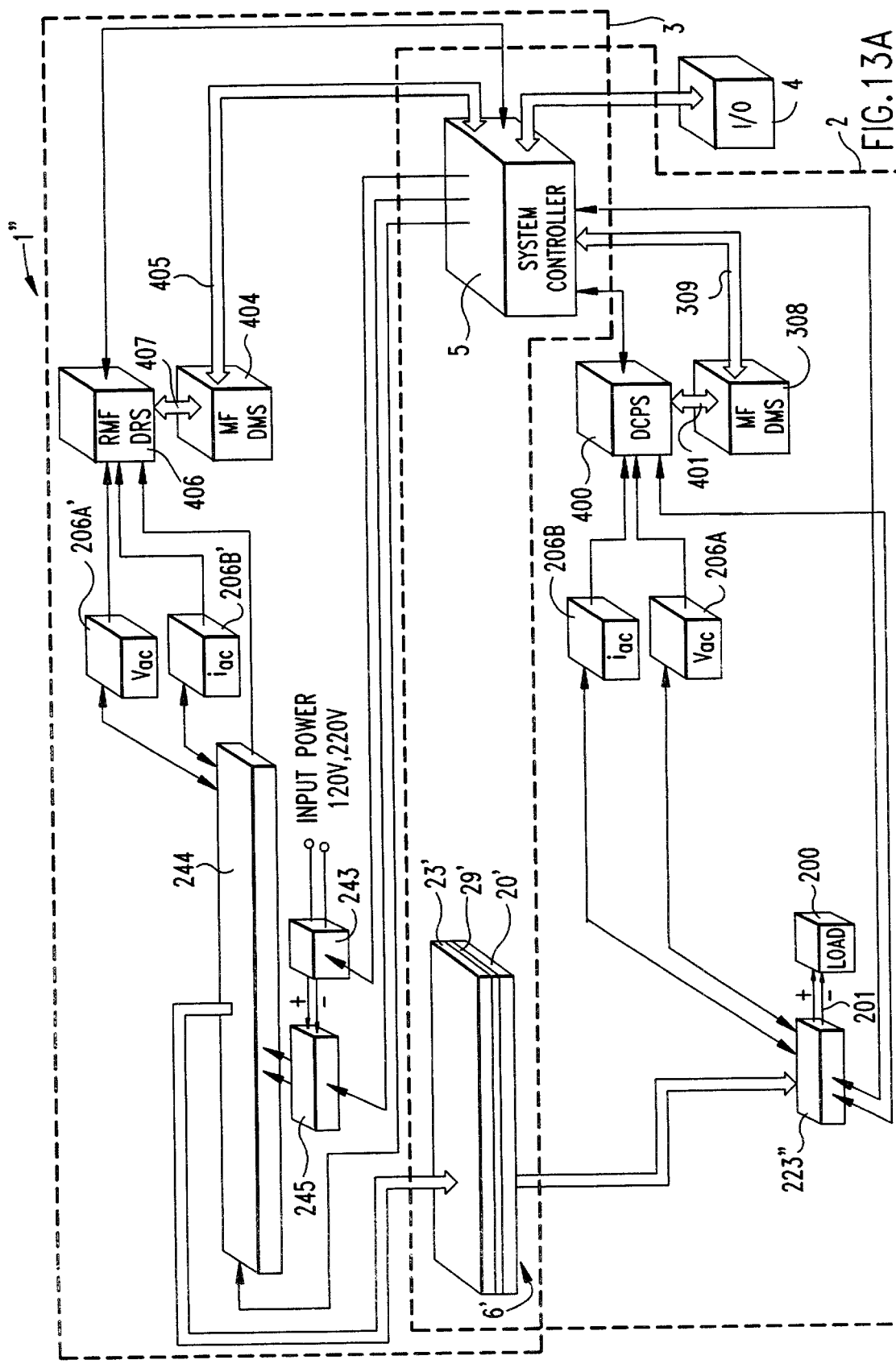
FIG. 13A is a generalized schematic representation of the third illustrative embodiment of the rechargeable FCB power generation module of FIG. 1, showing its subsystems and subcomponents in greater detail, with a metal-fuel card shown inserted between the mosaic-like cathode and anode-contacting structures of the hybrid discharging/recharging head thereof.
Figure 13B:
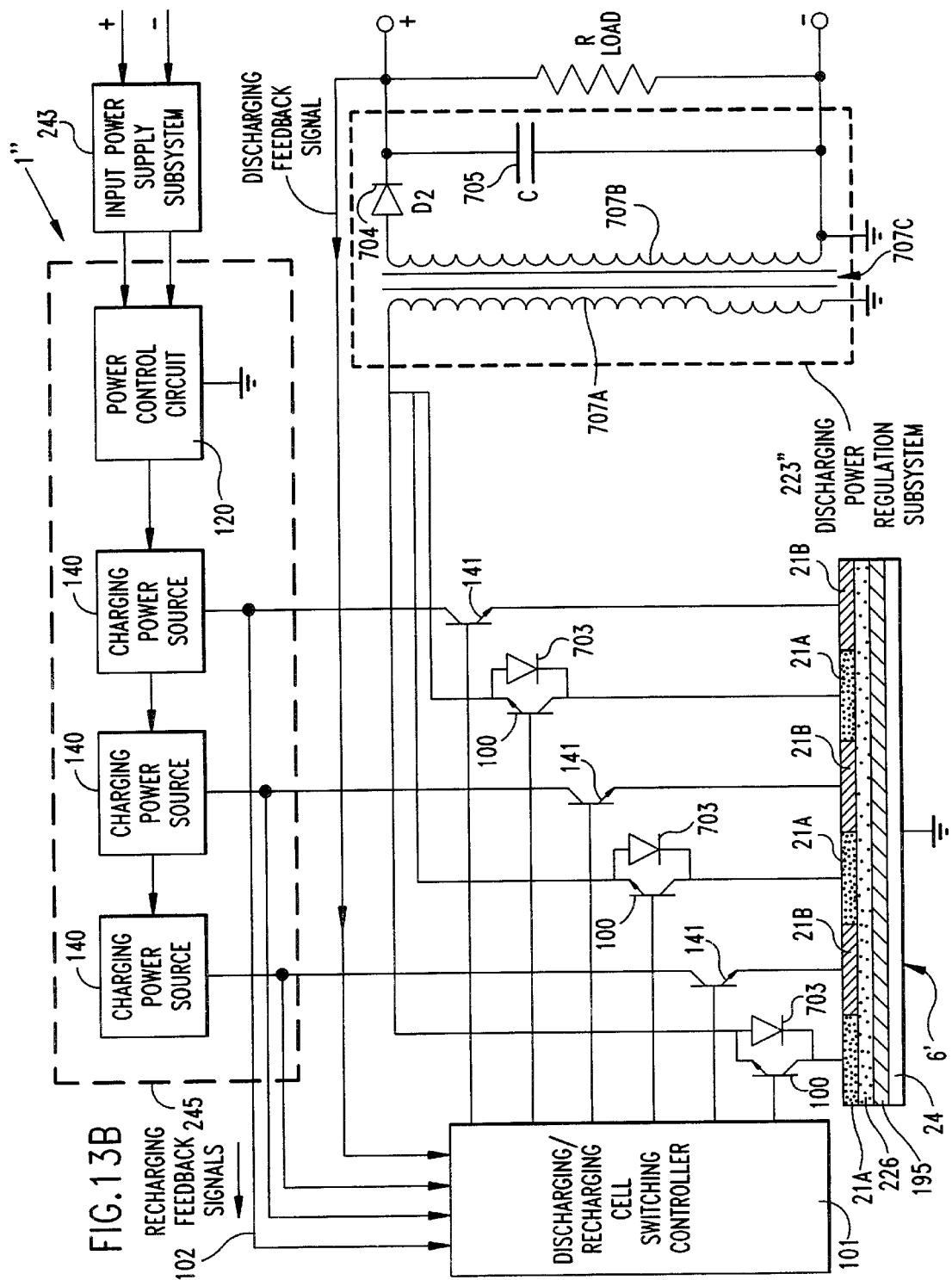
FIG. 13B is a schematic representation of the third illustrative embodiment of the rechargeable FCB power generation module depicted in FIG. 13A, comprising (i) transistor-based electrical-switching circuitry for producing electrical pulse waveforms from each selected discharging cell under the control of the system controller during discharging operations, (ii) an output transformer having a single primary coil driven by the produced electrical voltages for generating an input voltage waveform, (iii) a single output coil for producing a stepped-up output voltage waveform, (iv) a diode for rectifying the output voltage waveform, and (v) a low-pass filtering circuit for filtering out high-frequency signal components from the stepped-up DC output voltage waveform.

Metal-Air FCB Power Producing Module of the Third Illustrative Embodiment of the Present Invention In FIGS. 13A and 13B, the third illustrative embodiment of the metal-air FCB power generation module 1" is shown in detail. In this alternative embodiment of the present invention, output voltages from the FCB power generation module 1" are produced in a manner similar to that embodiment in the FCB module 1' of the second illustrative embodiment except that the electrical current pulses produced by activated discharging cells are fed through a common primary coil 706 associated with an output voltage transformer 707.

As shown in FIG. 13A, the third illustrative embodiment of the rechargeable FCB power generation module of the present invention is similar in all respects to the FCB module shown in FIG. SA, except as follows: (1) the anode structures of the discharging cells are realized as an unpatterned or patterned sheet of conductive material maintaining a common electrical potential (e.g. electrical ground; (2) the ionically conductive medium 226 is a shared medium, not requiring ionic-isolation among neighboring discharging and recharging cells as in the case of FCB module 1; (3) the metal-fuel material 195 need not be segmented on a cell by cell basis required in the first illustrative embodiment of FIG. 3, and therefor can be a single continous sheet of metal-fuel material; (4) a single anode-contacting electrode 24 can be used to establish contact with the metal-fuel sheet; and (5) the discharging cell output terminal configuration subsystem 205 used in FCB module 1 is eliminated, and instead, the anode and cathode structures of each discharging cell therein are connected to a discharging output voltage regulation subsystem 223", schematically detained in FIG. 13B.

Specifically, as shown in FIG. 13B, discharging output voltage regulation subsystem 223″ comprises: a switching transistor 100 connected in series with the cathode element 21A of each discharging cell (21A, 226, 195 24) and the common primary coil 707A associated with step-up voltage transformer 707, for producing electrical pulse waveforms from each selected discharging cell under the control of the dicharging/recharging cell switching controller 101 during discharging operations; a diode (D1) 703 connected across each switching transistor 100 for protecting the switching transistor from high-voltage spikes (i.e. high-voltage inductive transients) produced by the common primary coil; a diode D2 704 connected between the secondary coil 707B of the output voltage transformer 707 and a low-pass filtering capacitor 705, for rectifying the output voltage waveform produced from the secondary coil 707B; wherein the low pass-filtering capacitor 705 filters out high-frequency signal components in the stepped-up DC output voltage waveform produced across the electrical load (R) while the electrically-isolated primary coil of the output voltage transformer 707 is driven by the pulsed electrical currents supplied thereto by the electrically-switched discharging cells in the FCB module.

As shown in FIG. 13B, the anode elements associated with the discharging cells are connected to electrical ground, as is the common primary coil 707A in the output voltage transformer 707. Also, the voltages produced across the secondary coil 707B of the output voltage transformer 707 as well as the electrical load R connected thereto are also referenced to electrical ground, as shown. Notably, as each discharging cell is switched into operation by a control voltage supplied by switching controller 101 to the base terminal of each switching transistor 100 associated therewith, the output current from the discharging cell will have time-varying magnitude characteristics. Thus, a current-limiting impedence will naturally be presented in the series circuitry embodying the discharging cell, thus limiting the electrical current passing therethrough and providing a measure of protection against overpowering the rating of the switching transistor. The duty cycle of each power switching transistor will be selected so as to control the input voltage supplied to the primary coil of the output voltage transformer 707, and the winding ratio of the primary and secondary coils employed therein will be selected to control the output voltage produced across the secondary coil 707B thereof. The effects of the rectifying diode 704 and low-pass filter capacitor 705 on the output voltage across the electrical load Rare generally well known in the power supply construction art.

Metal-Air FCB Power Producing Module of the Fourth Illustrative Embodiment of the Present Invention In FIGS. 14A and 14B1, the fourth illustrative embodiment of the metal-air FCB power generation module 1‴ is shown in detail. In this alternative embodiment of the present invention, output voltages from the FCB power generation module 1‴ are produced by (i) generating electrical current pulses from each discharging cell using a switching transistor 100, (ii) supplying these electrical current pulses to an inductive element (e.g. inductive coil or functionally equivalent device) 708 in series with the switching transistor 100 and the discharging cell in order to produce a stepped-up voltage thereacross, and (iii) regulating the stepped-up output voltage produced by the inductive element 708 associated with each discharging cell by rectifying the output current from each such inductive element 708, combining the rectified output currents and then low pass-filtering the same using a relatively large output capacitor 705in parallel with the output electrical load R.

As shown in FIG. 14A, the fourth illustrative embodiment of the rechargeable FCB power generation module of the present invention is similar in all respects to the FCB module 1 shown in FIG. 5A, except as follows: (1) the anode structures of the discharging cells realized as an unpatterned or patterned sheet of conductive material maintained at a common electrical potential (e.g. electrical ground); (2) the ionically conductive medium 226 is a shared medium, not requiring ionic-isolation among neighboring discharging and recharging cells as in the case of FCB module 1; (3) the metal-fuel material 195 need not be segmented on a cell by cell basis required in the first illustrative embodiment of FIG. 3, and can be a single continous sheet of metal-fuel material; (4) a single anode-contacting electrode 24 can be used to establish contact with the metal-fuel sheet; and (5) the discharging cell output terminal configuration subsystem 205 in FCB module 1 is eliminated, and instead, the anode and cathode structures of each discharging cell therein are connected to a discharging output voltage regulation subsystem 223‴, schematically detained in FIG. 14B1.

As shown in FIG. 14B1, the discharging output voltage regulation subsystem 223‴ comprises: an inductive element (e.g. inductive coil or functionally equivalent device) 708 connected in series with (i) a MOSFET-type power switching transistor (Q1) 101 (whose emitter is connected to electrical ground and collector connected to the inductive element 108), and (ii) the cathode element 21A of each discharging cell (21A, 226, 195, 24), for producing stepped-up pulsed voltage waveforms from each electronically-activated discharging cell under the control of the dicharging/recharging cell switching controller 101 during discharging operations; a diode (D1) 709 connected between the collector of each power switching transistor 100 and the inductive element 708, and at its send end to a low pass-filtering capacitor 705, as shown in FIG. 14B1, for rectifying the output electrical current signals produced from each inductive element 708 feeding into the output capacitor 705; whereby the output capacitor 705 filters out high-frequency signal components in the stepped-up DC output voltage waveform produced across the electrical load (R) while the inductive elements 708 are driven by the pulsed electrical currents supplied by the electrically-switched discharging cells associated therewith.

As shown in FIG. 14B1, the common anode element associated with the discharging cells is connected to electrical ground, as is emitter of each MOSFET-type power switching transistor 101. Also, the voltages produced across the output capacitor 705 connected in parallel with the electrical load R is also referenced to electrical ground, as shown. Notably, as each discharging cell is switched into operation by a control voltage supplied by switching controller 101 to the base terminal of each power switching transistor 100 associated therewith, the output current from the discharging cell will have time-varying magnitude characteristics. Thus, a current-limiting impedance will naturally be presented in the series circuitry embodying the discharging cell, thus limiting the electrical current passing therethrough and providing a measure of protection against overpowering the rating of the switching transistor 100.

In the boost regulation circuitry shown in FIG. 14B1, the voltage across the low-pass filtering capacitor 705 is greater than the input voltage produced by the individual discharging cells of the FCB, thus the name "boost" regulation circuitry. For purposes of simplicity, it is best to describe the operation of the discharging output power regulation subsystem 223‴ in terms of its individual subcircuits which operate in parallel. FIG. 14B2 schematically depicts the individual boost regulation circuits embedded about each discharging cell shown in FIG. 14B1.

Figure 14D:
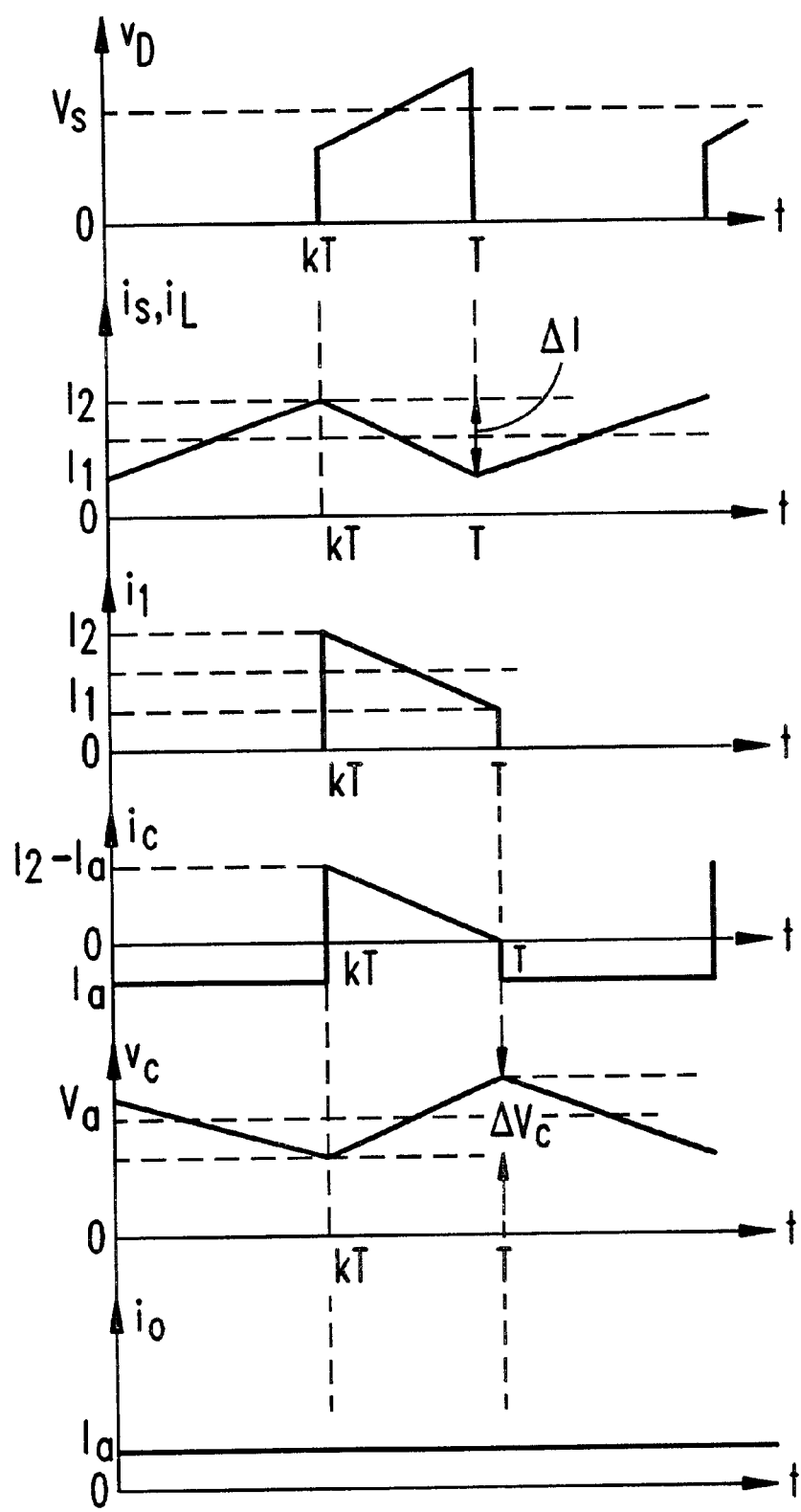
FIG. 14D is a set of time-aligned current and voltage waveforms associated with the voltage boost regulation circuitry shown in FIG. 14B2, illustrating the operation thereof.

The operation of each subcomponent boost regulation circuit can be divided into two modes. Mode 1 begins when power switching transistor 100 (i.e. $Q_1$) is switched on at t=0. The input current, which rises, flows through inductor L and transistor $Q_1$. Mode 2 begins when transistor $Q_1$ is switched off to at t=$t_1$. The current which was flowing through the transistor would now flow through inductive element (L) 708, output capacitor (C) 705, load (R), diode 709 (i.e. $D_m$) The inductor current falls until transistor $Q_1$ is turned on again in the next cycle. The energy stored in inductor L is transferred to the load R. The equivalent circuits for the modes of operation 1 and 2 are shown in FIGS. 14C1 and 14C2, respectively. The waveforms for voltages and currents are shown in FIG. 14D for continuous load current.

Assuming that the inductor current rises linearly from $I_1$ to $I_2$ in time $t_1$, the following expressions can be derived:

$$V_S = L\frac{I_2 - I_1}{t_1} = L\frac{\Delta I}{t_1} \quad (1)$$

where $$t_1 = \frac{\Delta I L}{V_S} \quad (2)$$

Assuming that the inductor current falls linearly from $I_2$ to $I_1$ in time $t_2$, the following expression can be derived:

$$V_S - V_a = -L\frac{\Delta I}{t_2} \quad (3)$$

where $$t_2 = \frac{\Delta I L}{V_a - V_S} \quad (4)$$

Where $\Delta I = I_2 - I_1$ is the peak-to-peak ripple current of inductor L. Froms Eqs. (1) and (3), $$\Delta I = \frac{V_S t_1}{L} = \frac{(V_a - V_S)t_2}{L}$$

Substituting $t_1 = kT$ and $t_2 = (1-k)T$, where k is the duty cycle of the content signal to the switching transistor $Q_1$, yields the average output voltage:

$$V_a = V_S \frac{T}{t_2} = \frac{V_S}{1-k} \quad (5)$$

Assuming a lossless circuit, $V_S I_S = V_S I_a/(1-k)$ and the average input current is given by the expression:

$$I_S = \frac{I_a}{1-k} \quad (6)$$

The switching period T can be found from:

$$T = \frac{1}{f} = t_1 + t_2 = \frac{\Delta I L}{V_S} + \frac{\Delta I L}{V_a - V_S} = \frac{\Delta I L V_a}{V_S(V_a - V_S)} \quad (7)$$

The peak-to-peak ripple current is given by the expression:

$$\Delta I = \frac{V_S(V_a - V_S)}{f L V_a} \quad (8)$$

or $$\Delta I = \frac{V_S k}{f L} \quad (9)$$

When the power switching transistor is "on", the output capacitor 705 supplies the load current for t=$t_1$. The average (i.e. activated) capacitor current during time $t_1$ is $I_c = I_a$ and the peak-to-peak ripple voltage of the output capacitor is:

$$\Delta V_C = v_C - v_C(t=0) = \frac{1}{C}\int_0^{t_1} I_C\, dt = \frac{1}{C}\int_0^{t_1} I_a = \frac{I_a t_1}{C} \quad (10)$$

Equation (5) gives $t_1 = (V_a - V_S)/(V_a f)$ and substituting $t_1$ in Eq. (10) gives:

$$\Delta V_C = \frac{I_a(V_a - V_S)}{V_a f C} \quad (11)$$

or $$\Delta V_C = \frac{I_a k}{f C} \quad (12)$$

As indicated by equation (5), each boost regulation circuit employed in subsystem 223''' can step-up the output voltage simply by adjusting the duty cycle k of the power switching transistor controlling the operation of the associated discharging cell in the FCB module. When simultaneously activating a plurality of discharging cells, the output voltage produced by the individual boost regulation circuits will be combined in parallel in a manner known in the art. art. Notably, the value of the duty cycle k for each boost regulation circuit in the FCB module is controlled by control signal generated from controller 101 and supplied to the base terminal of the power switching transistor associated therewith. Also, as the output voltage from each boost regulation circuit is very sensitive to changes in duty cycle k, it will be desireable to provide each such regulation voltage circuit with conventional stabilization measures known in the power control art.

Figure 15A:
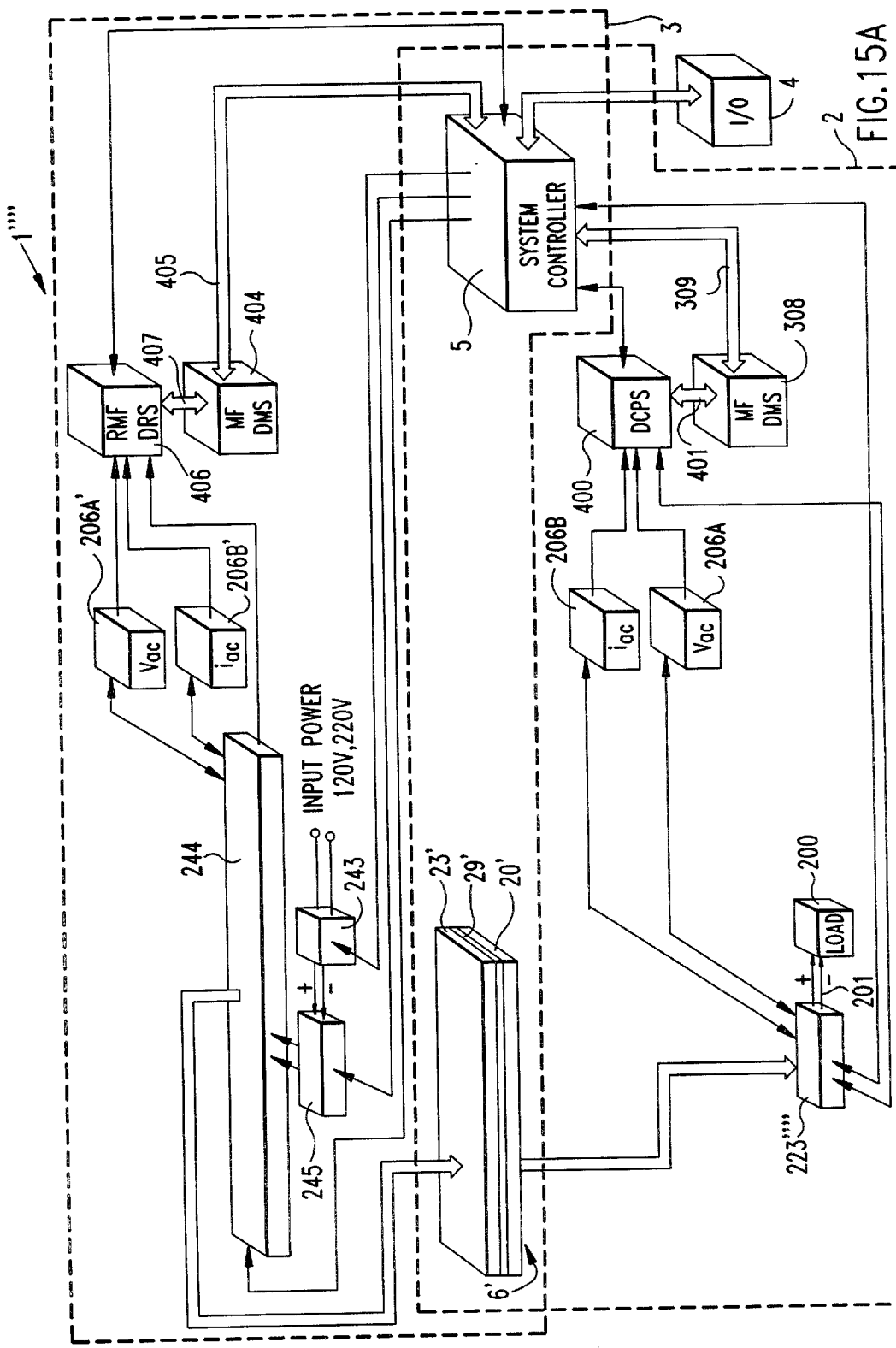
FIG. 15A is a generalized schematic representation of the fifth illustrative embodiment of the rechargeable FCB power generation module of FIG. 1, showing its subsystems and subcomponents in greater detail, with a metal-fuel card shown inserted between the mosaic-like cathode and anode-contacting structures of the hybrid discharging/recharging head thereof.

Metal-Air FCB Power Producing Module of the Fifth Illustrative Embodiment of the Present Invention In FIGS. 15A and 15B1, the fifth illustrative embodiment of the metal-air FCB power generation module 1"" is shown in detail. In this alternative embodiment of the present invention, output voltages from the FCB power generation module 1"" are produced by (i) generating electrical current pulses from each discharging cell using a switching transistor 100, (ii) supplying these electrical current pulses to a common inductive element 709 connected in series with the switching transistor 100 and discharging cell combination, in order to produce a stepped-up voltage across the inductive element 709, and (iii) regulating the stepped-up output voltage across the common inductive element (e.g. inductive coil or functionally equivalent device) 709 by rectifying the output current produced therefrom using diode 704 and then low pass-filtering the same using a relatively large output capacitor 705 in parallel with the output electrical load R.

As shown in FIG. 15A, the fifth illustrative embodiment of the rechargeable FCB power generation module of the present invention is similar in all respects to the FCB module 1 shown in FIG. 5A, except as follows: (1) the anode structures of the discharging cells (21A, 226, 195, 24) are realized by an unpatterned or patterned sheet of conductive material maintained at a common electrical potential (e.g. electrical ground); (2) the ionically conductive medium 226 is a shared medium, not requiring ionic-isolation among neighboring discharging and recharging cells; (3) the metal-fuel material 195 need not be segmented on a cell by cell basis required in the first illustrative embodiment of FIG. 3, and can be a single continous sheet of metal-fuel material; (4) a single anode-contacting electrode 24 can be used to establish contact with the metal-fuel sheet; and (5) the discharging cell output terminal configuration subsystem 205 is eliminated, and instead, the anode and cathode structures of each discharging cell therein are connected to a discharging output voltage regulation subsystem 223″″, schematically detained in FIG. 15B1.

As shown in FIG. 15B1, the discharging output voltage regulation subsystem 223″″ comprises: a bipolar-type power switching transistor (Q1) 100, whose collector is connected the cathode element 21A of one discharging cell (21A, 226, 195, 24) and whose emitter is connected to a common inductive element 709, for producing stepped-up pulsed voltage waveforms across the inductive element 709 (with reference to electrical ground) in response to electrical current pulses generated from electronically-activated discharging cells under the control of the discharging/recharging cell switching controller 101 during discharging operations; a diode (D2) 704 connected between the common inductive element 709 and a low pass-filtering capacitor 705, as shown in FIG. 15B1, for rectifying the output electrical current signals produced from the inductive element 709 feeding into the output capacitor 705; whereby the output capacitor 705 filters out high-frequency signal components in the stepped-up DC output voltage waveform produced across the electrical load (R) while the common inductive element 709 is driven by the pulsed electrical currents supplied by the electrically-switched discharging cells.

As shown in FIG. 15B1, the common anode element associated with the discharging cells is connected to electrical ground. Also, the voltage produced across the output inductive element 709 and the voltage produced across the output capacitor 705 are also referenced to electrical ground, as shown. Notably, as each discharging cell is switched into operation by a control voltage supplied by switching controller 101 to the base terminal of each power switching transistor 100 associated therewith, the output current from the discharging cell will have time-varying magnitude characteristics. Thus, a current-limiting impedance will naturally be presented in the series circuitry embodying the discharging cell. Thus, limiting the electrical current passing therethrough and providing a measure of protection against overpowering the rating of the switching transistor. As shown in FIG. 15B1, a diode D1 703 is connected in parallel with the collector and emitter terminals of each power switching transistor 100 in series with each discharging cell in order to protect the power-switching transistor from high-voltage transients produced by the common output inductive element 709.

In the "buck-boost" regulation circuitry shown in FIG. 15B1, the voltage across the low-pass filtering capacitor 705 may be less than or greater than the input voltage produced by the individual discharging cells of the system, thus the name "buck-boost" regulation circuitry. For purposes of simplicity, it is best to describe the operation of the discharging output power regulation subsystem 223″″ in terms of its individual subcircuits which operate in parallel. FIG. 14B2 schematically depicts the individual boost regulation circuit embedded about each discharging cell shown in FIG. 14B1.

Figure 15D:
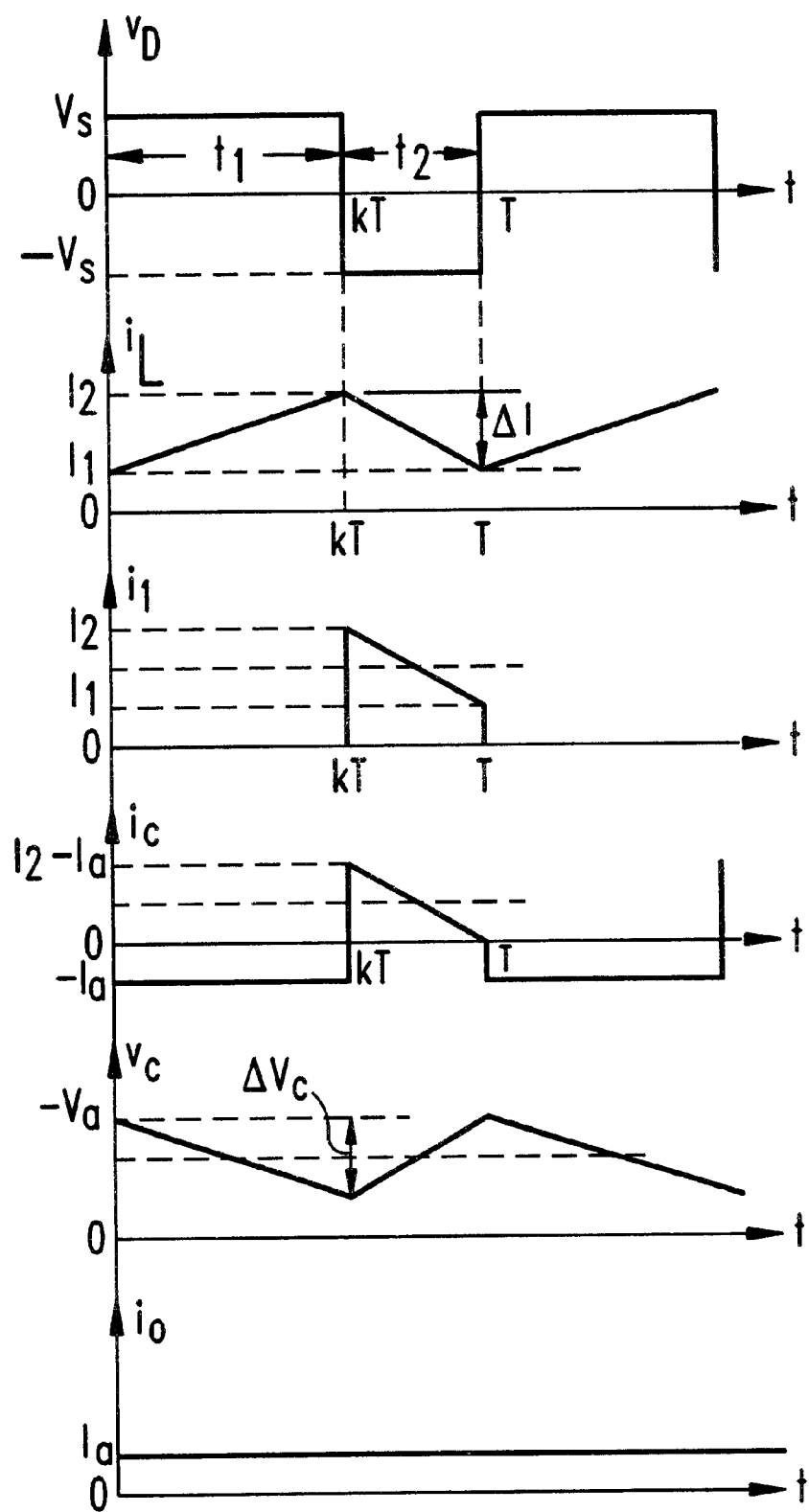
FIG. 15D is a set of time-aligned current and voltage waveforms associated with the voltage boost regulation circuitry shown in FIG. 15B2, illustrating the operation thereof.

The operation of each subcomponent buck-boost regulator circuit can be divided into two modes. During mode 1, power-switching transistor 100 (i.e. $Q_1$) is turned on and diode 704 (i.e. $D_m$) is reversed biased. The input current, which rises, flows through inductor coil 708 (L) and transistor $Q_1$. During mode 2, transistor $Q_1$ is switched off and the current, which was flowing through inductor L, would flow through L, C, $D_m$, and the load R. The energy stored in inductor L would be transferred to the load R and the inductor current would fall until transistor $Q_1$ is switched on again during the next cycle. The equivalent circuits for modes 1 and 2 are shown in FIGS. 15C1 and 15C2, respectively. The waveforms for steady-state voltages and currents of the buck-boost regulation circuitry are shown in FIG. 15D for a continuous load current.

Assuming that the inductor current rises linearly from $I_1$ to $I_2$ in time $t_1$, the following expressions can be derived:

$$V_S = L \frac{I_2 - I_1}{t_1} = L \frac{\Delta I}{t_1} \tag{13}$$

or $$t_1 = \frac{\Delta I L}{V_S} \tag{14}$$

Also, assuming that the inductor current falls linearly from $I_2$ to $I_1$ in time $t_2$, the following expressions can be derived:

$$V_a = -L \frac{\Delta I}{t_2} \tag{15}$$

or $$t_2 = \frac{-\Delta I L}{V_a} \tag{16}$$

where $\Delta I = I_2 - I_1$ is the peak-to-peak ripple current of inductor L. From Eqs. (13) and (15), the peak-to-peak ripple current:

$$\Delta I = \frac{V_S t_1}{L} = \frac{-V_a t_2}{L}$$

Substituting $t_1 = kT$ and $t_2 = (1-k)T$, the average output voltage is given by the expression:

$$V_a = -\frac{V_S k}{1-k} \tag{17}$$

Assuming a lossless circuit, then $V_S I_S = -V_a I_a = V_S I_a k/(1-k)$ and the average input current $I_S$ is related to the average output current $I_a$ by the following equations:

$$I_S = \frac{I_a k}{1-k} \tag{18}$$

The switching period T can be found from the equation:

$$T = \frac{1}{f} = t_1 + t_2 = \frac{\Delta I L}{V_S} - \frac{\Delta I L}{V_a} = \frac{\Delta I L (V_a - V_S)}{V_S V_a} \tag{19}$$

The peak-to-peak ripple current $\Delta I$ is given by the equation:

$$\Delta I = \frac{V_S V_a}{fL(V_a - V_S)} \quad (20)$$

or $$\Delta I = \frac{V_S k}{fL} \quad (21)$$

When power switching transistor $Q_1$ is activated (i.e. on"), the low-pass filter capacitor C supplies the load current for $t=t_1$. The average discharging current of the low-pass filter capacitor is $I_C=I_a$ and the peak-to-peak ripple voltage of the capacitor is given by the expression:

$$\Delta V_C = \frac{1}{C}\int_0^{t_1} I_C dt = \frac{1}{C}\int_0^{t_2} I_a dt = \frac{I_a t_1}{C} \quad (22)$$

equation (17) gives $t_1 = V_a/[(V_a - V_S)f]$ and Eq. (22) becomes $$\Delta V_C = \frac{I_a V_a}{(V_a - V_S)fC} \quad (23)$$

or $$\Delta V_C = \frac{I_a k}{fC} \quad (24)$$

As indicated by equation (17), each buck-boost regulation circuit employed in subsystem 223'''' can step up the output voltage simply by adjusting the duty cycle k of the power switching transistor controlling the operation of the associated discharging cell in the FCB module. When simultaneously activating a plurality of discharging cells, the output voltage produced by the individual buck-boost regulation circuits will be combined in a parallel manner known in the art. Notably, the value of the duty cycle k for each buck-boost regulation circuit is controlled by control signal generated from switching controller 101 and supplied to the base terminal of the power switching transistor 100 associated with the buck-boost regulation circuit.

Figure 16A:
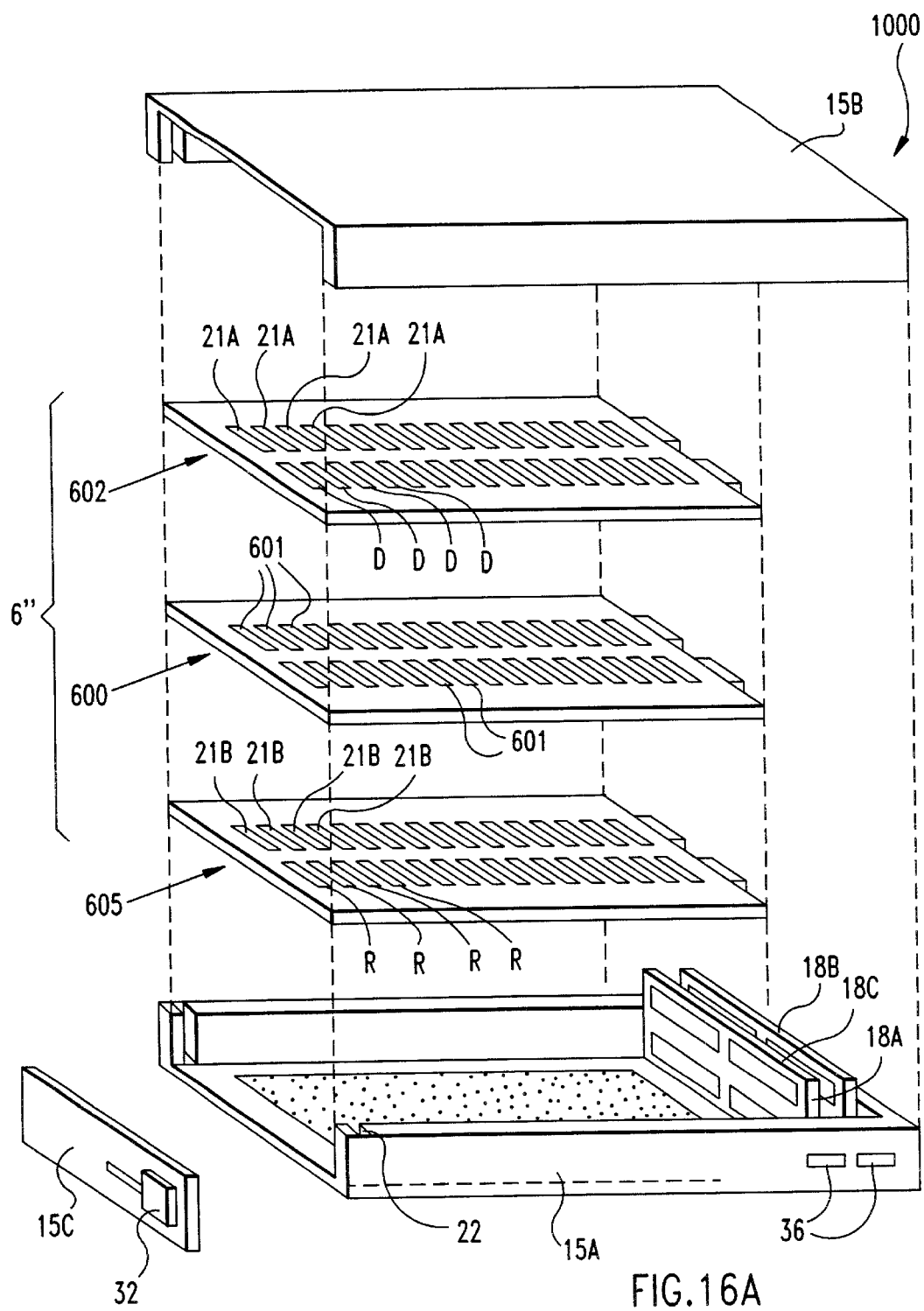
FIG. 16A is a schematic representation of a sixth embodiment of the metal-air FCB power generation system of the present invention designed for use with double-side metal-fuel card structures, wherein a first array of electrically-isolated discharging cells are formed about the upper surface of the double-sided metal-fuel card structure when loaded within the FCB system, and a second array of electrically-isolated recharging cells are formed about the lower surface of the double-sided metal-fuel card structure, in spatial-registration with the first array, so that discharging and recharging operations can be carried out without having to displace the metal-fuel card relative to the discharging and recharging cathode elements, as required in the FCB system of the first illustrative embodiment of the present invention.

Metal-Air FCB Power Producing Module of the Sixth Illustrative Embodiment of the Present Invention In FIGS. 16A and 16B, the sixth illustrative embodiment of the metal-air FCB power generation module 1000 is shown. In this alternative embodiment, the metal-fuel card 600 is not translated or otherwise moved during discharging and recharging operations, as in the case of FCB system shown in FIG. 3 and described in detail above. Rather, as shown in FIG. 16B, the hybrid discharging/recharging head assembly 6'' depicted in FIG. 16A comprises: a multi-element metal-fuel card structure 600 having a double-sided anode-contacting structure 601 integrated with the support structure of metal-fuel card itself; a first multi-segment cathode structure 602 supporting a spatial-arrangement of discharging-optimized cathode elements 21A each having a cathode contacting terminal 603 connected thereto; a first ionically-conductive layer 604 disposed between the multi-segment cathode structure 602 and the metal-fuel card structure 600; a second multi-segment cathode structure 605 supporting a spatial-arrangement of recharging-optimized cathode elements 21B each having a cathode contacting terminal 606 connected thereto; and a second ionically-conductive layer 607 disposed between the multi-segment cathode structure 605 and the metal-fuel card structure 600.

The double-sided anode-contacting structure 601 employed in the hybrid discharging/recharging head assembly of FIG. 16A has two functions, namely: (1) enable the metal-fuel card structure 600 to be discharged from the upper surface thereof by a plurality of discharging cells formed between a spatial arrangement of segmented discharging-optimized cathode elements 21A on the upper surface of the metal-fuel card structure 600 and a spatially corresponding pattern of anode-contacting elements 608 disposed on the lower surface thereof; and (2) enable the metal-fuel card structure 600 to be recharged from the lower surface thereof by a plurality of recharging cells formed between a spatial arrangement of segmented discharging-optimized cathode elements 21B on the lower side of the metal-fuel card structure, and a spatially corresponding pattern of anode-contacting elements 609 disposed on the upper surface thereof.

As shown in FIG. 16B, the anode-contacting elements 608 on the lower surface of the metal-fuel card 600 can be formed by depositing a conductive pattern along the lower surface thereof where it is desired to collect electrical charge from particular metal-fuel regions along the metal-fuel card during discharging operations. Anode-contacting terminals 610 connected to respective anode contacting elements 608 for use during discharging operations are indicated by $T_{ADi}$ in FIG. 16C, where "i" is the discharging cell index. Each pair of cathode-contacting terminals and anode-contacting terminals associated with the i-th discharging cell are indicated by $T_{Di}$ and $T_{ADi}$, respectively, and are listed in FIG. 16C.

Likewise, as shown in FIG. 16D, anode-contacting elements 609 on the upper surface of the metal-fuel card can be formed by depositing a conductive pattern along the upper surface thereof where it is desired to supply electrical charge to particular metal-fuel regions along the metal-fuel card during recharging operations. Cathode-contacting terminals 606 connected to respective recharging-optimized cathode contacting elements 21B for are indicated by $T_{Ri}$ in FIG. 16D, where "i" is the recharging cell index. Anode-contacting terminals 611 connected to respective anode contacting elements 609 for use during recharging operations are indicated by $T_{aRi}$ in FIG. 16D, where "i" is the recharging cell index. Each pair of cathode-contacting terminals and anode-contacting terminals associated with the i-th recharging cell are indicated by $T_{Ri}$ and $T_{ARi}$, respectively, and are listed in FIG. 16D.

Notably, it may be desirable in some applications to embody an electro-mechanical or like mechanism 35 within the FCB module, as illustrated in FIG. 9A, to cause the metal-fuel card structure to undergo small oscillatory movements along the longitudinal direction of the metal-fuel card during recharging operations. It is understood that the fuel-card oscillation device should be installed within the FCB module in such a manner to enable micro-oscillatory movement of the metal-fuel card during recharging operations, without interfering with other functions to be carried out within the module. The function of such an oscillatory device would be to prevent dendrite formations from growing during recharging operations. In such applications, micro-movement of the metal-fuel card can be controlled by the system controller 205. This feature of the present invention has not been shown in FIGS. 16A and 16B to avoid obfuscation of other inventive features of the discharging/recharging head assembly.

Figure 17:
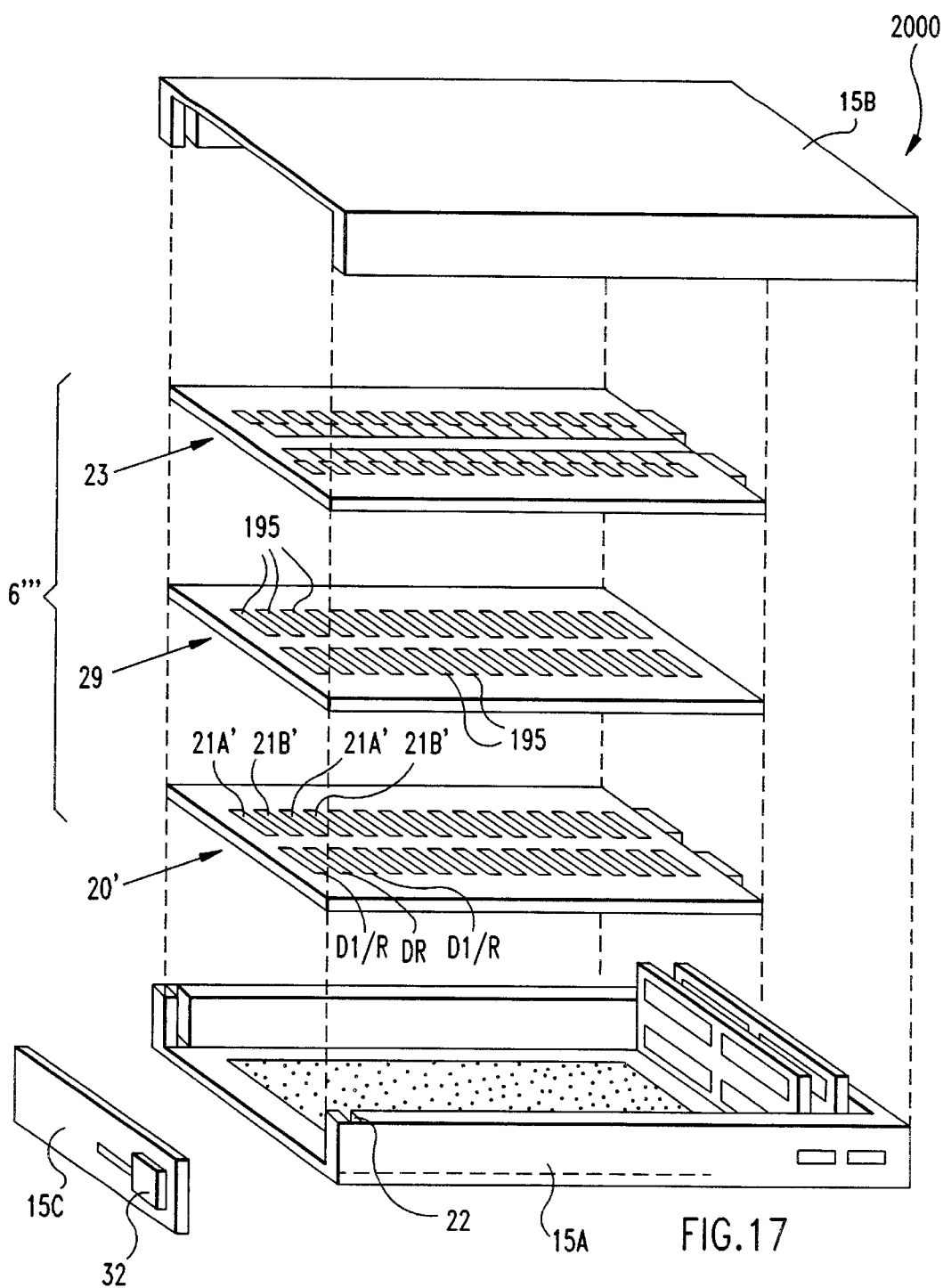
FIG. 17 is an exploded view of a seventh illustrative embodiment of the rechargeable FCB-based power generation module of the present invention, showing the major components thereof including a multi-element cathode structure having two-different types of segmented cathode elements spatially-arranged thereon (i.e. for performing two different levels of discharging and one level of recharging), a multi-element anode-contacting structure, a multi-element metal fuel card, upper and lower housing portions, a housing end panel with an aperture for insertion of the metal-fuel card, and a pair of miniature printed circuit (PC) boards employed within the module and carrying the electrical circuits realizing many of the subsystems thereof.

Metal-Air FCB Power Producing Module of the Seventh Illustrative Embodiment of the Present Invention In FIG. 17, there is shown the seventh illustrative embodiment of the FCB module 2000 of the present invention, wherein the cathode structure 20' supports two different types of cathode elements, namely: first-type cathode elements 21A': made from air having an unlimited capacity, for use during constant-rate discharging operations; and second-type cathode elements 21B' made from NiOOH having limited capacity, for use during high-rate/power discharging operations. In all other respects, the FCB module of the seventh illustrative embodiment is similar to the FCB module of the first illustrative embodiment shown in FIG. 3 and described in great detail hereinabove.

In the seventh illustrative embodiment shown in FIG. 17, the combination of air cathode elements 21A' and NiOOH cathode elements 21B' within the cathode structure thereof provides a unique metal-air FCB module having the following set of features: high discharge capacity; high peak power; and rechargeablity using the NiOOH cathode elements. The combination of air-cathode elements and NiOOH cathode elements on a single cathode support structure within a single FCB module results in high energy density. Methods of fabricating air-type cathode elements as well as NiOOH cathode elements 21B' (having :low polarization of the cathode and anode at high current densities) are generally known in the art. By combining these two different types of cathode elements (i.e. electrodes) into a segmented cathode structure according to the principles of the present invention, the FCB power generation system can achieve high-energy density and yet still have good peak power performance characteristics.

During constant rate discharging operations, the air cathode can be electronically switched into operation by the system controller in order to provide OH via catalytic reaction with oxygen in air. When additional power is needed, one or more NiOOH cathode elements can be electronically-switched into operation by the system controller in order to provide extra power output required during discharging operations. The energy density of the FCB module will depend on the ratio of NiOOH cathode elements to air cathode elements employed in the whole FCB system.

While it is not wise to use the air cathode elements for carrying out recharging operations within the FCB module of this embodiment of the present invention, it is advantageous to employ the NiOOH cathode elements during recharging operations to recover the original state of the zinc metal-fuel material along the card structure. Thus after the metal-fuel card has been discharged completely, the NiOOH cathode elements 21B' can be used as recharging electrodes in order to regenerate/reduce zinc oxide back to metallic zinc.

Thus, using cathode elements having different electrical characteristics, as in the present embodiment, it is possible to construct a high-performance rechargeable FCB system without employing any bi-functional cathode elements. Also, as recharging operations are carried out using only the NiOOH cathode elements, the number of discharge/recharge cycles that the metal-fuel card can undergo without significant degradation can be as high as the cycle life of the NiOOH cathode elements themselves, which is normally more than 500 times.

Metal-Air FCB Power Producing Module of the Eighth Illustrative Embodiment of the Present Invention In FIG. 18, there is shown the eighth illustrative embodiment of the FCB module of the present invention 3000, wherein the cathode structure 20'' supports only a single-type of cathode element, namely: a discharging-optimized cathode element 21A'' for use only during discharging operations. Thus, this illustrative embodiment does not include a Metal-Fuel Card Recharging Subsystem 3, as illustrated in FIG. 5A and elsewhere herein. In all other respects, the FCB module of the fourth illustrative embodiment is similar to the FCB module of the first illustrative embodiment shown in FIG. 3 and described in great detail hereinabove. In this embodiment of the present invention, the size of each discharging-optimized cathode element may be substantially equal, or they may be different in order to produce different combinations of output power as electrical loading conditions may demand in any given application. As there is no facility for recharging discharged metal-fuel cards, the metal-fuel cards inserted through aperture 15D formed within the housing of the FCB module shown in FIG. 18 will be discarded after discharge and replaced with a new fresh metal-fuel card, as taught in copending U.S. application Ser. No. 09/116,643, incorporated herein by reference, or alternatively, recharged within a recharging unit or station, as disclosed in FIGS. 19A and 19B and described below.

Metal-Air Fuel Card Recharging Module of the Present Invention

As shown in FIG. 19A, the metal-air FCB recharging module (i.e. fuel-card recharger) of the present invention 700 is designed to receive a discharged metal-air card for quick and efficient recharging, and subsequent reuse. As shown in FIG. 19B, the recharger is similar in construction to the FCB module shown in FIG. 3, except that the Metal-Fuel Card Discharging Subsystem 2 shown in FIG. 5A is omitted, and each of the segmented cathode elements on the cathode structure 20''' is a recharging-optimized cathode element 21B''' of substantially the same size and thickness, although such physical parameters may vary from embodiment to embodiment. Also, as this module is designed to receive discharged metal-fuel cards for recharging, the end panel 15C is provided with an aperture slot 15D through which a metal-fuel card 29 can be passed for receipt within the recharging module and subject to recharging operations.

Advantages Derived from the Present Invention

The present invention disclosed hereinabove provides a great solution to the various problems associated with large-area single-segment cathode structures employed in prior art battery devices. The method of battery construction according to the present invention involves spatially arranging a plurality of relatively small cathode elements on a cathode support structure, and spatially arranging a plurality of anode-contacting elements on an anode-contacting element support plate, wherein each segmented cathode element is in spatial registration with one of the anode-contacting elements to form either a discharging and/or recharging cell that is independently activatable (i.e. enabled) using a solid-state transistor switching technology under the control of a cell switching system controller within the FCB module. Control over each cell can be achieved simply by monitoring the cell voltage during discharging or recharging using a scanning method. The voltage across each cell can be measured and compared. If any cell has lower than normal voltage value thereacross, then the cell switching controller can computationally-decide to skip this section during normal discharge. After a certain period of time, the cell switching controller can return to check the status of the skipped cell and decide to "fix/repair" or abandon the same. "Fix" action can be done by a special recharging process applied to the anodic metal-fuel element associated with the damaged cell. By virtue of this novel arrangement, a problem discovered with any particular cathode element (e.g. cell) due to a manufacturing defect, or natural degradation over time, can be automatically detected and the damaged discharging cell can be can skipped or otherwise disconnected (or disabled) from the head assembly in order to ensure proper performance from all other healthy cells provided within the head assembly.

Advantageously, the cathode arrangement according to the present invention enabled the use of many thinner current conductors for collecting same amount of current within a discharging head assembly. In a large electrode case, the current collector is much larger due to the skin effect of any thick conductor an thus, the cross-section of the current collector is not in proportion to the current amount to be carried. Using this invention, the current collectors for each cell electrode can be made relatively small. Due to much larger overall conductor surface area, the skin effect is less pronounced and the overall cross-section of the current collectors is less than one single current collector in a large electrode case. Thus the present invention thus provides an opportunity to use thinner and lighter current collectors in constructing a large power system. Also, the I×R losses with the circuit is also lower. Since the current from each electrode is smaller than the overall current from one large electrode, the semiconductor switching element used to control and condition each cell within the head assembly have lower rating and much lower cost than those used directly with high current from one large piece electrode. This reduces the cost of the power electronics significantly. The I×R losses from each component can also be lower due to lower current values used.

The advantage of provided by using the segmented cathode design of the present invention during recharging is that the recharging power can be evenly distributed among the cathode elements, or in a manner precisely controlled according to the feedback signal derived therewhile, so as to achieve uniform recharging and avoidance of dendrite growth. Thus, the anode cycle life can thus be extended. This is not possible for any large cathode-electrode system which are characteristic of prior art battery systems and devices.

Another advantage provided by the present invention is that by using a power switching circuit and an inductive element in conjunction with each discharging cell provided in the FCB module, it is possible to produce stepped-up regulated output voltages for driving various types loads, while greatly simplifying the construction of the FCB module.

While the novel cathode and anode constructions, discharging cell and recharging cell designs, and power switching circuits and inductive element arrangements of the present invention have been described in great detail connection with metal-air FCB technology, it is understood that such systems, devices and methods of the present invention can be practiced with virtually any type of battery technology employing cathode and anode structures including, but not limited to: lithium-ion battery technology; nickel-cadmium battery technology; metal-hydride battery technology; lead-acid battery technology; hydrogen fuel-cell battery technology; each well known in the battery power art.

While the hybrid discharging/recharging head assemblies and cathode structures of the illustrative embodiments have been described above in connection with metal-fuel card type FCB systems and the like, it is understood that such assemblies and structures can be readily embodied within rechargeable FCB-based power generation systems and modules that use a supply of multi-tracked metal-fuel tape contained, for example, within a cartridge-like device, as disclosed in Applicants' U.S. Pat. No. 6,306,534, supra. In such alternative embodiments of the present invention, a metal-fuel cartridge would be loaded into a suitably constructed FCB-based power generation module to provide a supply of fuel for electrical power generation therefrom, while exploiting the numerous advantages provided by using the segmented cathode structures of the present invention.

The above-described FCB systems of the present invention can be used to power various types of electrical circuits, devices and systems, including, but not limited to, transportable computers, portable telephones, lawn mowers, stand-alone portable generators, vehicular systems, and the like Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying Claims to Invention.

What is claimed is:

1. A device for producing or storing electrical energy by way of electrochemical reactions comprising:
    a cathode structure having one or more first cathode elements optimized for discharge supported on a cathode support structure connected to a first cathode terminal, and one or more second cathode elements optimized for recharge supported on said cathode support structure connected to a second cathode terminal;
    an anode structure having one or more anode contacting electrodes, each said anode contacting electrode being connected to an anode terminal;
    an ionically conductive medium disposed between each said first cathode structure and said anode structure, and each said second cathode structure and said anode structure, wherein a first energy cell is formed between each said first cathode element and said anode structure, and a second energy cell is formed between each said second cathode element and said anode structure.

2. The device of claim 1, wherein said anode structure comprises a plurality of metal-fuel sheets, each being in sectional isolation from each other metal-fuel element.

3. The device of claim 1, wherein said first cathode elements and said second cathode elements are disposed in substantially the same plane.

4. The device of claim 1, wherein, said first cathode elements and said second cathode elements are spatially arranged in alternating rows of first and second cathodes.

5. The device of claim 1, wherein said anode structure comprises a plurality of anode elements, each said anode element spatially registratable with either one said first cathode element or one said second cathode element.

6. The device of claim 1, wherein said each said first cathode element and each said second cathode element is realized as an air cathode element, and said anode structure is made from zinc material.

7. The device of claim 1, wherein each said anode contacting electrode is spatially aligned with one of said first and second cathode elements supported on said cathode support structure.

8. The device of claim 1, wherein said anode structure comprises a non-segmented sheet of metal-fuel.

9. A metal-air FCB system, comprising:
    at least one discharging optimized cathode element and at least one discharging optimized cathode element embodied within an integrated support structure for use in carrying out discharging and/or recharging operations.

10. A metal-air FCB system comprising:
- a hybrid discharging/recharging head assembly having a first array of discharging cathode elements that are a disposed on a common support substrate and optimized for discharging operations, and a second array of recharging cathode elements electrically isolated from the first array of discharging cathode elements disposed on said common support substrate and optimized for recharging operations.

11. The metal-air FCB system of claim 10, which further comprises:
- a first array of anode-contacting elements are provided in spatial registration with the first array of cathode elements so as to produce a first plurality of discharging cells for loading metal-fuel material therewithin and generating electrical power therefrom during discharging operations; and
- a second array of anode-contacting elements are provided in spatial registration the second array of cathode elements so as to produce a second plurality of recharging cells for loading discharged metal-fuel material therewithin and supplying electrical power thereto during recharging operations.

12. The metal-air FCB system of claim 10, wherein said first plurality of discharging cells and second plurality of recharging cells are realized within a unitary support structure or subassembly, and each said discharging cell and/or said recharging cell is electronically-controllable in order to carry out any one of a number of power, voltage and/or current control methods under microprocessor control.

13. The metal-air FCB system of claim 10, wherein said first plurality of discharging cells and said second plurality of recharging cells are spatially arranged in the form of a mosaic structure.

14. The metal-air FCB system of claim 10, wherein each said discharging cathode element and each said recharging cathode element is selectively activated by a programmed microprocessor.

15. The metal-air FCB system of claim 10, wherein said system can be manually or electro-mechanically translated into its discharging configuration as well as its recharging position, for operation during discharging and recharging operations, respectively.

16. The metal-air FCB system of claim 14, wherein said system is electro-mechanically forced to undergo micro-displacements, relative to said recharging cathode elements, along the longitudinal direction of said recharging cells during recharging operations, in order to inhibit growth of dendrite formations along the metal fuel elements being recharged.

17. The metal-air FCB system of claim 10, wherein said recharging-optimized cathode elements are positioned and vibrated relative to the anode elements along the metal-fuel card during recharging operations in order to cause the anode elements to have a different direction of redeposition, thereby reducing dendrite growth and anode shape change during recharging operations.

18. The metal-air FCB system of claim 10, which further comprises a metal-fuel management subsystem for automatically managing the amount of metal-fuel remaining on each indexed region of the metal-fuel structure being discharged so that, during recharging operations, only the recharging-optimized cathode structures associated with discharged metal-fuel regions are electrically-switched into operation to enable recharging of such metal-fuel regions.

19. The metal-air FCB system of claim 18, wherein said metal-fuel management subsystem automatically manages the amount of metal-oxide remaining on each region of the metal-fuel structure being recharged so that, during discharging operations, only the discharging-optimized cathode structures associated with recharged metal-fuel regions are electrically-switched into operation to enable discharging of such metal-fuel regions.

20. The metal-air FCB system of claim 10, wherein said recharging cathode elements are realized using gas permeable structures having a microstructure provided with micropores.

21. The metal-air FCB system of claim 10, wherein said discharging cathode elements have a microstructure that is optimized for discharging operations.

22. The metal-air FCB system of claim 10, wherein each said discharging cathode element can produce non-DC output using semiconductor elements, so as to increase the output voltage level using switching power circuits.

23. A metal-air fuel cell battery device for use in a metal-air fuel cell battery system producing or storing electrical energy by way of electrochemical reactions, the device comprising:
- a plurality of first cathode elements optimized for use during discharging operations that are permeable to gas spatially and electrically isolated from a plurality of second cathode elements optimized for use during recharging operations that are permeable to gas, wherein each first cathode element and each second cathode element are disposed on a unitary structure.

24. The device of claim 23, wherein said unitary structure is substantially planar and is permeable to gas.

25. The device of claim 24, wherein said plurality of first cathode elements and said plurality of second cathode elements are disposed in substantially the same plane.

26. The device of claim 23, wherein said plurality of first cathode elements and said plurality of second cathode elements are spatially arranged in alternating rows of first cathode elements and second cathode elements.

27. The device of claim 23, further comprising an electrolytic medium disposed between an anode structure and said cathode elements.

28. The device of claim 27, wherein said anode structure comprises a non-segmented sheet of metal-fuel.

29. The device of claim 27, wherein said anode structure comprises a plurality of metal-fuel sheets, each being in sectional isolation from one another.

30. The device of claim 27, wherein said anode structure is forced to undergo micro-displacements during recharging operations in order to inhibit growth of dendrite formations.

31. The device of claim 27, wherein each first cathode element is optimized for use during discharging operations, wherein each second cathode element is optimized for use during recharging operations, wherein said anode structure comprises a plurality of anode elements each spatially-arranged with one first cathode element to thereby realize a plurality of discharging cells, and wherein said anode structure comprises a plurality of anode elements each spatially arranged with one second cathode element to thereby realize a plurality of recharging cells.

32. The device of claim 31, wherein each first cathode element has a microstructure that is optimized for discharging operations, and wherein each second cathode element h as a microstructure that is optimized for recharging operations.

33. The device of claim 31, wherein said plurality of discharging cells and said plurality of recharging cells are spatially arranged in the form of a mosaic structure.

34. The device of claim 32, wherein each discharging cell and each recharging cell are selectively activated, respectively, by a programmed controller.

35. The device of claim 34, further comprising:

a fuel management subsystem for managing fuel on each indexed region of the anode structure being discharged so that, during recharging operations, only the second cathode elements associated with discharged fuel regions are activated to enable recharging of such regions.

36. The device of claim 35, wherein said fuel management subsystem manages fuel on each region of the anode structure so that, during discharging operations, only the first cathode elements associated with charged fuel regions are activated to enable discharging of such fuel regions.

37. The device of claim 32, further comprising:

circuitry for increasing the output voltage level of said discharging cells.

38. The device of claim 37, wherein said circuitry comprises switching device.

39. The device of claim 32, wherein said anode structure comprises a metal fuel.

40. The device of claim 39, wherein said metal fuel comprises zinc, and said gas comprises oxygen.

41. A device for producing or storing electrical energy by way of electrochemical reactions comprising:

a cathode structure having one or more first air cathode elements on a cathode support structure connected to a first cathode terminal, and one or more second NiOOH cathode elements supported on said cathode support structure connected to a second cathode terminal;

an anode structure having one or more anode contacting electrodes, each said anode contacting electrode being connected to an anode terminal;

an ionically conductive medium disposed between each said first cathode structure and said anode structure, and each said second cathode structure and said anode structure, wherein a first energy cell is formed between each said first cathode element and said anode structure, and a second energy cell is formed between each said first cathode element and said anode structure.

42. The device of claim 41, wherein each said anode contacting electrode is spatially aligned with one of said first and second cathode elements supported on said cathode support structure.

43. The device of claim 41, wherein said anode structure comprises a non-segmented sheet of metal-fuel.

44. The device of claim 41, wherein said anode structure comprises a plurality of metal-fuel sheets, each being in sectional isolation from each other metal-fuel element.

45. The device of claim 41, wherein said first cathode elements and said second cathode elements are disposed in substantially the same plane.

46. The device of claim 41, wherein, said first cathode elements and said second cathode elements are spatially arranged in alternating rows of first and second cathodes.

47. The device of claim 41, wherein said anode structure comprises a plurality of anode elements, each said anode element spatially registratable with either one said first cathode element or one said second cathode element.

48. A metal-air fuel cell battery device for use in a metal-air fuel cell battery system producing or storing electrical energy by way of electrochemical reactions, the device comprising:

a plurality of air-cathode first cathode elements optimized for use during discharging operations that are permeable to gas spatially isolated from a plurality of NiOOH second cathode elements optimized for use during recharging operations that are permeable to gas, wherein each first cathode element and each second cathode element are disposed on a unitary structure, and further wherein the first type cathode elements are electrically isolated from the second type cathode elements.

49. The device of claim 48, wherein said unitary structure is substantially planar and is permeable to gas.

50. The device of claim 48, wherein said plurality of first cathode elements and said plurality of second cathode elements are disposed in substantially the same plane.

51. The device of claim 48, wherein said plurality of first cathode elements and said plurality of second cathode elements are spatially arranged in alternating rows of first cathode elements and second cathode elements.

52. The device of claim 48, further comprising an electrolytic medium disposed between an anode structure and said cathode elements.

53. The device of claim 52, wherein said anode structure comprises a non-segmented sheet of metal-fuel.

54. The device of claim 52, wherein said anode structure comprises a plurality of metal-fuel sheets, each being in sectional isolation from one another.

55. The device of claim 52, wherein said anode structure is forced to undergo micro-displacements during recharging operations in order to inhibit growth of dendrite formations.

* * * * *